US008644969B2

(12) United States Patent
Ben-Yaacov et al.

(10) Patent No.: US 8,644,969 B2
(45) Date of Patent: Feb. 4, 2014

(54) CONTENT PROVISIONING AND REVENUE DISBURSEMENT

(75) Inventors: Yaacov Ben-Yaacov, Douglasville, GA (US); Boaz Ben-Yaacov, Douglasville, GA (US); Abraham Lieberman, Modi'in (IL)

(73) Assignee: Catch Media, Inc., Douglasville, GA (US)

( * ) Notice: Subject to any disclaimer, the term of this patent is extended or adjusted under 35 U.S.C. 154(b) by 1214 days.

(21) Appl. No.: 12/495,766

(22) Filed: Jun. 30, 2009

(65) Prior Publication Data

US 2010/0325022 A9   Dec. 23, 2010

Related U.S. Application Data

(63) Continuation-in-part of application No. 11/607,163, filed on Dec. 1, 2006, which is a continuation-in-part of application No. 11/261,687, filed on Oct. 28, 2005, which is a continuation-in-part of application No. 10/893,473, filed on Jul. 16, 2004, which is a continuation-in-part of application No. 10/829,581, filed on Apr. 21, 2004, which is a continuation-in-part of application No. 10/336,443, filed on Jan. 2, 2003, now Pat. No. 7,191,193.

(51) Int. Cl.
*G06F 17/00* (2006.01)
*G06F 21/00* (2013.01)
*H04R 29/00* (2006.01)

(52) U.S. Cl.
USPC ............... 700/94; 705/53; 705/54; 381/56

(58) Field of Classification Search
CPC ................ G06F 17/30017; G06F 17/30766; G06F 21/31; G06Q 20/40; G06Q 30/0639; G06Q 30/04; H04N 21/4627; H04N 21/44204; H04L 2463/102; H04L 29/06462
USPC ............... 700/94; 705/7.35, 52–54
See application file for complete search history.

(56) References Cited

U.S. PATENT DOCUMENTS 4,230,990 A  10/1980  Lert, Jr. et al.
4,659,231 A   4/1987  Barkouki
(Continued)

FOREIGN PATENT DOCUMENTS

EP   0 760 505 A2   3/1997
EP   1 016 991 A2   7/2000
(Continued)

OTHER PUBLICATIONS

Office Action for U.S. Appl. No. 10/829,581, mailed Feb. 2, 2011, 13 pgs.
(Continued)

*Primary Examiner* — Jesse Elbin
(74) *Attorney, Agent, or Firm* — Blakely, Sokoloff, Taylor & Zafman LLP

(57) ABSTRACT

A method for provisioning content to users, including for each of a plurality of items of media content, maintaining information about one or more owners of the item of media content, and maintaining information about one or more providers of the item of media content, for each of a plurality of users, maintaining information about items of media content acquired by the user and about player devices owned by the user, for each of a plurality of time periods, maintaining a history log of items of media content played by one or more of the plurality of users during the time period, receiving a request from a user to play a designated item of media content on a designated player device, during a current time period, identifying an appropriate provider of the designated item of media content, according to a location of the user and according to the designated player device, causing the identified provider of the designated item of media content to transmit the designated item of media content to the user's designated player device, updating the history log for the current time period to reflect the user having played the designated item of media content, and calculating revenue disbursement among the owners of the plurality of items of media content, and the providers of the plurality of media content, for the current time period, based on the history log of the current time period. A system is also described and claimed.

40 Claims, 33 Drawing Sheets

(56) References Cited

U.S. PATENT DOCUMENTS

| | | |
|---|---|---|
| 5,016,171 A | 5/1991 | Connolly et al. |
| 5,129,036 A | 7/1992 | Dean et al. |
| 5,161,251 A | 11/1992 | Mankovitz |
| 5,287,408 A | 2/1994 | Samson |
| 5,303,326 A | 4/1994 | Dean et al. |
| 5,715,403 A | 2/1998 | Stefik |
| 5,892,536 A | 4/1999 | Logan et al. |
| 5,892,900 A | 4/1999 | Ginter et al. |
| 5,918,213 A | 6/1999 | Bernard et al. |
| 5,946,664 A | 8/1999 | Ebisawa |
| 5,970,390 A | 10/1999 | Koga et al. |
| 6,088,455 A | 7/2000 | Logan et al. |
| 6,092,080 A | 7/2000 | Gustman |
| 6,142,375 A | 11/2000 | Belka et al. |
| 6,146,276 A | 11/2000 | Okuniewicz |
| 6,163,711 A | 12/2000 | Juntunen et al. |
| 6,202,060 B1 | 3/2001 | Tran |
| 6,266,654 B1 | 7/2001 | Schull |
| 6,336,219 B1 | 1/2002 | Nathan |
| 6,372,974 B1 | 4/2002 | Gross et al. |
| 6,389,162 B2 | 5/2002 | Maeda |
| 6,407,750 B1 | 6/2002 | Gioscia et al. |
| 6,449,367 B2 | 9/2002 | Van Wie et al. |
| 6,463,444 B1 | 10/2002 | Jain et al. |
| 6,567,984 B1 | 5/2003 | Allport |
| 6,591,085 B1 | 7/2003 | Grady |
| 6,608,930 B1 | 8/2003 | Agnihotri et al. |
| 6,615,192 B1 | 9/2003 | Tagawa et al. |
| 6,636,588 B2 | 10/2003 | Kimura et al. |
| 6,662,231 B1 | 12/2003 | Drosset et al. |
| 6,671,494 B1 | 12/2003 | James |
| 6,697,944 B1 | 2/2004 | Jones et al. |
| 6,748,537 B2 | 6/2004 | Hughes |
| 6,771,748 B2 | 8/2004 | Parker et al. |
| 6,774,604 B2 | 8/2004 | Matsuda et al. |
| 6,774,796 B2 | 8/2004 | Smith |
| 6,834,308 B1 | 12/2004 | Ikezoye et al. |
| 6,847,950 B1 | 1/2005 | Kamibayashi et al. |
| 6,876,974 B1 | 4/2005 | Marsh et al. |
| 6,880,081 B1 | 4/2005 | Itkis |
| 6,888,950 B2 | 5/2005 | Siskin et al. |
| 6,934,837 B1 | 8/2005 | Jaisimha et al. |
| 6,947,598 B2 | 9/2005 | Yogeshwar et al. |
| 6,983,371 B1 | 1/2006 | Hurtado et al. |
| 7,006,424 B2 | 2/2006 | Nonaka et al. |
| 7,020,888 B2 | 3/2006 | Reynolds et al. |
| 7,046,239 B2 | 5/2006 | Asai et al. |
| 7,046,956 B1 | 5/2006 | Cohen |
| 7,073,063 B2 | 7/2006 | Peinado |
| 7,119,267 B2 | 10/2006 | Hirade et al. |
| 7,134,145 B1 | 11/2006 | Epstein |
| 7,158,842 B2 | 1/2007 | Ohmura et al. |
| 7,170,999 B1 | 1/2007 | Kessler et al. |
| 7,188,186 B1 | 3/2007 | Meyer et al. |
| 7,191,193 B2 | 3/2007 | Ben-Yaacov et al. |
| 7,203,966 B2 | 4/2007 | Abburi et al. |
| 7,231,656 B1 | 6/2007 | Nathan |
| 7,281,034 B1 | 10/2007 | Eyal |
| 7,343,347 B2 | 3/2008 | Ostrover et al. |
| 7,363,372 B2 | 4/2008 | Potenzone et al. |
| 7,370,017 B1 | 5/2008 | Lindeman et al. |
| 7,389,273 B2 | 6/2008 | Irwin et al. |
| 7,415,439 B2 | 8/2008 | Kontio et al. |
| 7,440,365 B2 | 10/2008 | Hattori et al. |
| 7,512,549 B1 | 3/2009 | Morita et al. |
| 7,516,213 B2 | 4/2009 | Cunningham et al. |
| 7,523,312 B2 | 4/2009 | Kalker et al. |
| 7,600,266 B2 | 10/2009 | Thomas |
| 7,707,221 B1 | 4/2010 | Dunning et al. |
| 7,730,300 B2 | 6/2010 | Candelore |
| 7,756,792 B2 | 7/2010 | Hughes |
| 7,756,915 B2 | 7/2010 | Ben-Yaacov et al. |
| 7,761,176 B2 | 7/2010 | Ben-Yaacov et al. |
| 7,925,591 B2 | 4/2011 | Gajjala et al. |
| 2001/0018693 A1 | 8/2001 | Jain et al. |
| 2001/0051996 A1 | 12/2001 | Cooper et al. |
| 2002/0007350 A1 | 1/2002 | Yen |
| 2002/0007351 A1 | 1/2002 | Hillegass et al. |
| 2002/0010759 A1 | 1/2002 | Hitson et al. |
| 2002/0015362 A1 | 2/2002 | Cowgill et al. |
| 2002/0032747 A1 | 3/2002 | Toki |
| 2002/0045960 A1 | 4/2002 | Phillips et al. |
| 2002/0066115 A1 | 5/2002 | Wendelrup |
| 2002/0068558 A1 | 6/2002 | Janik |
| 2002/0076051 A1 | 6/2002 | Nii |
| 2002/0077984 A1 | 6/2002 | Ireton |
| 2002/0077986 A1 | 6/2002 | Kobata et al. |
| 2002/0087887 A1* | 7/2002 | Busam et al. .................. 713/201 |
| 2002/0100062 A1 | 7/2002 | Lowthert et al. |
| 2002/0114466 A1 | 8/2002 | Tanaka et al. |
| 2002/0116277 A1 | 8/2002 | Kraft |
| 2002/0120456 A1 | 8/2002 | Berg et al. |
| 2002/0126762 A1 | 9/2002 | Tanaka |
| 2002/0138852 A1 | 9/2002 | Reynolds et al. |
| 2002/0157002 A1 | 10/2002 | Messerges et al. |
| 2002/0177914 A1 | 11/2002 | Chase |
| 2002/0184537 A1 | 12/2002 | Inokuchi et al. |
| 2002/0186844 A1 | 12/2002 | Levy et al. |
| 2002/0189427 A1 | 12/2002 | Pachet |
| 2003/0009423 A1 | 1/2003 | Wang et al. |
| 2003/0018491 A1 | 1/2003 | Nakahara et al. |
| 2003/0018582 A1 | 1/2003 | Yaacovi |
| 2003/0021441 A1 | 1/2003 | Levy et al. |
| 2003/0028622 A1 | 2/2003 | Inoue et al. |
| 2003/0040206 A1 | 2/2003 | Wang et al. |
| 2003/0050894 A1 | 3/2003 | Kambayashi et al. |
| 2003/0065642 A1 | 4/2003 | Zee |
| 2003/0076955 A1 | 4/2003 | Alve et al. |
| 2003/0078891 A1 | 4/2003 | Capitant |
| 2003/0079030 A1 | 4/2003 | Cocotis et al. |
| 2003/0079038 A1 | 4/2003 | Robbin et al. |
| 2003/0084126 A1 | 5/2003 | Kumar et al. |
| 2003/0084306 A1 | 5/2003 | Abburi et al. |
| 2003/0098817 A1 | 5/2003 | Choi |
| 2003/0110502 A1 | 6/2003 | Creed et al. |
| 2003/0120541 A1 | 6/2003 | Siann et al. |
| 2003/0131252 A1 | 7/2003 | Barton |
| 2003/0135513 A1 | 7/2003 | Quinn et al. |
| 2003/0154378 A1 | 8/2003 | Hirano |
| 2003/0158737 A1 | 8/2003 | Csicsatka |
| 2003/0163823 A1 | 8/2003 | Logan et al. |
| 2003/0172113 A1 | 9/2003 | Cameron et al. |
| 2003/0177073 A1 | 9/2003 | Ogai |
| 2003/0182184 A1 | 9/2003 | Strasnick et al. |
| 2003/0188150 A1 | 10/2003 | Ohkado et al. |
| 2003/0217057 A1 | 11/2003 | Kuroiwa et al. |
| 2003/0226012 A1 | 12/2003 | Asokan et al. |
| 2003/0229654 A1 | 12/2003 | Bibas et al. |
| 2003/0232593 A1 | 12/2003 | Wahlroos et al. |
| 2003/0233929 A1 | 12/2003 | Agnihotri et al. |
| 2004/0003281 A1 | 1/2004 | Sonoda et al. |
| 2004/0003398 A1 | 1/2004 | Donian et al. |
| 2004/0013125 A1 | 1/2004 | Betker et al. |
| 2004/0021704 A1 | 2/2004 | Mitsutake |
| 2004/0049559 A1 | 3/2004 | Saubade |
| 2004/0058649 A1 | 3/2004 | Grady |
| 2004/0064500 A1 | 4/2004 | Kolar et al. |
| 2004/0078338 A1 | 4/2004 | Ohta et al. |
| 2004/0089141 A1 | 5/2004 | Georges et al. |
| 2004/0089142 A1 | 5/2004 | Georges et al. |
| 2004/0117442 A1 | 6/2004 | Thielen |
| 2004/0121748 A1 | 6/2004 | Glaza |
| 2004/0128324 A1 | 7/2004 | Sheynman et al. |
| 2004/0131255 A1 | 7/2004 | Ben-Yaacov et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0148191 A1 | 7/2004 | Hoke, Jr. |
| 2004/0158741 A1 | 8/2004 | Schneider |
| 2004/0187014 A1 | 9/2004 | Molaro |
| 2004/0199771 A1 | 10/2004 | Morten et al. |
| 2004/0224638 A1 | 11/2004 | Fadell et al. |
| 2004/0225612 A1 | 11/2004 | Shimojima et al. |
| 2004/0252966 A1 | 12/2004 | Holloway et al. |

(56) References Cited

U.S. PATENT DOCUMENTS

| | | |
|---|---|---|
| 2004/0253945 A1 | 12/2004 | Janik |
| 2004/0267390 A1 | 12/2004 | Ben-Yaacov et al. |
| 2005/0004873 A1 | 1/2005 | Pou et al. |
| 2005/0014536 A1 | 1/2005 | Grady |
| 2005/0015464 A1 | 1/2005 | Young |
| 2005/0055352 A1 | 3/2005 | White et al. |
| 2005/0065624 A1 | 3/2005 | Ben-Yaacov et al. |
| 2005/0071280 A1 | 3/2005 | Irwin et al. |
| 2005/0071663 A1 | 3/2005 | Medvinsky et al. |
| 2005/0120380 A1 | 6/2005 | Wolfe |
| 2005/0125087 A1 | 6/2005 | Ben-Yaacov et al. |
| 2005/0169114 A1 | 8/2005 | Ahn |
| 2005/0171938 A1 | 8/2005 | Fisher et al. |
| 2005/0210261 A1 | 9/2005 | Kamperman et al. |
| 2005/0210395 A1 | 9/2005 | Wakita et al. |
| 2005/0227679 A1 | 10/2005 | Papulov |
| 2006/0010075 A1 | 1/2006 | Wolf |
| 2006/0030961 A1 | 2/2006 | Lin |
| 2006/0031257 A1 | 2/2006 | Lipscomb et al. |
| 2006/0031558 A1 | 2/2006 | Ortega et al. |
| 2006/0107330 A1 | 5/2006 | Ben-Yaacov et al. |
| 2006/0122881 A1 | 6/2006 | Walker et al. |
| 2006/0217967 A1 | 9/2006 | Goertzen et al. |
| 2006/0242083 A1 | 10/2006 | Chavez |
| 2007/0030972 A1 | 2/2007 | Glick et al. |
| 2007/0038999 A1 | 2/2007 | Millington |
| 2007/0094276 A1 | 4/2007 | Isaac |
| 2007/0112678 A1 | 5/2007 | Himelfarb |
| 2007/0156762 A1 | 7/2007 | Ben-Yaacov et al. |
| 2007/0162395 A1 | 7/2007 | Ben-Yaacov et al. |
| 2007/0198426 A1 | 8/2007 | Yates et al. |
| 2007/0244794 A1 | 10/2007 | Fenley |
| 2007/0250403 A1 | 10/2007 | Altschuler |
| 2007/0271184 A1 | 11/2007 | Niebert et al. |
| 2008/0052516 A1 | 2/2008 | Tachibana et al. |
| 2008/0183595 A1 | 7/2008 | Sakamoto |
| 2008/0320598 A1 | 12/2008 | Ben-Yaacov et al. |
| 2008/0320605 A1 | 12/2008 | Ben-Yaacov et al. |
| 2009/0043412 A1 | 2/2009 | Ben-Yaacov et al. |
| 2009/0044285 A1 | 2/2009 | Ben-Yaacov et al. |
| 2009/0077190 A1 | 3/2009 | Gupta |
| 2009/0093899 A1 | 4/2009 | Ben-Yaacov et al. |
| 2009/0094663 A1 | 4/2009 | Ben-Yaacov et al. |
| 2009/0106451 A1* | 4/2009 | Zuckerman et al. ......... 709/239 |
| 2009/0248535 A1 | 10/2009 | Fisher et al. |
| 2010/0333211 A1 | 12/2010 | Schonfeld et al. |

FOREIGN PATENT DOCUMENTS

| | | |
|---|---|---|
| EP | 1 074 926 A2 | 2/2001 |
| EP | 1 251 440 A2 | 10/2002 |
| EP | 1 304 874 A2 | 4/2003 |
| EP | 1 307 062 A1 | 5/2003 |
| EP | 1 898 323 A1 | 3/2008 |
| EP | 2 096 599 A1 | 9/2009 |
| EP | 2 098 973 A1 | 9/2009 |
| GB | 2 364 215 A | 1/2002 |
| GB | 2 380 364 A | 4/2003 |
| JP | 08-046538 | 2/1996 |
| JP | 08-152881 | 6/1996 |
| JP | 08-263440 | 10/1996 |
| JP | 10-308056 | 11/1998 |
| JP | 11-073730 | 3/1999 |
| JP | 11-122129 | 4/1999 |
| JP | 11-259964 | 9/1999 |
| JP | 2000-269904 | 9/2000 |
| JP | 2000-307527 | 11/2000 |
| JP | 2000-315177 | 11/2000 |
| JP | 2001-022843 | 1/2001 |
| JP | 2001-075871 | 3/2001 |
| JP | 2001-236081 | 8/2001 |
| JP | 2001-320373 | 11/2001 |
| JP | 2002-015147 | 1/2002 |
| JP | 2002-162973 | 6/2002 |
| JP | 2002-230895 | 8/2002 |
| JP | 2002-245066 | 8/2002 |
| JP | 2002-262254 | 9/2002 |
| JP | 2002-351744 | 12/2002 |
| JP | 2002-359803 | 12/2002 |
| JP | 2003-114949 | 4/2003 |
| JP | 2003-124921 | 4/2003 |
| JP | 2003-338976 | 11/2003 |
| JP | 2003-339000 | 11/2003 |
| JP | 2003-536144 | 12/2003 |
| JP | 2004-517377 | 6/2004 |
| JP | 2004-185172 | 7/2004 |
| JP | 2005-071522 | 3/2005 |
| JP | 2005-517238 | 6/2005 |
| JP | 2005-539469 | 12/2005 |
| JP | 2006-515099 | 5/2006 |
| WO | WO 00/07310 A1 | 2/2000 |
| WO | WO 00/45291 A1 | 8/2000 |
| WO | WO 00/58963 A2 | 10/2000 |
| WO | WO 01/13311 A2 | 2/2001 |
| WO | WO 01/25948 A1 | 4/2001 |
| WO | WO 01/46783 A2 | 6/2001 |
| WO | WO 01/53963 A1 | 7/2001 |
| WO | WO 01/62004 A2 | 8/2001 |
| WO | WO 01/63822 A2 | 8/2001 |
| WO | WO 01/95206 A1 | 12/2001 |
| WO | WO 02/31618 A2 | 4/2002 |
| WO | WO 03/034408 A2 | 4/2003 |
| WO | WO 03/058410 A1 | 7/2003 |
| WO | WO 2004/027588 A2 | 4/2004 |
| WO | WO 2004/061547 A2 | 7/2004 |
| WO | WO 03/005145 A2 | 8/2004 |
| WO | WO 2004/070538 A2 | 8/2004 |
| WO | WO 2005/106876 A2 | 11/2005 |
| WO | WO 2006/019608 A1 | 2/2006 |
| WO | WO 2006/058149 A2 | 6/2006 |
| WO | WO 2008/070062 A2 | 6/2008 |
| WO | WO 2007/055845 A2 | 7/2008 |

OTHER PUBLICATIONS

Office Action for U.S. Appl. No. 12/337,600, mailed Jan. 24, 2011, 15 pgs.
Office Action for Israel Application No. 180559, mailed May 11, 2010, 4 pgs. (including English Language Summary of the Office Action).
Tony Bove, "The iPod Companion", Muska & Lipman, 27 pgs, (including Table of Contents, ix, 1-21, 3, and 80), (2003).
Antonin Billet, "PDA: le Sypod veut séduire par le multimédia", retrieved from the Internet: http://www.01net.com/editorial/175530/pda-le-sypod-veut-seduire-par-le-multimedia/, 3 pgs. (including Google translation), (Feb. 2, 2004).
"Songs-DB 1.3", Soft32, retrieved from the Internet. http //songs-db.soft32.com/, 5 pgs (Jun. 14, 2003).
Internetnews.com Staff, "Songcatcher Snatches Tunes From Live Radio", retrieved from the Internet: http://www.internetnews.com/ec-news/print.php/532651, 1 pg., (Dec. 12, 2000).
PCT Notification of Transmittal of the International Search Report and the Written Opinion of the International Searching Authority, or the Declaration for PCT Application No. PCT/US12/26408, 13 pgs., (Aug. 10, 2012).
Office Action for U.S. Appl. No. 12/337,598, mailed Oct. 1, 2012, 13 pgs.
Office Action for U.S. Appl. No. 12/252,926, mailed Apr. 4, 2012, 15 pgs.
Office Action for U.S. Appl. No. 12/200,586, mailed Jun. 14, 2012, 14 pgs.
Office Action for U.S. Appl. No. 11/607,163, mailed May 22, 2012, 16 pgs.
Office Action for Japanese Application No. 2010-199652, mailed Apr. 5, 2012, 6 pgs. (including English Translation of the Office Action).
Office Action for Canadian Application No. 2,626,314, mailed May 16, 2012, 3 pgs.
Office Action for Australian Application No. 2010257287, mailed Apr. 2, 2012, 2 pgs.

(56) References Cited

OTHER PUBLICATIONS

Office Action for Japanese Application No. 2011-016355, mailed Aug. 16, 2012, 10 pgs. (including English translation of the Office Action).
Office Action for Canadian Application No. 2,784,879, mailed Dec. 6, 2012, 4 pgs.
Office Action for European Application No. 06825548.8, mailed Jul. 31, 2012, 4 pgs.
Office Action for U.S. Appl. No. 12/337,598, mailed Feb. 18, 2011, 10 pgs.
Office Action for U.S. Appl. No. 12/337,598, mailed Sep. 6, 2011, 13 pgs.
Office Action for U.S. Appl. No. 12/337,600, mailed Jul. 8, 2011, 15 pgs.
Office Action for U.S. Appl. No. 12/252,926, mailed May 24, 2011, 15 pgs.
Office Action for U.S. Appl. No. 12/252,926, mailed Oct. 7, 2011, 16 pgs.
Office Action for U.S. Appl. No. 12/252,941, mailed May 10, 2011, 12 pgs.
Office Action for U.S. Appl. No. 12/252,941, mailed Jul. 25, 2011, 3 pgs.
Office Action for U.S. Appl. No. 12/200,586, mailed Oct. 3, 2011, 20 pgs.
Office Action for U.S. Appl. No. 12/200,606, mailed Jun. 20, 2011, 15 pgs.
Office Action for U.S. Appl. No. 12/200,606, mailed Jan. 26, 2012, 19 pgs.
Office Action for U.S. Appl. No. 11/607,163, mailed Aug. 18, 2011, 17 pgs.
Office Action for Israel Application No. 180559, mailed Jul. 20, 2011, 5 pgs. (including English Language Summary of the Office Action).
Office Action for Australian Application No. 2010257287, mailed Jun. 27, 2011, 2 pgs.
PCS Electronics, "RDS Max 2.0", XP002336990, retrieved from the Internet: http://web.archive.org/web/20040413050058/www.ppcs-electronics.com/en/products.php?sub=EDS_encod>, 3 pgs., (Mar. 22, 2004).
amazon.com Description, "HP Jordana 545 Pocket PC", XP002336991, retrieved from the Internet: http://www.pdasupport.com/Jordana545.htm>, 3 pgs., (Apr. 2000).
Richard Menta, et al., "Review: Neuros MP3 Digital Audio Computer", MP3newswire.net, XP002336992, retrieved from the Internet: http://www.mp3newswire.net/stories/2003/neuros.html>, 6 pgs., (May 29, 2003).
Philips Research, "Audio Fingerprinting for Automatic Music Recognition", XP002347089, retrieved from the Internet: http://www.research.philips.com/initiatives/contentid/downloads/audio_fingerprinting_leaflet.pdf>, 2 pgs., (Mar. 2004).
Jaap Haitsma, et al., "A Highly Robust Audio Fingerprinting System", XP002347090, IRCAM, retrieved from the Internet: http://ismir2002.ismir.net/proceedings/02-FP04-2.pdf, 9 pgs., (2002).
Internet Article, "iPOD Track Display", XP00236993, retrieved from the Internet: http://halfbakery.com/idea/IPOD_20track_20display>, 2 pgs., (Sep. 18, 2003).
Internet Article, "MINI2 Forums—RDS—Radio Text", XP002336994, retrieved from the Internet: http://www.mini2.com/forum/archive/index.php/t-24296>, 3 pgs., (Feb. 7, 2003).
Internet Article, "Digiana AudiaX FM Linker", XP002337103, retrieved from the Internet: http://www.i4u.com/article396.html>, 1 pg., (May 30, 2003).
M. Nilsson, "ID3 Tag Version 2.4.0—Native Frames", XP002350036, id3v2.4.0-frames.txt, v 1.1, retrieved from the Internet: http:www/id3.org/id3v2.4.0-frames.txt, 26 pgs., (Nov. 1, 2000).
"Gotuit Media Secures $2.1 Million in First-Round Angel Funding Led by Topol Group", PR Newswire, pNA, The Gale Group, 2 pgs., (Aug. 15, 2000).
Wikipedia, "FairPlay", XP002414372, Wikipedia—The Free Encyclopedia (Online), retrieved from the Internet: http://en.wikipedia.org/wiki/FairPlay, 4 pgs., (Oct. 11, 2005).
Julie Strietelmeier, "Gadgeteer Hands on Review: Apple iPod (3rd Generation 30GB Model)", The Gadgeteer, retrieved from the Internet on Jun. 21, 2008: http://web.archive.org/web/20030622180433/www.the-gadgeteer.com/apple-ipod-30gb-review.html, 10 pgs., (Jun. 6, 2003).
Staff, "Griffin Technology Ships New iTrip for 3rd Generation iPods", The Mac Observer, retrieved from the Internet on Jun. 21, 2008: http://web.archive.org/web/20040109234748/http://www.macobserver.com/article/2003/10/08.5shtml, 2 pgs., (Oct. 8, 2003).
Ryoichi Mori, et al., "Superdistribution: An Electronic Infrastructure for the Economy of the Future", XP002072402, Joho Shori Gakkai Ronbunshi, Transactions of Information Processing Society of Japan, vol. 38, No. 7, pp. 1465-1472, (Jul. 1997).
David Carey, "Apple's iPod Packs a Pricey Punch", TechOnline, retrieved from the Internet on Feb. 13, 2009: http://www.techonline.com/article/printArlicle.jhtml?articleID=193100821, 3 pgs., (Mar. 26, 2002).
PCT Notification of Transmittal of the International Search Report and the Written Opinion of the International Searching Authority or the Declaration for PCT Counterpart Application No. PCT/US2005/024212, 15 pgs., (Nov. 8, 2005).
PCT Invitation to Pay Additional Fees for PCT Counterpart Application No. PCT/US2006/039107 containing Communication Relating to the Results of the Partial International Search Report, 9 pgs., (Feb. 15, 2007).
PCT Notification Concerning Transmittal of International Preliminary Report on Patentability (Chapter 1 of the Patent Cooperation Treaty) for PCT Counterpart Application No. PCT/US2006/039107 containing International Search Report, 12 pgs., (Jul. 10, 2008).
PCT Notification of Transmittal of the International Search Report and the Written Opinion of the International Searching Authority or the Declaration for PCT Counterpart Application No. PCT/US2006/039107 containing International Search Report, 22 pgs., (Nov. 20, 2007).
Office Action for U.S. Appl. No. 10/336,443, mailed Oct. 4, 2004, 13 pgs.
Office Action for U.S. Appl. No. 10/336,443, mailed May 17, 2005, 16 pgs.
Office Action for U.S. Appl. No. 10/336,443, mailed Oct. 21, 2005, 17 pgs.
Office Action for U.S. Appl. No. 10/336,443, mailed May 31, 2006, 20 pgs.
Office Action for U.S. Appl. No. 11/708,997, mailed Feb. 9, 2009, 15 pgs.
Office Action for U.S. Appl. No. 11/708,997, mailed Sep. 28, 2009, 21 pgs.
Office Action for U.S. Appl. No. 10/829,581, mailed Jun. 27, 2008, 14 pgs.
Office Action for U.S. Appl. No. 10/829,581, mailed Feb. 18, 2009, 13 pgs.
Office Action for U.S. Appl. No. 10/829,581, mailed Aug. 14, 2009, 15 pgs.
Office Action for U.S. Appl. No. 10/829,581, mailed Feb. 4, 2010, 15 pgs.
Office Action for U.S. Appl. No. 10/829,581, mailed Jul. 20, 2010, 13 pgs.
Office Action for U.S. Appl. No. 10/893,473, mailed Jan. 9, 2009, 9 pgs.
Office Action for U.S. Appl. No. 10/893,473, mailed Jul. 21, 2009, 13 pgs.
Office Action for U.S. Appl. No. 10/893,473, mailed Mar. 3, 2010, 16 pgs.
Office Action for U.S. Appl. No. 10/893,473, mailed Aug. 3, 2010, 16 pgs.
Office Action for U.S. Appl. No. 12/252,926, mailed Oct. 6, 2010, 15 pgs.
Office Action for U.S. Appl. No. 12/252,941, mailed Nov. 12, 2010, 12 pgs.
Office Action for U.S. Appl. No. 11/261,687, mailed Oct. 20, 2008, 10 pgs.

(56) References Cited

OTHER PUBLICATIONS

Office Action for U.S. Appl. No. 11/261,687, mailed Jul. 9, 2009, 11 pgs.
Office Action for U.S. Appl. No. 11/261,687, mailed Oct. 27, 2009, 3 pgs.
Office Action for U.S. Appl. No. 10/997,606, mailed Apr. 14, 2008, 27 pgs.
Office Action for U.S. Appl. No. 10/997,606, mailed Oct. 27, 2008, 21 pgs.
Office Action for U.S. Appl. No. 10/997,606, mailed Jun. 26, 2009, 15 pgs.
Office Action for Australian Application No. 2005275431, mailed Feb. 11, 2010, 2 pgs.
Office Action for European Application No. 05769589.2, mailed Jul. 29, 2010, 4 pgs.
Office Action for Israel Application No. 180559, mailed May 11, 2010, 2 pgs.
Office Action for Israel Application No. 200109, mailed May 3, 2010, 2 pgs.
Office Action for Israel Application No. 200110, mailed May 6, 2010, 2 pgs.
Office Action for Japanese Application No. 521512/2007, mailed May 18, 2010, 8 pgs. (including English Language Summary of the Office Action).
Office Action for Japanese Application No. 521512/2007, mailed Nov. 16, 2010, 5 pgs. (including English Language Summary of the Office Action).
Office Action for Japanese Application No. 537730/2008, mailed Oct. 5, 2010, 8 pgs. (including English Language Summary of the Office Action).
Dennis Lloyd, "Griffin iTrip", iLounge, retreived from the Internet on Dec. 13, 2012: http://www.ilounge.com/index.php/reviews/entry/griffin-itrip-ipod/, 6 pgs., (May 8, 2003).
Office Action for U.S. Appl. No. 10/829,581, mailed Mar. 29, 2013, 19 pgs.
Office Action for U.S. Appl. No. 12/337,598, mailed Jun. 4, 2013, 17 pgs.
Office Action for U.S. Appl. No. 12/337,600, mailed Apr. 24, 2013, 15 pgs.
Office Action for U.S. Appl. No. 11/607,163, mailed May 2, 2013, 18 pgs.

\* cited by examiner

BEFORE 1710

THURSDAY, 01 NOVEMBER 2008 TO SATURDAY, 01 DECEMBER 2008
NUMBER OF PLAYS:[72] SUBSCRIPTION #106 / SERVICE #23 RATE: USD 5

| | ID# | STAKEHOLDER | BASIS | PLAYS | REVENUE |
|---|---|---|---|---|---|
| SERVICE PROVIDER | #2817 | SPRINT NEXTEL | OTT 35% | 72 | 1.750 |
| ENABLER | #2752 | NOKIA | OTT 1% | 72 | 0.050 |
| REGISTRANT | #2785 | SMITH MICRO | OTT 2% | 72 | 0.100 |
| MUSIC LABEL | #3756 | ARISTA RECORDS | OTT 25% | 3 | 0.052 |
| | #3397 | ATLANTIC RECORDS GROUP | OTT 25% | 2 | 0.035 |
| | #3146 | COLUMBIA RECORDS | OTT 25% | 4 | 0.069 |
| | #3685 | BMG HERITAGE RECORDS | OTT 25% | 4 | 0.069 |
| | #3956 | EMI | OTT 25% | 15 | 0.260 |
| | #3821 | INTERSCOPE | OTT 25% | 35 | 0.608 |
| | #3067 | LEGACY RECORDS | OTT 25% | 2 | 0.035 |
| | #3760 | WARNER MUSIC GROUP | OTT 25% | 7 | 0.122 |
| | | | | 72 | 1.250 |
| CONTENT DISTRIBUTOR | #327 | NAPSTER | OTT 10% | 72 | 0.500 |
| PUBLISHER | #104 | DREAM MILL MUSIC COMPANY | OTT 10% | 5 | 0.035 |

AFTER 1720

THURSDAY, 01 NOVEMBER 2008 TO SATURDAY, 01 DECEMBER 2008
NUMBER OF PLAYS:[73] SUBSCRIPTION #106 / SERVICE #23 RATE: USD 5

| ID# | STAKEHOLDER | BASIS | PLAYS | REVENUE |
|---|---|---|---|---|
| #2817 | SPRINT NEXTEL | OTT 35% | 73 | 1.750 |
| #2752 | NOKIA | OTT 1% | 73 | 0.050 |
| #2785 | SMITH MICRO | OTT 2% | 73 | 0.100 |
| #3756 | ARISTA RECORDS | OTT 25% | 3 | 0.051 |
| #3397 | ATLANTIC RECORDS GROUP | OTT 25% | 2 | 0.034 |
| #3146 | COLUMBIA RECORDS | OTT 25% | 4 | 0.068 |
| #3685 | BMG HERITAGE RECORDS | OTT 25% | 4 | 0.068 |
| #3956 | EMI | OTT 25% | 15 | 0.257 |
| #3821 | INTERSCOPE | OTT 25% | 36 | 0.616 |
| #3067 | LEGACY RECORDS | OTT 25% | 2 | 0.035 |
| #3760 | WARNER MUSIC GROUP | OTT 25% | 7 | 0.125 |
| | | | 73 | 1.250 |
| #327 | NAPSTER | OTT 10% | 73 | 0.500 |
| #104 | DREAM MILL MUSIC COMPANY | OTT 10% | 5 | 0.034 |

FIG. 17B ional-in-part of assignee's pending U.S. application Ser. No. 11/607,173, filed on Dec. 1, 2006, entitled "Media Management and Tracking," which is a continuation-in-part of assignee's pending U.S. application Ser. No. 11/261,687, filed on Oct. 28, 2005, entitled "Method and System for Tracking and Managing Rights for Digital Music," which is a continuation-in-part of assignee's pending U.S. application Ser. No. 10/893,473, filed on Jul. 16, 2004, entitled "Method and System for Managing Rights for Digital Music," which is a continuation-in-part of assignee's pending U.S. application Ser. No. 10/829,581, filed on Apr. 21, 2004, entitled "Portable Music Player and Transmitter," which is a continuation-in-part of assignee's U.S. application Ser. No. 10/336,443, now U.S. Pat. No. 7,191,193, filed on Jan. 2, 2003, entitled "Automatic Digital Music Library Builder."

CONTENT PROVISIONING AND REVENUE DISBURSEMENT

CROSS REFERENCE TO RELATED APPLICATIONS

This application is a continuat

FIELD

Embodiments of the present invention relate to provisioning and tracking of media content, and to revenue disbursement to content owners, content distributors, and parties involved in content provisioning.

BACKGROUND

Traditionally, content such as music and movies was packaged in physical media such as records and cassette tapes. Consumers were accustomed to convenience in enjoying content they purchased; they were able to access their content any time of day and were able to take their content with them wherever they traveled. Content was typically organized on shelves and accessed like books. With the advent of computers and digital content, content was packaged in storage media such as CDs, player devices and computer disks. CDs were organized on shelves and content stored in player devices and computer disks was organized as files and folders.

More recently with the advent of content streaming, consumers are now having content played to them as live broadcasts from content servers. The shift in paradigm from physically packaged content to content that is not stored on a consumer device, but instead streamed for playing, has been largely perceived by consumers as limiting. Despite the advantage of having access to enormous collections of content stored on content servers, consumers still prefer to have something physical in hand with content stored thereon, be it a CD or a player device or a computer.

Consumer preference to have content physically in hand is a carryover from the tradition of the home being a consumer's central archive, where he enjoys his music and from where he takes the music of his choice with him when he is away from the home. In order to attract a consumer to the idea of remote content servers being his archive, in addition to or instead of his home, compelling new services must be offered that surpass the traditional services.

SUMMARY OF THE DESCRIPTION

Embodiments of the present invention concern a global content service that provisions content to consumers, provides access to their content wherever the consumers are located, organizes their content, enforces rights management to content, tracks content usage, and disburses revenue to content providers, content distributors, content aggregators and other vendors in the purchase and supply chains. Content, as used herein, includes inter alia music, video, books and games.

In a broad perspective, embodiments of the present invention generate a data structure that serves as a registry, whereby details of each piece of content acquired by a consumer from any of a plurality of sources is recorded, and content acquired by members of a common household is aggregated. In accordance with embodiments of the present invention, consumers are associated with households even when consumer and household data is obtained from disparate sources that may not provide identical data. Additionally, content subscriptions acquired by the consumer and the consumer's family are also recorded in the registry. Content and content subscriptions may be acquired at distributor stores, at kiosks, on-line via Internet e-commerce web sites, via cable and satellite stations, via peer-to-peer file sharing applications, and wirelessly over the air. Content may also be acquired from recorder devices. In accordance with embodiments of the present invention, content is registered even if the content metadata is obtained from different sources that may not be identical.

Similarly, each player and recorder device purchased by the consumer is recorded in the registry. Player devices, as used herein, include inter alia home entertainment systems, mobile phones, portable player devices, and automobile decks. Recorder devices, as used herein, include inter alia home entertainment systems, computers, audio recorders, video recorders and digital television recorders. As such, the registry registers all content available to the consumer and to the consumer's family members, and registers all content players and recorders owned by the consumer and by the consumer's family members.

On the supply side, for each piece of content recorded in the registry, a list of content aggregators that supply the piece of content is indicated. As such, the data structure identifies all sources from which the consumer and his family members can access the content for which they have rights.

Embodiments of the present invention enable the consumer to access his content from his home and from many locations away from his home, including inter alia automobiles and other vehicles, hotels and resorts, and offices. In one embodiment of the present invention, a mobile consumer, who is away from home, accesses and navigates his content and his content playlists, using his cellular telephone, and selects content to be played. The selected content is streamed to an embedded player in the consumer's cellular telephone upon demand, from one or more content servers.

In general, for each piece of content requested by the consumer to be played on a specific player device, an appropriate supply source is identified, based on the player device, based on the consumer's location, based on the requested content, and based on rules defined for the requested content regarding specific supply sources; and the content is delivered to the consumer from the supply source. Embodiments of the present invention ensure that the content is delivered to the consumer in a format and at a bandwidth compatible with the specific player device, the player device software, and the player device Internet connection. Embodiments of the present invention also enforce rights management by authenticating each consumer vis a vis the content that he currently has rights to.

On the disbursement side, embodiments of the present invention track the consumer's usage of content, and generate a log of content usage for purposes of revenue disbursement.

At the end of each payment period, fees paid by the consumer, fees paid by advertisers, and other fees paid into the service are allocated among various content owners, distributors, aggregators and other stakeholders in the purchase and supply chains, based on the usage log, and accounting reports are generated for each stakeholder.

In accordance with an embodiment of the present invention, content associations are identified, whereby a first piece of content is a trigger for purchase of a second piece of content. For example, a consumer playing a movie on his set-top cable box may decide to purchase a soundtrack for the movie. The movie is thus associated with the soundtrack. In turn, revenue generated by the soundtrack is shared with stakeholders for the movie.

Embodiments of the present invention may also be used advantageously for tracking usage and for merchandising. A first consumer, for example, who purchases a piece of content, may wish to share the content with friends. The content is shared from person to person along a sharing chain of friends, one friend sharing with the next friend. The content may be shared using digital copies of the content, or the content may be shared virtually. The shared copies may be trial copies, which can only be accessed in limited ways. Some or all of the friends along the chain may eventually purchase their own copy of the content, converting it from a trial copy to an owned copy. Using an embodiment of the present invention, when such a friend purchases a license to convert a shared trial copy of the content into an owned copy, information as to the original source of purchase as well as the friend's usage is tracked. This information can be used, inter alia, to allot a portion of the payment received from the friend to the original source of purchase, and to aggregate usage and purchase statistics.

There is thus provided in accordance with an embodiment of the present invention a method for provisioning content to users, including for each of a plurality of items of media content, maintaining information about one or more owners of the item of media content, and maintaining information about one or more providers of the item of media content, for each of a plurality of users, maintaining information about items of media content acquired by the user and about player devices owned by the user, for each of a plurality of time periods, maintaining a history log of items of media content played by one or more of the plurality of users during the time period, receiving a request from a user to play a designated item of media content on a designated player device, during a current time period, identifying an appropriate provider of the designated item of media content, according to a location of the user and according to the designated player device, causing the identified provider of the designated item of media content to transmit the designated item of media content to the user's designated player device, updating the history log for the current time period to reflect the user having played the designated item of media content, and calculating revenue disbursement among the owners of the plurality of items of media content, and the providers of the plurality of media content, for the current time period, based on the history log of the current time period.

There is additionally provided in accordance with an embodiment of the present invention a content provisioning system, including a data manager for storing (i) for each of a plurality of items of media content, information about owners of the media content and providers of the media content; (ii) for each of a plurality of users, information about items of media content acquired by the user and about player devices owned by the user; and (iii) for each of a plurality of time periods, a history log of items of media content played by one or more of the plurality of users during the time period; a receiver for receiving a request from a user to play a designated item of media content on a designated player device, during a current time period; a content provisioner coupled with the data manager (i) for identifying an appropriate provider of the designated piece of media content according to a location of the user and according to the designated player device, and (ii) for causing the identified provider of the designated item of media content to transmit the designated item of media content to the user's designated player device; and a disbursement manager coupled with the content provisioner and with the data manager (i) for updating the history log for the current time period to reflect the user having played the designated item of media content, and (ii) for calculating revenue disbursement among the owners of the plurality of items of media content, and the providers of the plurality of items of media content, for the current time period, based on the history log for the current time period.

There is further provided in accordance with an embodiment of the present invention a method for tracking usage of content, including tracking, for each of a plurality of consumers and for each of a plurality of content owners, each content owner owning a plurality of items of media content, the relative frequency of the number of items of media content owned by the content owner and played by the consumer during a specified time period, relative to the total number of times the consumer plays items of media content during the specified time period, and generating a revenue report for each of the plurality of content owners with revenue allocation for the specified time period, based on the relative frequencies tracked by the tracking.

There is yet further provided in accordance with an embodiment of the present invention a content usage tracking system, including a tracking computer for tracking, for each of a plurality of consumers and for each of a plurality of content owners, each content owner owning a plurality of items of media content, the relative frequency of the number of items of media content owned by the content owner and played by the consumer during a specified time period, relative to the total number of times the consumer plays items of media content during the specified time period, and a disbursement manager for deriving revenue allocation for each of the plurality of content owners for the specified time period, based on the relative frequencies tracked by the tracking computer.

There is moreover provided in accordance with an embodiment of the present invention a method for tracking usage of content, including tracking, for each of a plurality of consumers and for each of a plurality of content owners, each content owner owning a plurality of items of media content, the relative amount of time spent by the consumer during a specified time period playing items of media content owned by the content owner, relative to the amount of time spent by the consumer playing items of media content during the specified time period, and generating a revenue report for each of the plurality of content owners with revenue allocation for the specified time period, based on the relative amounts of time tracked by the tracking.

There is additionally provided in accordance with an embodiment of the present invention a content usage tracking system, including a tracking computer for tracking, for each of a plurality of consumers and for each of a plurality of content owners, each content owner owning a plurality of items of media content, the relative amount of time spent by the consumer during a specified time period playing items of media content owned by the content owner, relative to the amount of time spent by the consumer playing items of media content during the specified time period, and a disbursement manager for deriving revenue allocation for each of the plurality of content owners for the specified time period, based on the relative amounts of time tracked by the tracking computer.

There is further provided in accordance with an embodiment of the present invention a method for content provisioning, including identifying media content stored on at least one of a consumer's media devices, generating a content registry of the consumer's media content identified by the identifying, generating a device registry of the consumer's media devices, generating a list of media content IDs for identifying versions of media content at one or more content suppliers, corresponding to content listed within the content registry, and for determining an appropriate source from which to transmit a designated version of media content to a designated media device from the device registry, in response to a request for media content issued by the consumer.

There is yet further provided in accordance with an embodiment of the present invention a content provisioning system, including a content identifier for identifying media content stored on at least one of a consumer's media devices, a registrar, coupled with the content identifier, for generating a content registry of the consumer's media content identified by the content identifier, and a device registry of the consumer's media devices, a content mapper, coupled with the registrar, for generating a list of media content IDs for identifying versions of media content at one or more content sources, corresponding to media content listed within the content registry, and a content router, coupled with the registrar and with the content mapper, for determining an appropriate source from which to transmit a designated version of media content to a designated media device from the device registry, in response to a request for media content issued by the consumer.

There is moreover provided in accordance with an embodiment of the present invention a method for provisioning content to users, including for each of a plurality of items of media content: maintaining information about one or more owners of the item of media content, and maintaining information about one or more providers of the item of media content; for each of a plurality of users: maintaining information about items of media content acquired by the user and about player devices owned by the user; for each of a plurality of time periods: maintaining a history log of items of media content played by one or more of the plurality of users during the time period; receiving a request from a user to play a designated item of media content that is resident locally on a designated player device, during a current time period; updating the history log for the current time period to reflect the user having played the designated item of media content; and calculating revenue disbursement among the owners of the plurality of items of media content, and the providers of the plurality of media content, for the current time period, based on the history log for the current time period.

There is additionally provided in accordance with an embodiment of the present invention a content provisioning system, including a data manager for storing (i) for each of a plurality of items of media content, maintaining information about owners of the media content and providers of the media content, (ii) for each of a plurality of users, maintaining information about items of media content acquired by the user and about player devices owned by the user, and (iii) for each of a plurality of time periods, maintaining a history log of items of media content played by one or more of the plurality of users during the time period; a receiver for receiving a request from a user to play a designated item of media content that is resident locally on a designated player device, during a current time period; and a disbursement manager coupled with the data manager (i) for updating the history log for the current time period to reflect the user having played the designated item of media content, and (ii) for calculating revenue disbursement among the owners of the plurality of items of media content, and the providers of the plurality of items of media content, for the current time period, based on the history log for the current time period.

BRIEF DESCRIPTION OF THE DRAWINGS

Embodiments of the present invention are illustrated by way of example and not limitation in the figures of the accompanying drawings, in which like references indicate similar elements, and in which:

FIG. 17B is an illustration of an accounting report for distributing the share allocated in FIG. 17A to the content owners, among a plurality of content owners, in accordance with an embodiment of the present invention;

DETAILED DESCRIPTION

Figure 1:
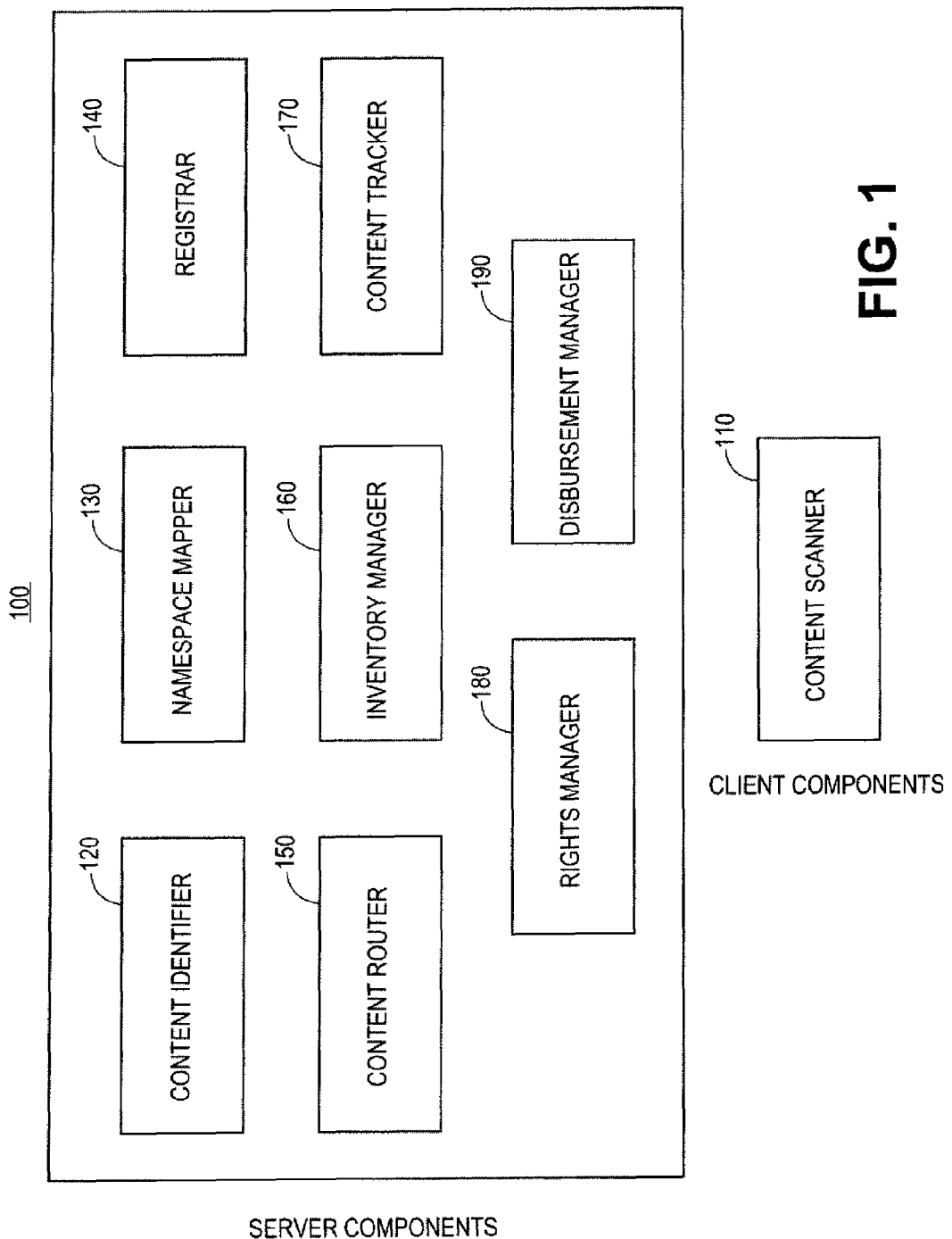
FIG. 1 is a simplified block diagram of eleven components of a content provisioning and revenue disbursement system, in accordance with an embodiment of the present invention.

Embodiments of the present invention provide an end-to-end media content provisioning system that enables a consumer to access his entire content collections and subscriptions, at any location where he may be. From the consumer's perspective, he has access to a virtual replica of his content archive, his content broadcast stations, and his content playlists, at his home, in his car, in his hotel room, and wherever he travels. His content archive is presented to him in an organized way for browsing and for access via any of a plurality of player devices, including inter alia his home entertainment systems, his media players, his cell phones, his automobile deck, a rented automobile deck, and a hotel in-room entertainment system.

The following definitions are employed throughout the specification.

CONTENT—digital media including inter alia music, video, books and games.

CONTENT MAPPING—determining for a designated piece of content and for a designated content media format, one or more IDs for uniquely identifying the designated piece of content.

CONTENT ROUTING—determining an appropriate source from which to transmit designated content to a player device.

MEDIA SERVER—a computer server that archives and provisions media.

NAMESPACE—a range of identifiers that are associated uniquely with items, where items may be inter alia media content, player devices, consumers and households.

PLAYER DEVICE—a media player including inter alia home entertainment systems, mobile phones, portable media players, software applications such as PC applications, and automobile decks.

PLAYLIST—a sequence of pieces of content for playing on a player device.

RECORDER DEVICE—a media recorder, including inter alia home entertainment systems, computers, audio recorders, video recorders and digital television recorders.

REGISTRY—a central data store where users' inventories are listed.

TRACKING SERVER—a computer server that tracks content-related events, including inter alia playbacks and purchases.

Consumers typically build themselves personal libraries of digital content, which are stored on memory units such as hard disk drives and removable memory cards. Digital content may be acquired through the Internet via subscription services and a la carte purchases, via peer-to-peer exchanges, and by converting songs from a compact disc (CD) and importing them into a content library.

Licenses for digital content may be acquired through several channels, including, inter alia, (i) content purchased at a retail outlet store;

(ii) content purchased via the Internet from an online retailer;

(iii) content recorded onto a recorder device from broadcast, off-the-air;

(iv) content purchased through a recorder device from a licensing authority; and (v) content purchased through a player device from a media kiosk.

Content for preview may be licensed from these same channels.

Digital content typically includes media data and auxiliary data, referred to as metadata, used to index the content within the consumer's library. For example, within MP3 audio files metadata is accessed through an ID3 tag, WMA audio files embed metadata within the files, and both file types can embed metadata within the filenames themselves. By indexing his content, a consumer can browse his library, search his library to find and access individual content therein, remove content and create playlists. Generally, player devices provide a user interface through which consumers view content metadata.

Reference is made to FIG. 1, which is a simplified block diagram of nine components of a content provisioning and revenue disbursement system 100, in accordance with an embodiment of the present invention. The components shown in FIG. 1 may be implemented in one or more server computers, in one or more client computers, or in both one or more server computers and one or more cooperating client computers. Operation of each component is described in detail hereinbelow. For ease of reference, the following table summarizes the Figures and the components of FIG. 1 that they relate to.

TABLE I

Summary of Figures and components that they relate to

Figure 2:
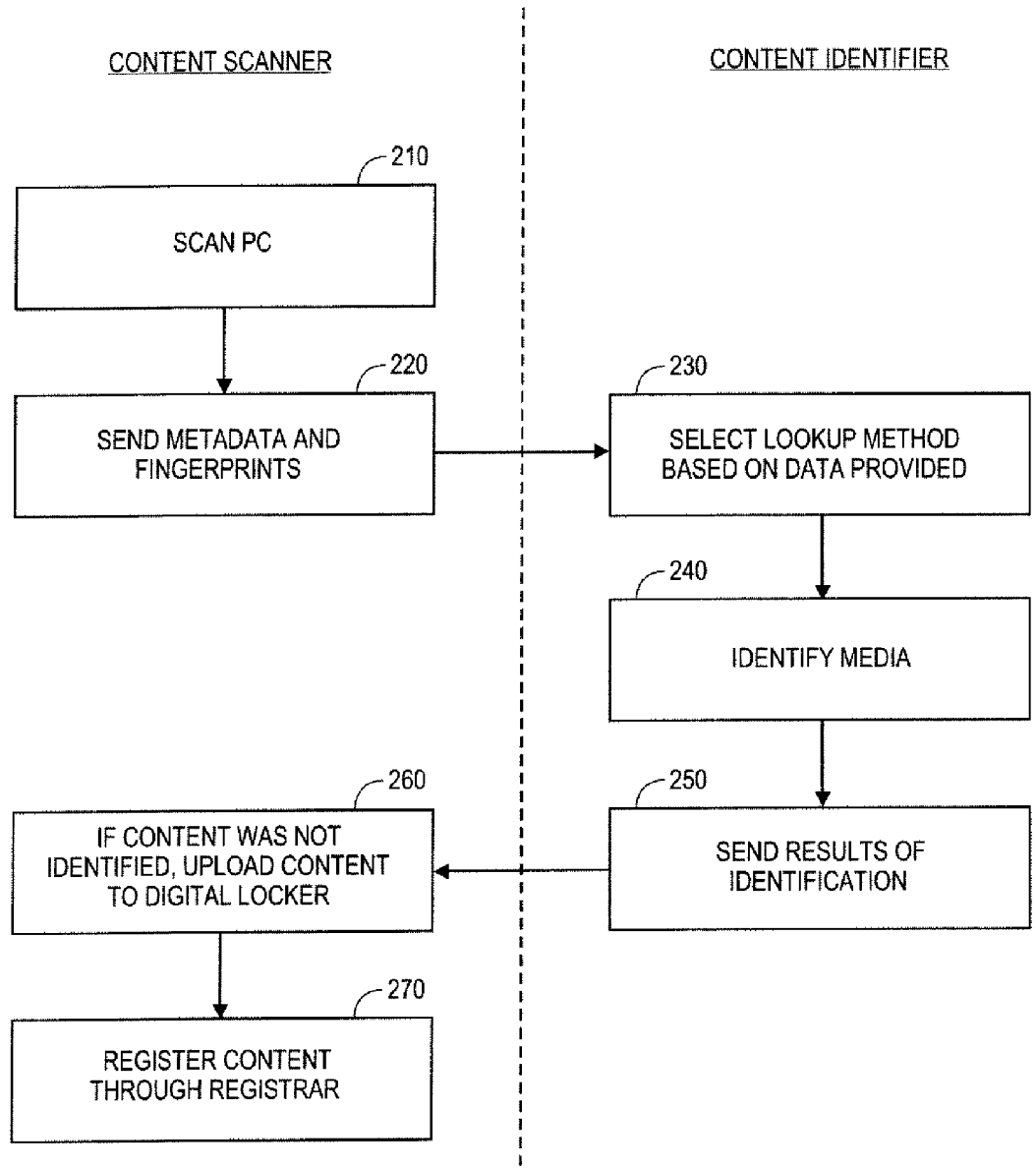
FIG. 2 is a simplified flowchart of a process for content identification, in accordance with an embodiment of the present invention.
Figure 3:
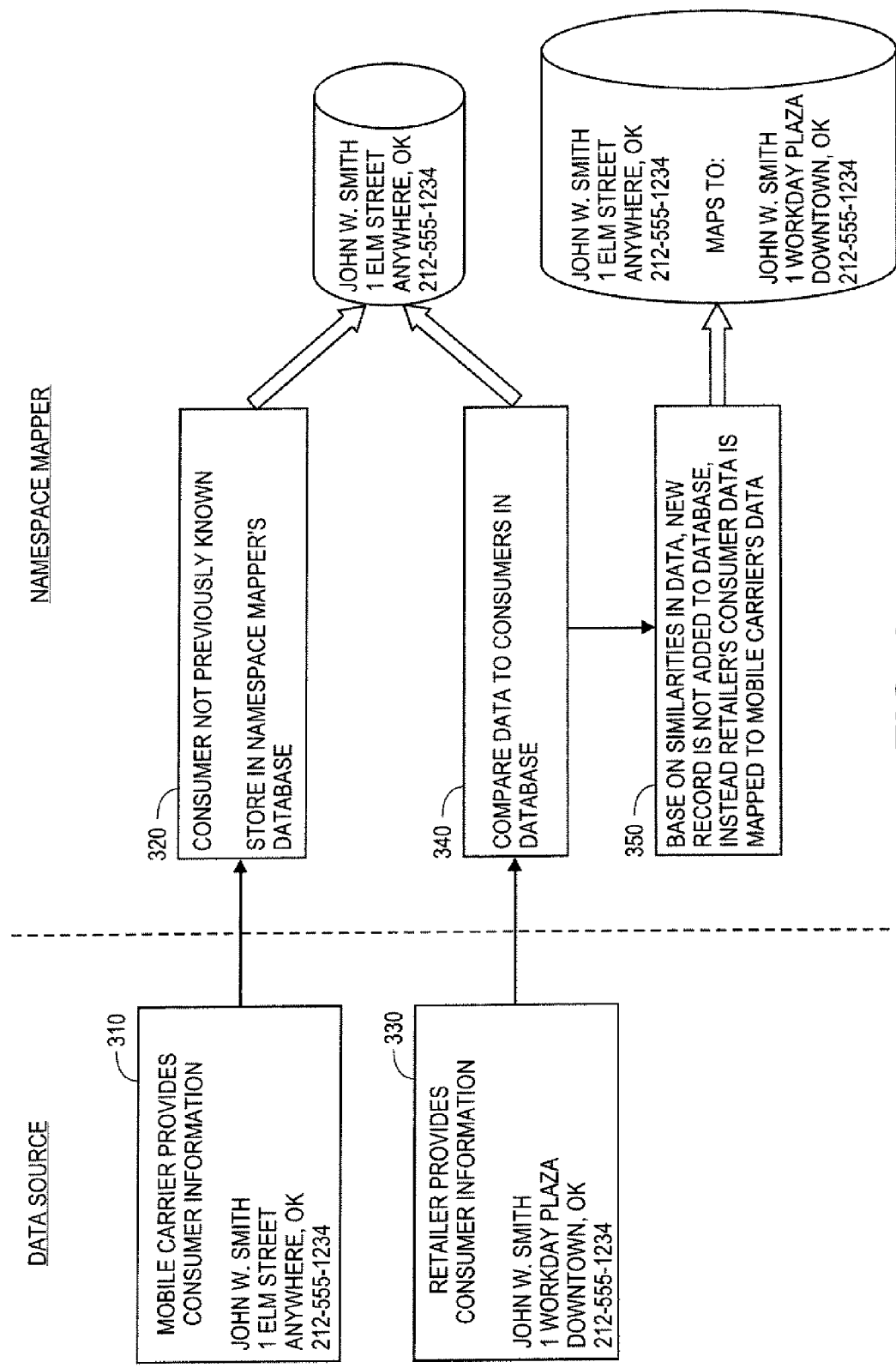
FIG. 3 is a simplified flowchart of a process for mapping consumer data to a consumer namespace, in accordance with an embodiment of the present invention.
Figure 4:
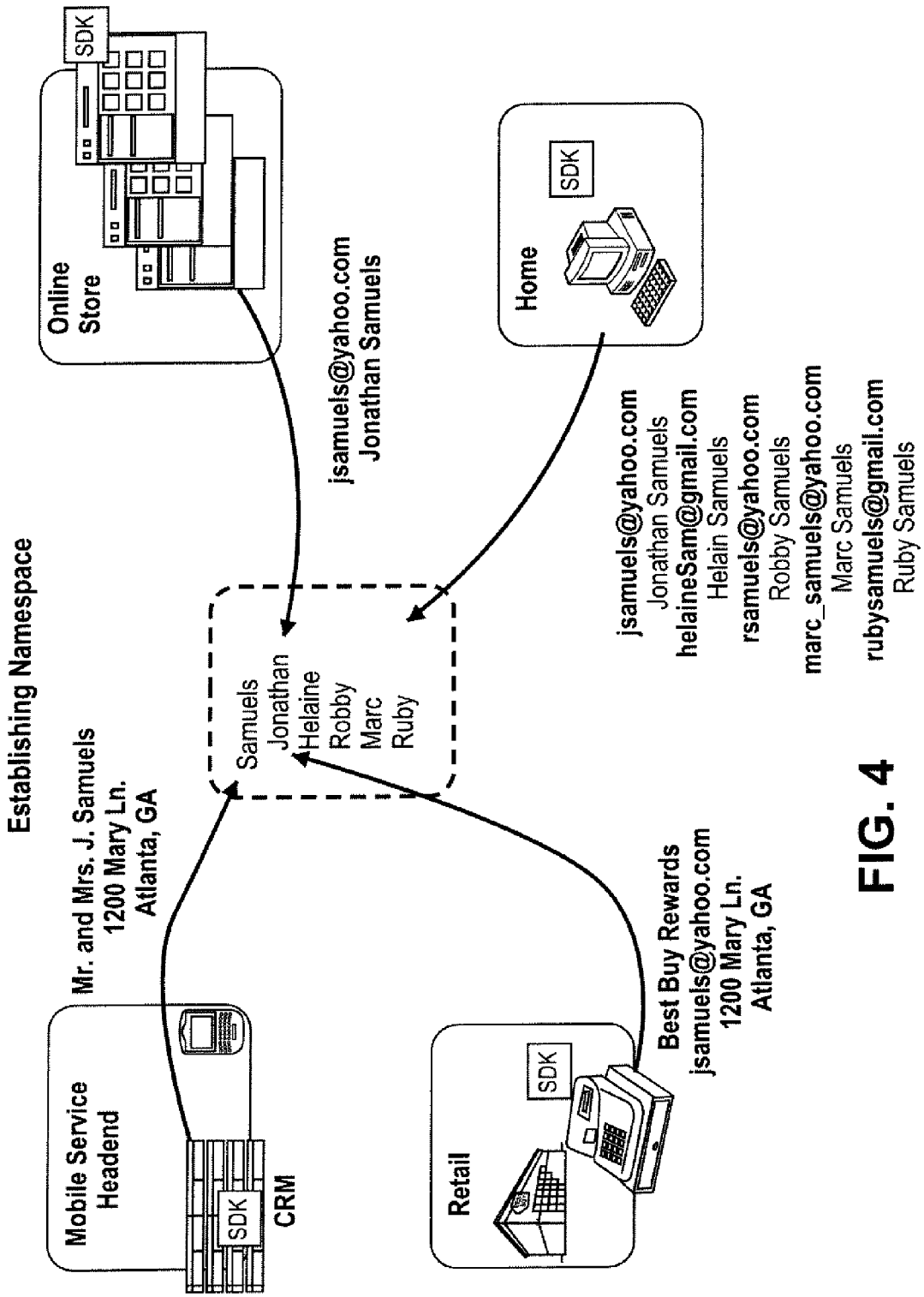
FIG. 4 is a diagram illustrating namespace mapping for a consumer, in accordance with an embodiment of the present invention.
Figure 5:
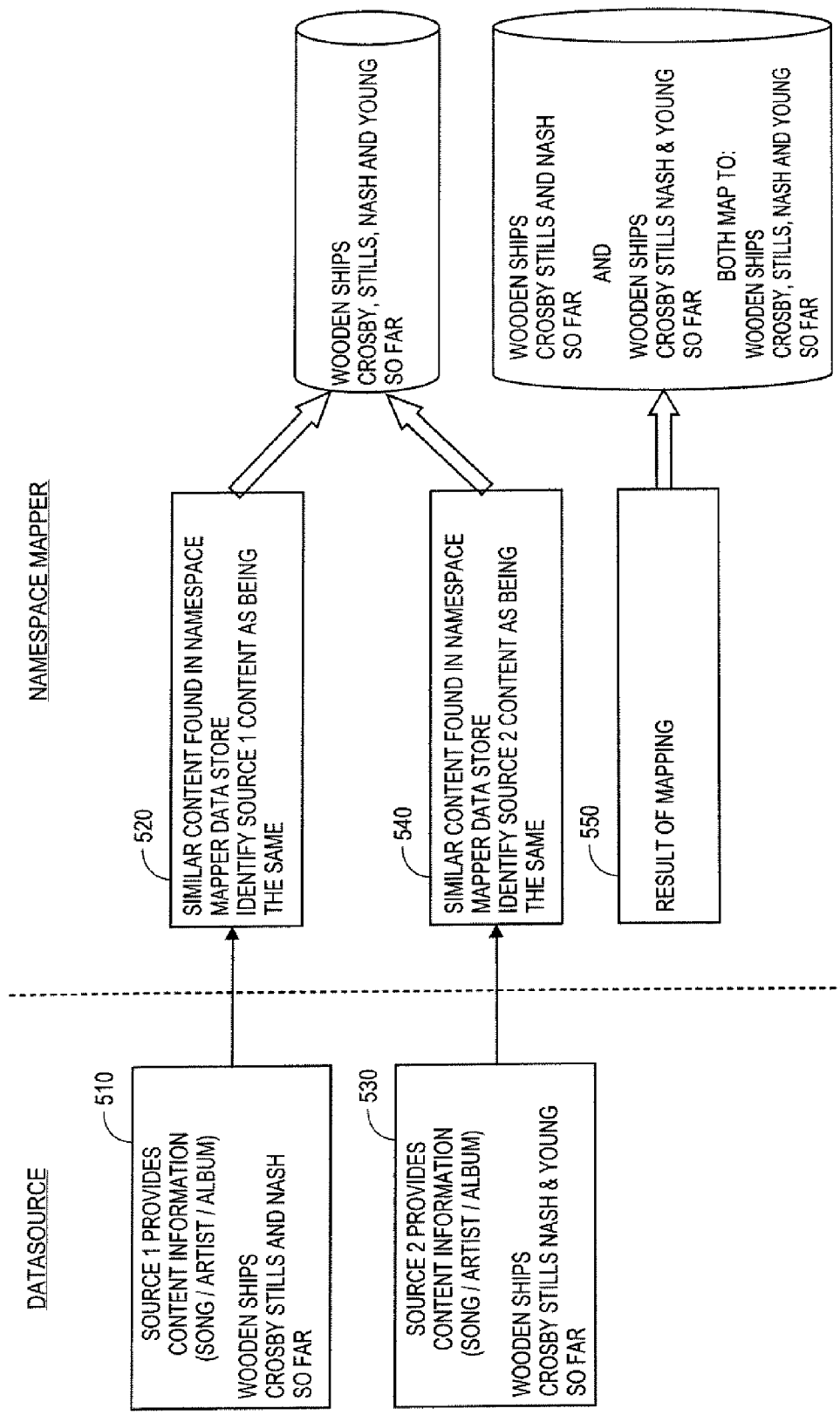
FIG. 5 is a simplified flowchart for a process of mapping content data to a content namespace, in accordance with an embodiment of the present invention.
Figure 8A:
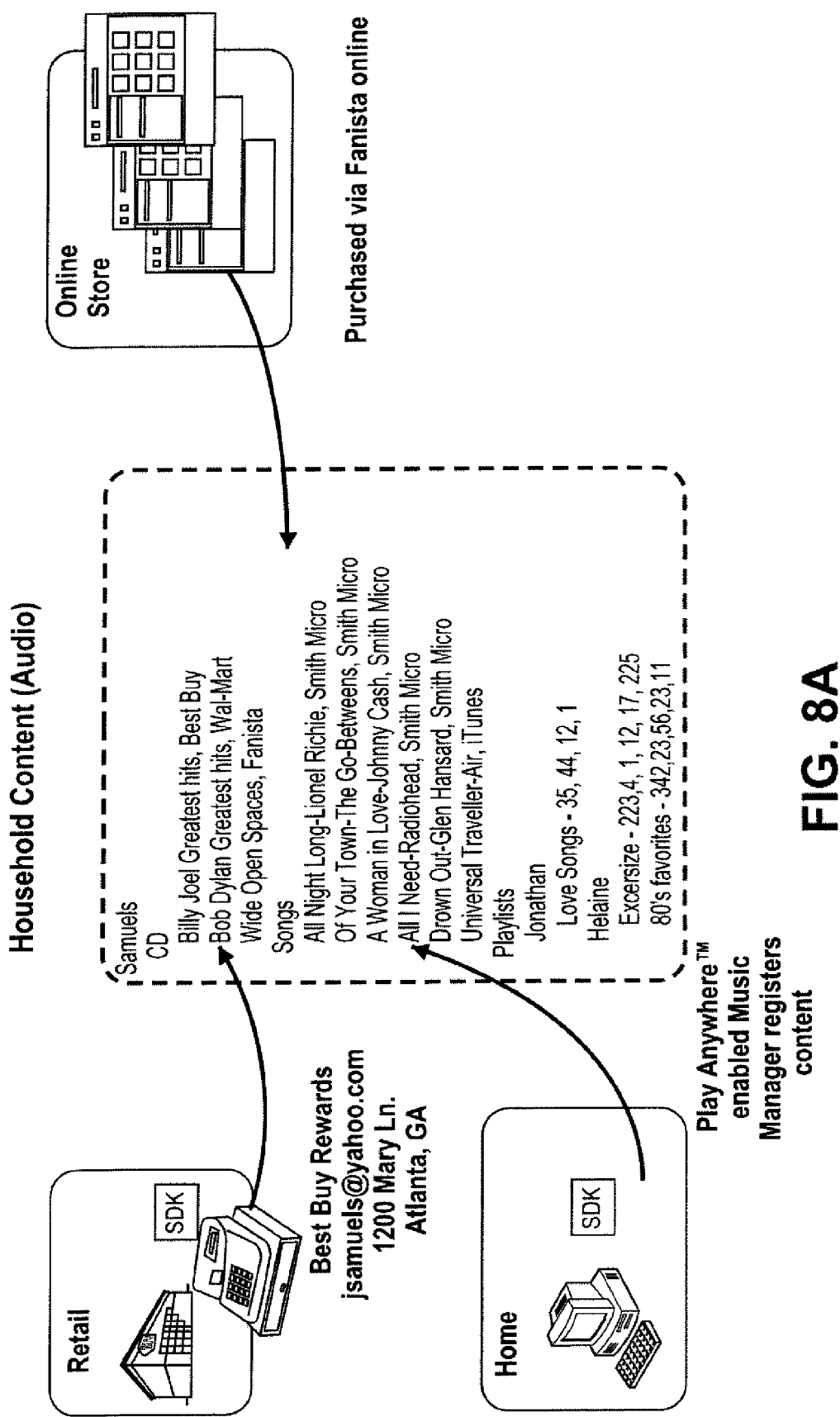
FIGS. 8A and 8B are diagrams illustrating registration of a household's music and videos, respectively, in accordance with an embodiment of the present invention.
Figure 8B:
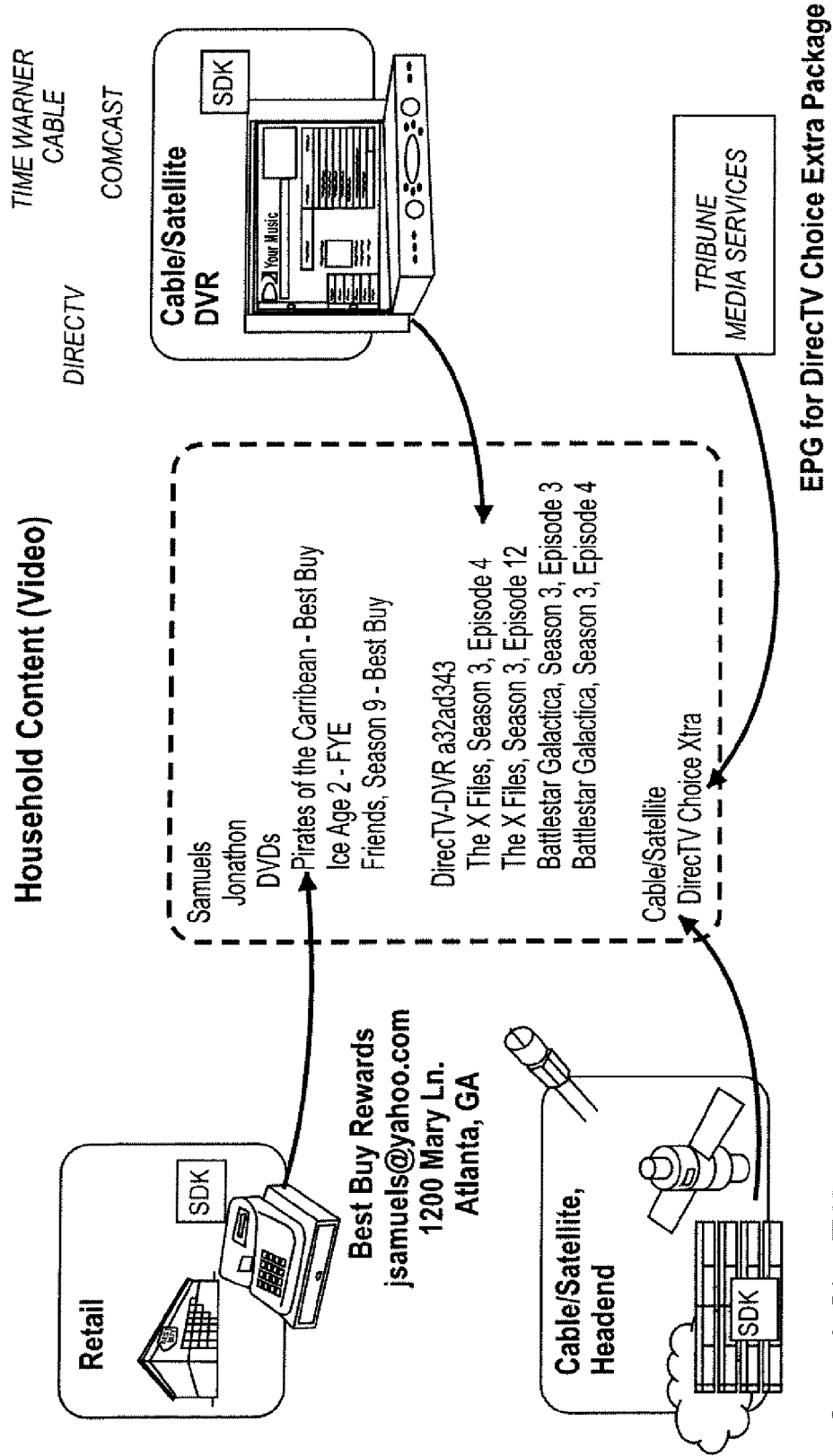
Figure 9:
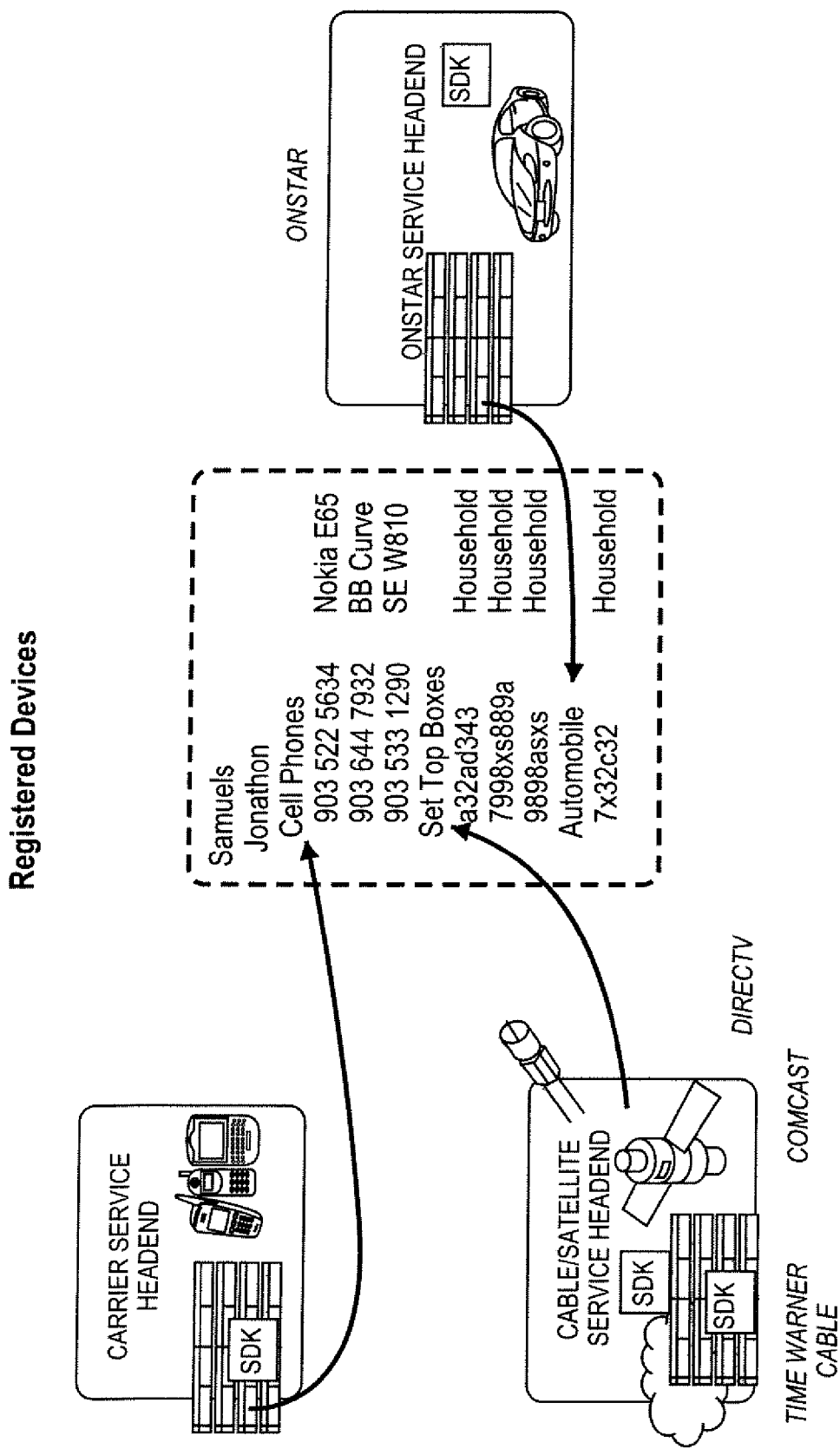
FIG. 9 is a diagram illustrating registration of household player devices, in accordance with an embodiment of the present invention.
Figure 10:
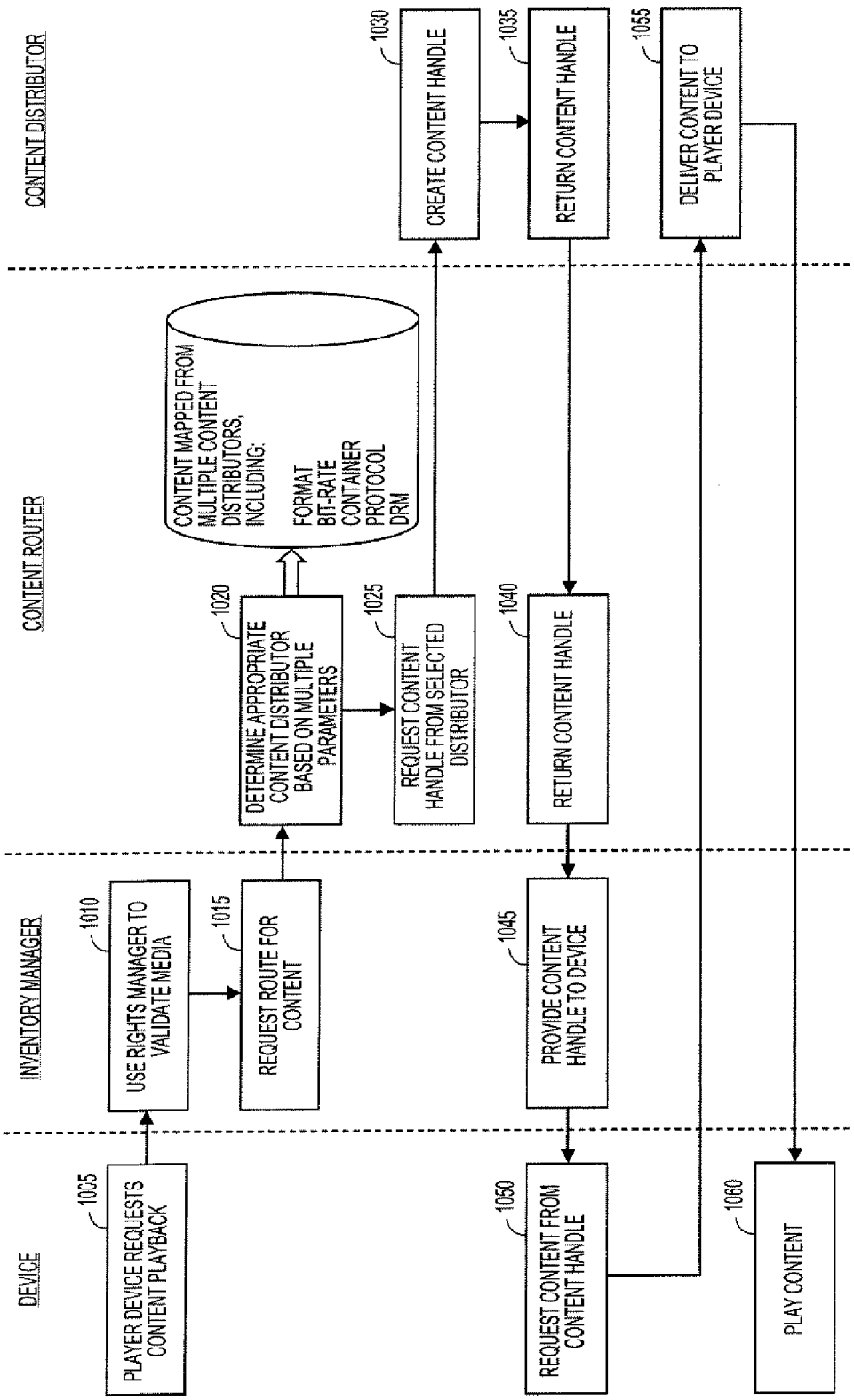
FIG. 10 is a simplified flowchart for a process of content routing and media playback, in accordance with an embodiment of the present invention.
Figure 11:
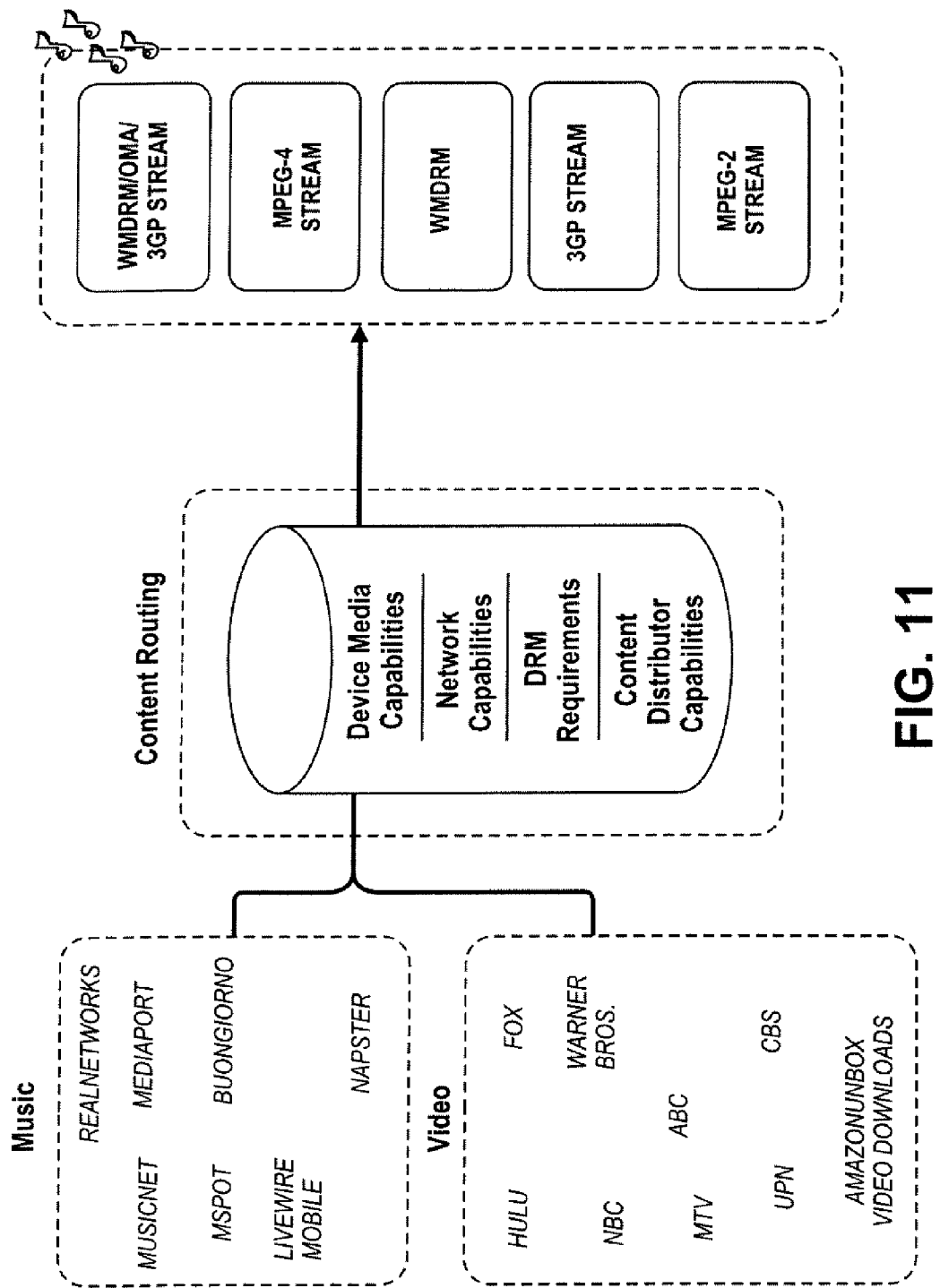
FIG. 11 is a diagram illustrating music and video content routing from a multitude of content providers to a multitude of player devices, in accordance with an embodiment of the present invention.
Figure 12:
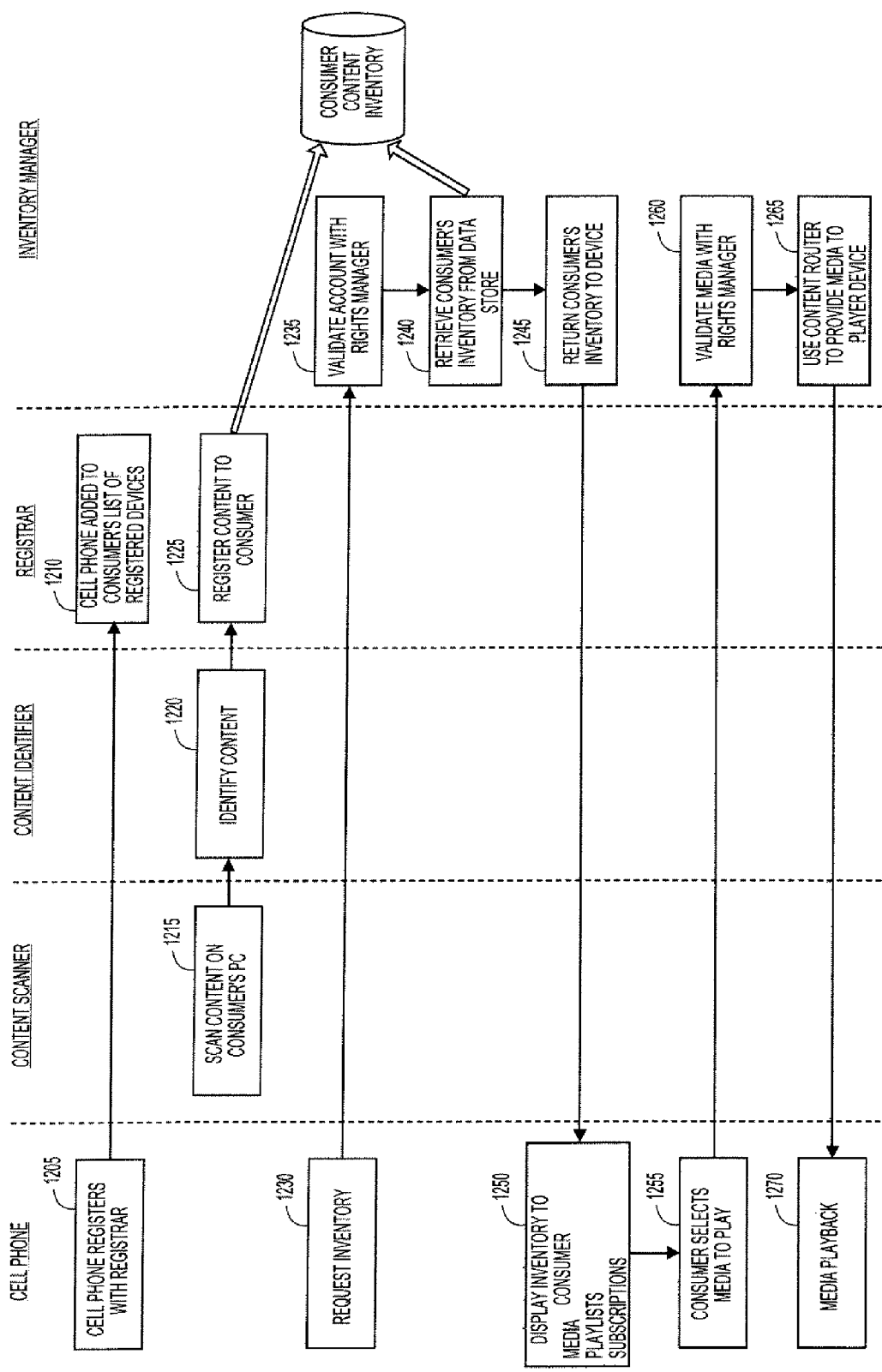
FIG. 12, which is a simplified flowchart of a process of registering a consumer's inventory, retrieval and display of inventory on a player device, and playback of media on a player device, in accordance with an embodiment of the present invention.
Figure 13:
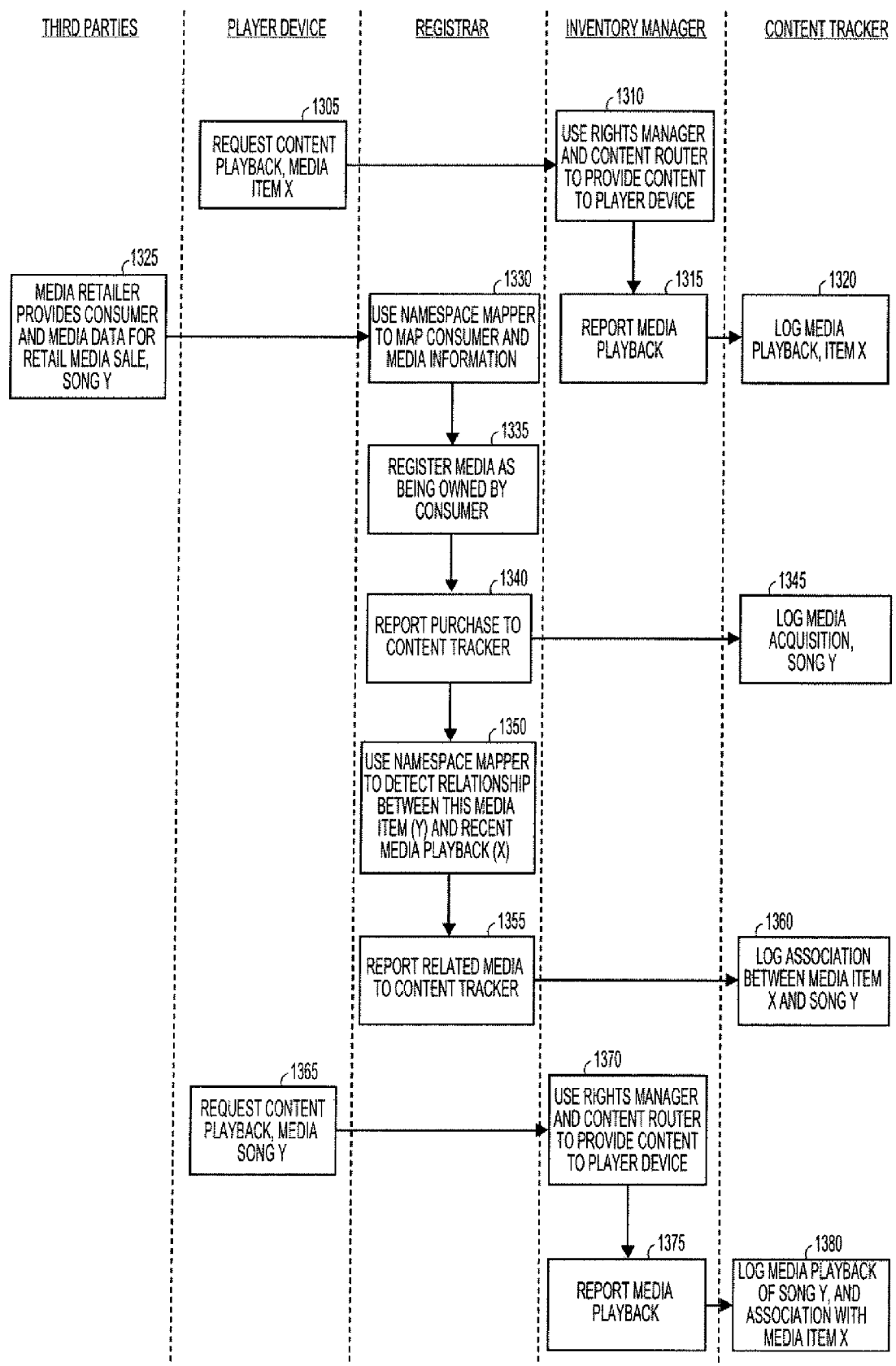
FIG. 13 is a simplified flowchart of a process of tracking consumer acquisition of media, playback of media, and associations between media items, in accordance with an embodiment of the present invention.
Figure 14:
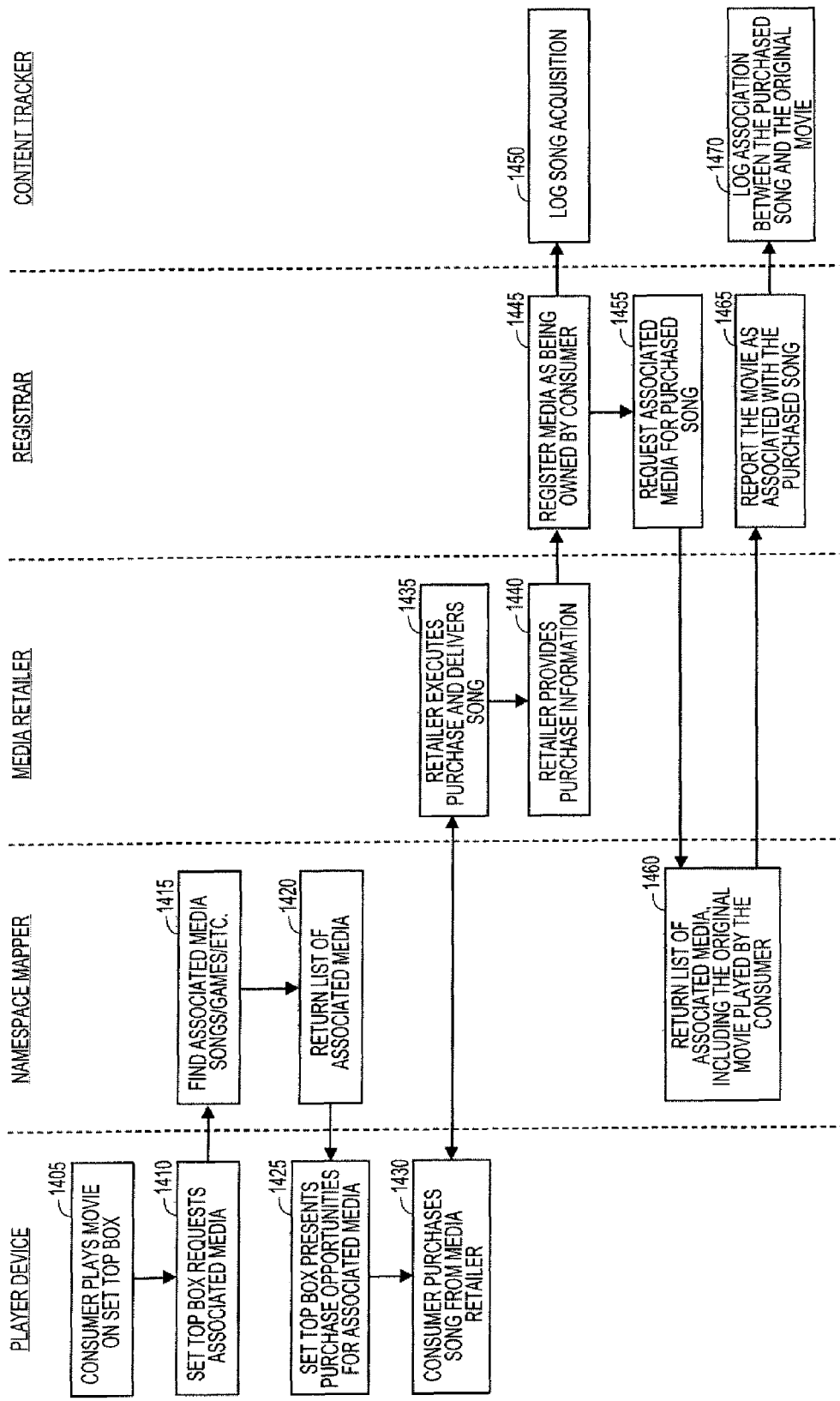
FIG. 14 is a simplified flowchart of a process of associating items of media with one another, in accordance with an embodiment of the present invention.
Figure 15:
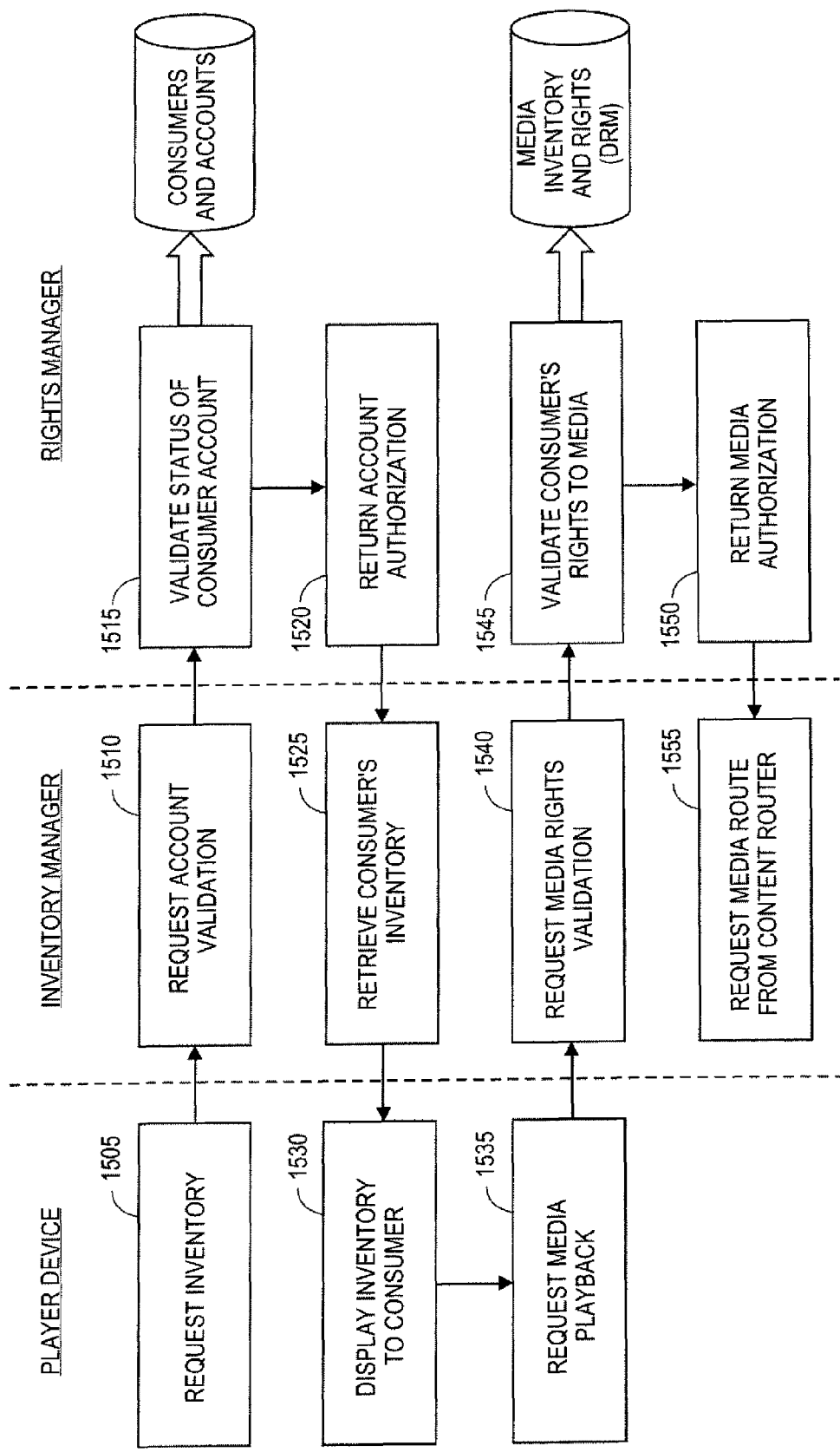
FIG. 15 is a simplified flowchart of a process of validating and enforcing consumer rights to media, in accordance with an embodiment of the present invention.
Figure 16:
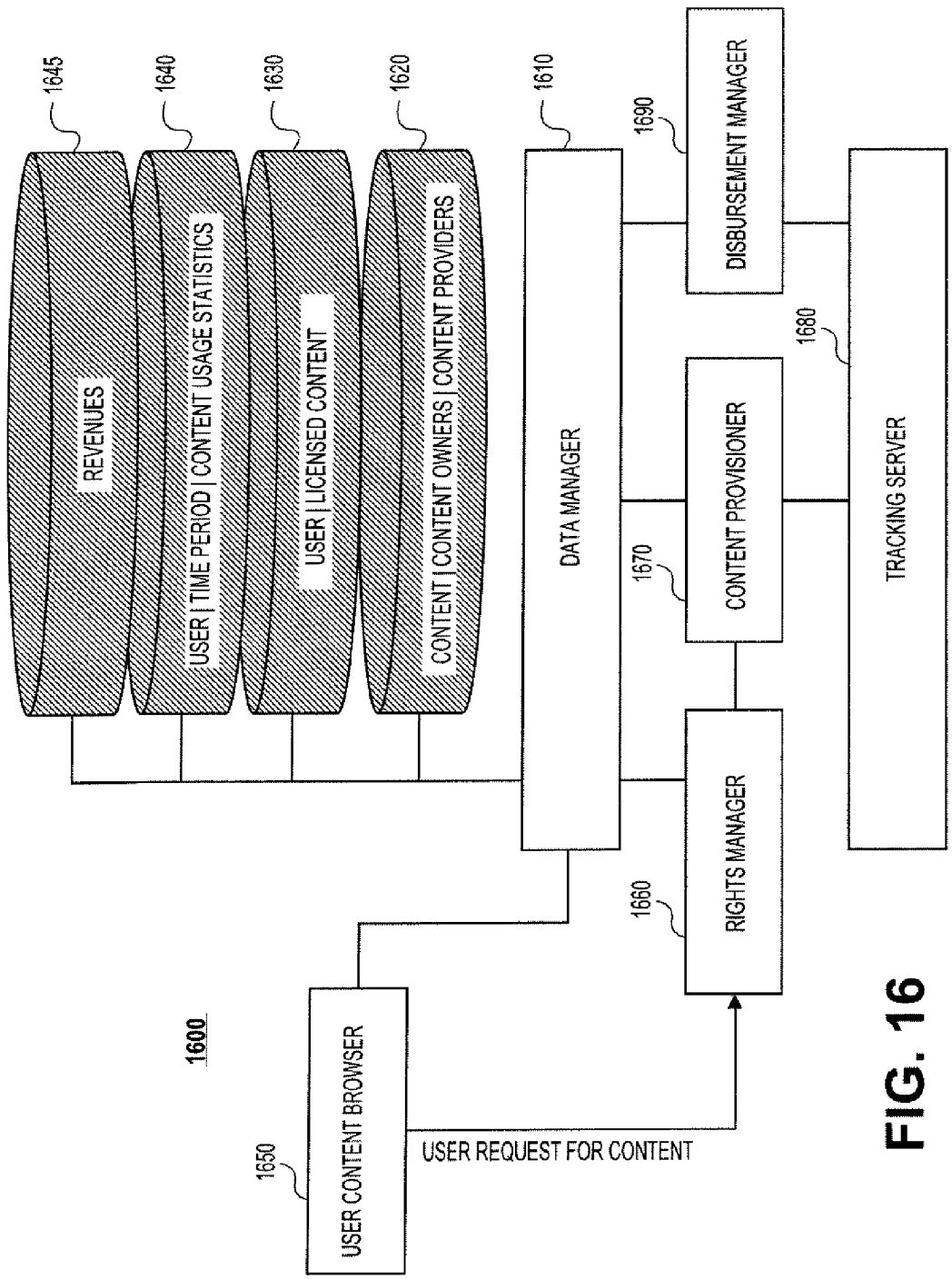
FIG. 16 is a simplified block diagram of a content provisioning and subscription revenue disbursement system, in accordance with an embodiment of the present invention.
Figure 17A:
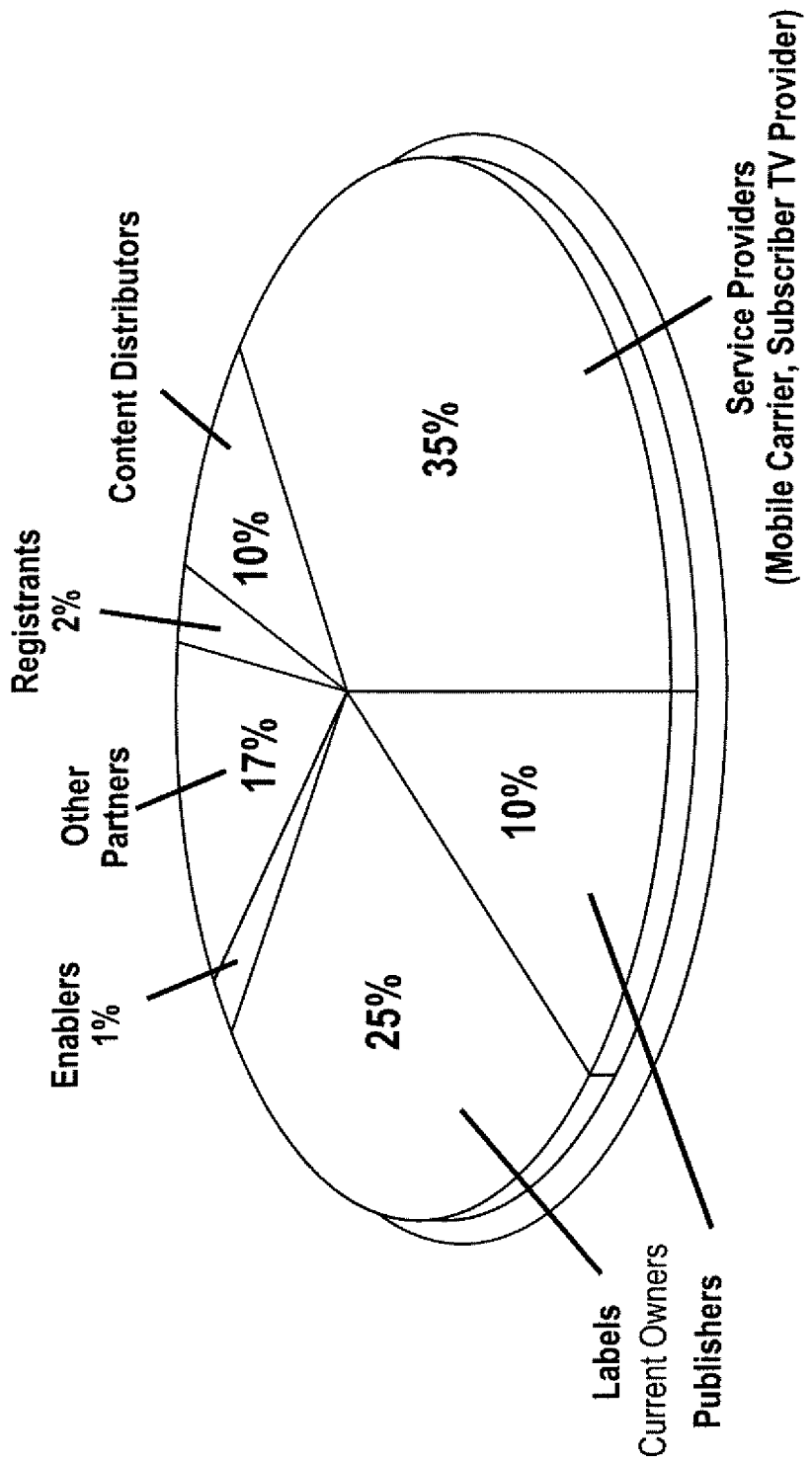
FIG. 17A is a diagram illustrating subscription revenue sharing between content owners, content distributors, service providers and registrants, in accordance with an embodiment of the present invention.
Figure 18:
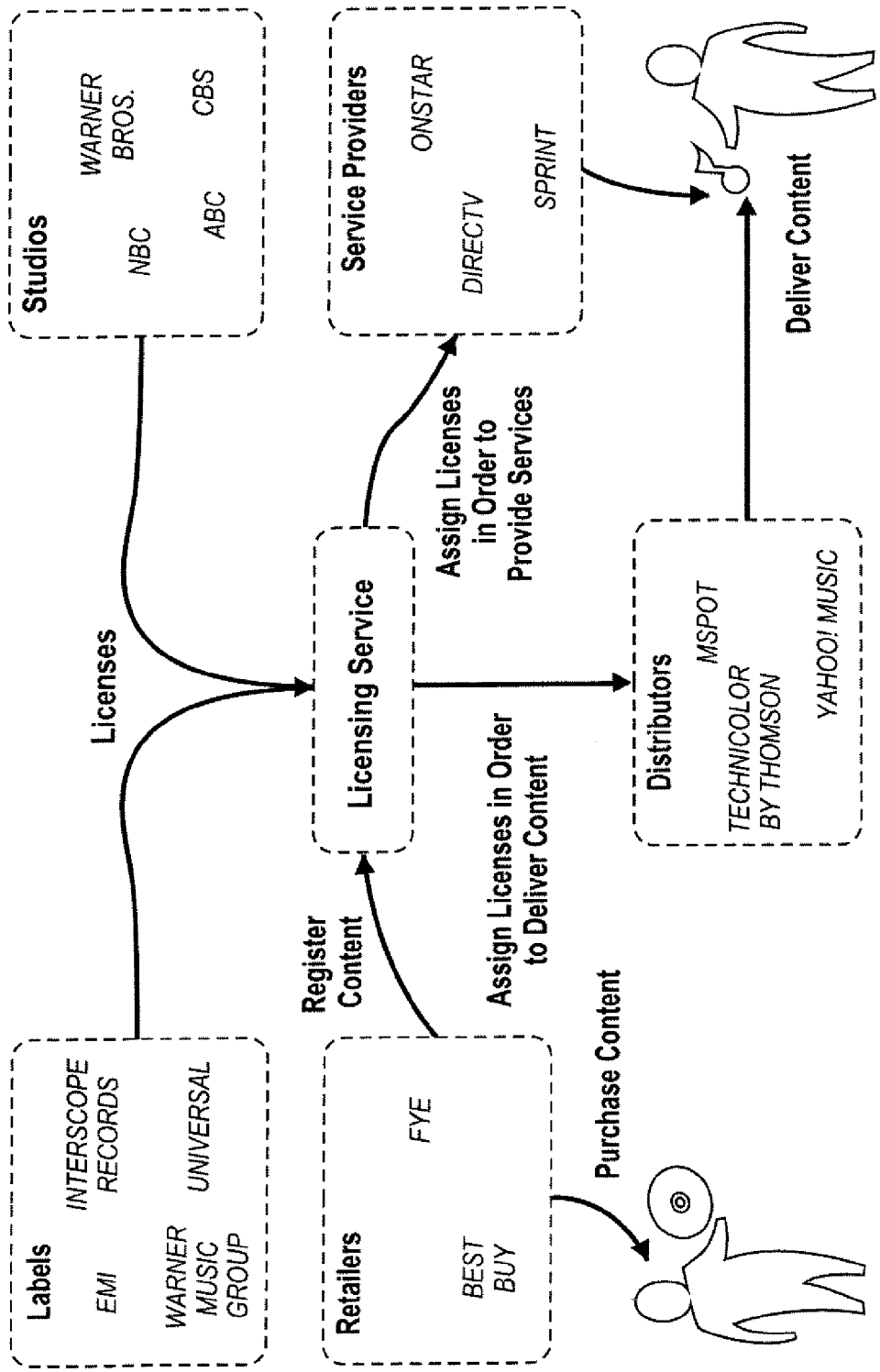
FIG. 18 is a summary diagram of vendors in the content purchase and supply chain, integrated within a content licensing service, in accordance with an embodiment of the present invention.

| Component | Figure(s) |
| --- | --- |
| Content Scanner 110 | FIG. 2 |
| Content Identifier 120 | FIG. 2 |
| Namespace Mapper 130 | FIGS. 3-5 |
| Registrar 140 | FIGS. 6-9 |
| Content Router 150 | FIGS. 10 and 11 |
| Inventory Manager 160 | FIG. 12 |
| Content Tracker 170 | FIGS. 13 and 14 |
| Rights Manager 180 | FIG. 15 |
| Disbursement Manager 190 | FIGS. 16-18 |

Content Scanner 110

Shown in FIG. 1 is a content scanner 110, which locates applicable media on a consumer's devices, including the consumer's content archive, playlists and content subscriptions. Content scanner 110 is generally implemented on a home PC.

Content scanner 110 scans the consumer's PCs to generate a list of IDs of content resident thereon. Content scanner 110 also scans the consumer's PCs for media archives, such as iTunes databases, Windows Media Player databases, Napster databases and other such player databases, and for media playlists. Content scanner 110 also scans the consumer's PCs for podcasts that the consumer subscribes to and Internet radio station preferences.

Content scanner 110 sends scanned content information to content identifier 120, to identify or validate the identity of the scanned content. Content scanner 110 may send content metadata, or an excerpt of content, or content fingerprints, to content identifier 120.

With each content ID, content scanner 110 also determines a content status, including inter alia digital rights management data for the content, and time constraints for the content. Content scanner 110 verifies that digital rights managed content have valid licenses.

Content scanner 110 may additionally transmit content to a data store, referred to as a "digital locker", which acts as a remote backup of the consumer's content.

Content Identifier 120

Shown in FIG. 1 is a content identifier 120, which identifies an aggregate of a consumer's entire content archive and content broadcast subscriptions. Content identifier 120 is generally implemented on a server computer. After content scanner 110 scans a consumer's PC to identify his media libraries, playlists and subscriptions, content scanner 110 sends the results to content identifier 120. Content identifier 120 identifies or validates identities of the scanned content. Content identifier 120 identifies content using a variety of methods, including inter alia lookup of content metadata in a reference database of metadata, and matching of a digital fingerprint of the media with a reference database of fingerprints.

Reference is made to FIG. 2, which is a simplified flowchart of a process for content identification, as performed by content identifier 120, in accordance with an embodiment of the present invention. The flowchart of FIG. 2 is divided into two columns. The left column indicates steps performed by a content scanner, such as content scanner 110, and the right column indicates steps performed by a content identifier, such as content identified 120.

At step 210 the content scanner scans a consumer's PC for media content that is stored therein, as described hereinabove. At step 220 the content scanner sends metadata and fingerprints for the media scanned at step 210 to the content identifier. At step 230 the content identifier selects a lookup method to identify the media, based on the data provided by the content scanner. At step 240 the content identifier identifies some or all of the media. At step 250 the content identifier sends the results of its identification at step 240 to the content scanner. At step 260 the content scanner uploads content that the content identifier was unable to identify to the digital locker. At step 270 the content scanner registers the content via registrar 140, as described in detail hereinbelow with reference to FIG. 6

Namespace Mapper 130

Shown in FIG. 1 is a namespace mapper 130. Namespace mapper 130 is generally implemented on a server computer. A "namespace" is a range of identifiers that are associated uniquely with items, where items may be, inter alia, media content, player devices, consumers and households. In general, data obtained from multiple sources may not adhere to the same naming convention, and may further be inconsistent. "Namespace mapping" determines, for a designated item, one or more IDs for uniquely identifying the designated item.

In accordance with embodiments of the present invention, namespace mapper 130 aggregates information from multiple data sources, including, inter alia, information about media content, information about player devices, information about consumers, and information about companies and other stakeholders in the content purchase and supply chains. In order to disambiguate the information obtained from the multiple sources, namespace mapper 130 uniquely identifies data elements from the multiple sources, and associates them correctly within a centralized registry.

Namespace mapper 130 normalizes content data by mapping content to the reference data store of content used by content identifier 120. Thus content received from multiple sources with different and possibly incorrect metadata is assigned consistent and correct metadata.

Namespace mapper 130 performs namespace mapping in order to compare information obtained from two or more sources, and determine whether or not the information refers to the same entity. For example, a consumer, John W. Smith, may be identified by attributes including, inter alia, his name, address and cell phone number in a mobile carrier database. John purchases a CD from Best Buy, and because he is a member of Best Buy's rewards program, his purchase information is recorded in Best Buy's database. However, in the Best Buy database, John's name is listed as "John Smith", without the middle initial, and his address is different than the address in the mobile carrier database. As such, when the consumer attributes provided by the two data sources are compared, namespace mapper 130 finds that:

Name—the names do not exactly match: John W. Smith vs. John Smith;
Address—the addresses do not match; and
Cell Phone Number—the phone numbers match.

Namespace mapper 130 assigns weights to each attribute (Name, Address, Cell Phone Number), and combines the degrees of match according to the weights in order to determine whether or not the two sets of attributes correspond to the same person. Because a cell phone number is generally unique to an individual, this attribute is assigned a high weight; and since an address may not be unique to an individual, this attribute is assigned a lower weight. As such, based on the similarity of the two names, on the discrepant addresses, and on the identical cell phone numbers, namespace mapper 130 concludes that the two sets of attributes do in fact correspond to the same person. Thus the CD purchased by John at Best Buy is registered with John W. Smith's acquired content, as described hereinbelow.

Reference is made to 3, which is a simplified flowchart of a process for mapping consumer data to a consumer namespace, as performed by namespace mapper 130, in accordance with an embodiment of the present invention. The flowchart of FIG. 3 is divided into two columns. The left column indicates steps performed by a data source, and the right column indicates steps performed by a namespace mapper, such as namespace mapper 130.

At step 310 a mobile carrier provides consumer information to system 100. The example shown in FIG. 3 relates to the above John Smith example. The carrier's information includes the name spelled as "John W. Smith", the address "1 Elm Street, Anywhere, Okla.", and the phone number "212-555-1234". At step 320 the namespace mapper checks if this customer is already known to system 100. If not, then the namespace mapper stores the customer data as a new customer record in a data store.

At step 330 a retailer, such as Best Buy, provides consumer information to system 100. The consumer information differs from the information provided by the mobile carrier at step 310 in the spelling of the consumer's name, and in the address. At step 340 the namespace mapper checks if this customer is already known to system 100 and compares the consumer information to information stored in the data store. At step 350, based on similarities in name and telephone number as indicated above, the namespace mapper concludes that the retailer's customer information corresponds to the mobile carrier's customer information. As such, the namespace mapper does not add a new customer record to the data store, but instead maps the retailer's customer information to the already existing record with the mobile carrier's customer information.

Reference is made to FIG. 4, which is a diagram illustrating namespace mapping for a consumer, in accordance with an embodiment of the present invention. Shown in FIG. 4 is information about a consumer, Jonathan Samuels, arriving from four sources of information; namely, a mobile carrier database, a Best Buy rewards program database, an online store database, and a consumer home computer file directory. The mobile carrier database provides identifying information about Jonathan Samuels, such as his name, address and cell phone number. The Best Buy database provides identifying information about content that Jonathan Samuels purchases at a Best Buy retail store. The online store database provides information about content that Jonathan Samuels purchases online. The home computer file directory provides information about content that Jonathan Samuels has stored on his home computer. In accordance with an embodiment of the present invention, the four sources are integrated in order to register all of Jonathan Samuels' content.

Reference is made to FIG. 5, which is a simplified flowchart for a process of mapping content data to a content namespace, as performed by namespace mapper 130, in accordance with an embodiment of the present invention. The flowchart of FIG. 5 is divided into two columns. The left column indicates steps performed by a data source, and the right column indicates steps performed by a namespace mapper, such as namespace mapper 130.

At step 510 a first data source, for example, a metadata aggregator, provides information about media content. In the example shown in FIG. 5, the information includes a song "Wooden Ships", an artist "Crosby Stills and Nash", and an album "So Far". At step 520 the namespace mapper checks if the media information is already stored in a data store. For the case at hand, the data store has an already existing record with a song "Wooden Ships", an artist "Crosby, Stills, Nash and Young", and an album "So Far". Based on similarities in the information, the namespace mapper concludes that the content matches similar content found in the data store, and identifies the content information received from the metadata aggregator as corresponding to the already existing record in the data store.

Similarly, at step 530 a second data source, for example, the on-line Napster content source, provides information about media content. The information differs from the information provided by the metadata aggregator at step 510 in that the artist name is "Crosby Stills Nash & Young", and differs from the already existing record in the data store in that the artist is punctuated "Crosby, Stills, Nash and Young". At step 540 the namespace mapper concludes that the content matches the similar content found in the data store, and identifies the content information received from Napster as corresponding to the already existing record in the data store. At step 550 the namespace mapper has mapped both the content information received from the metadata aggregator and the content information received from Napster to the same already existing record in the data store.

Registrar 140

Shown in FIG. 1 is a registrar 140, which registers a consumer's content, services and devices with a central data store. For each item of content registered, registrar 140 generates a content status, including inter alia digital rights management data for the content. Registrar 140 is generally implemented on a server computer.

Registrar 140 registers, to a consumer, media that was scanned by content scanner 100 and identified by content identifier 120. Additionally, registrar 140 registers, to the consumer, media that was not identified by content identifier 120, but that was instead communicated to registrar 140 by a third party such as inter alia a media store. Additionally, registrar 140 registers, to a consumer, media subscriptions and media services purchased from a third party such as, inter alia, a content subscription service. Additionally, registrar 140 registers player and recorder devices owned by the consumer.

Figure 6:
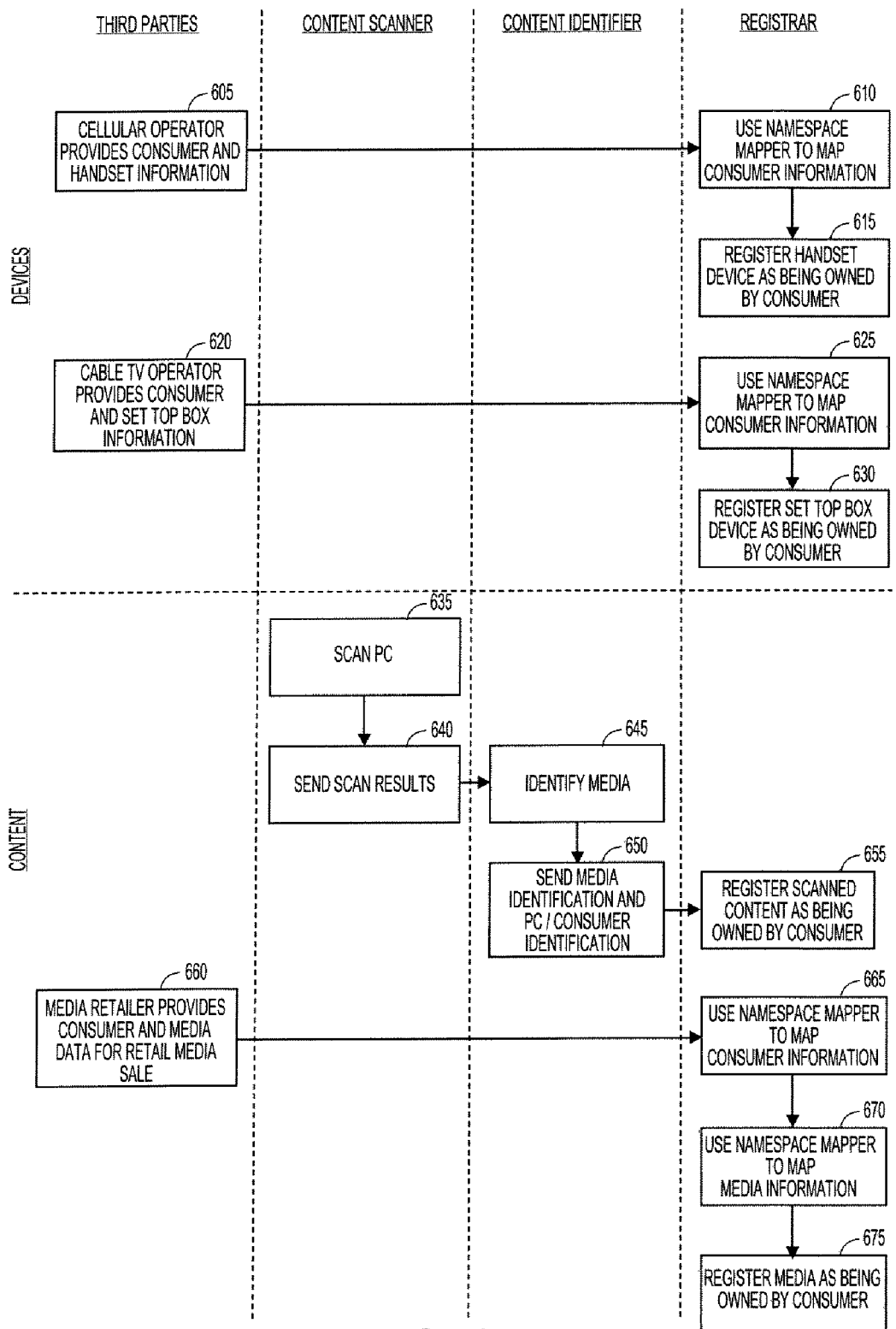
FIG. 6 is a simplified flowchart of a process of registering devices and content to a consumer, in accordance with an embodiment of the present invention.

Reference is made to FIG. 6, which is a simplified flowchart of a process of registering devices and content to a consumer, as performed by registrar 140, in accordance with an embodiment of the present invention. The flowchart of FIG. 6 is divided into four columns. The leftmost column indicates steps performed by third parties; the second-from-left column indicates steps performed by a content scanner, such as content scanner 110; the second-from-right column indicates steps performed by a content identifier, such as content identifier 120; and the rightmost column indicates steps performed by a registrar, such as registrar 140. Moreover, steps 605-630 relate to registration of consumer devices, and steps 635-675 relate to registration of consumer content.

At step 605 a cellular operator provides information about a consumer and his handset. At step 610 the registrar invokes namespace mapper 130 to map the consumer information to its data store, as described hereinabove with reference to FIG. 3. At step 615 the registrar registers the handset device as being owned by the consumer.

At step 620 a cable TV operator provides information about a consumer and his set top box. At step 625 the registrar invokes namespace mapper 130 to map the consumer information to its data store, as described hereinabove with reference to FIG. 3. At step 630 the registrar registers the set top box device as being owned by the consumer.

At step 635 the content scanner scans the consumer's PC for media content. At step 640 the content scanner sends the results of the scanned media content to the content identifier. At step 645 the content identifier identifies the media. At step 650 the content identifier sends the media identifiers, the consumer information and the PC information to the registrar.

At step 655 the registrar registers the identified scanned content as being owned by the consumer.

At step 660 a media retailer sends consumer and media data for a retail media sale, to the registrar. At step 665 the registrar invokes namespace mapper 130 to map the consumer information to its data store, as described hereinabove with reference to FIG. 3. At step 670 the registrar invokes namespace mapper 130 to map the media data to its data store, as described hereinabove with reference to FIG. 5. At step 675 the registrar registers the media as being owned by the consumer.

Figure 7A:
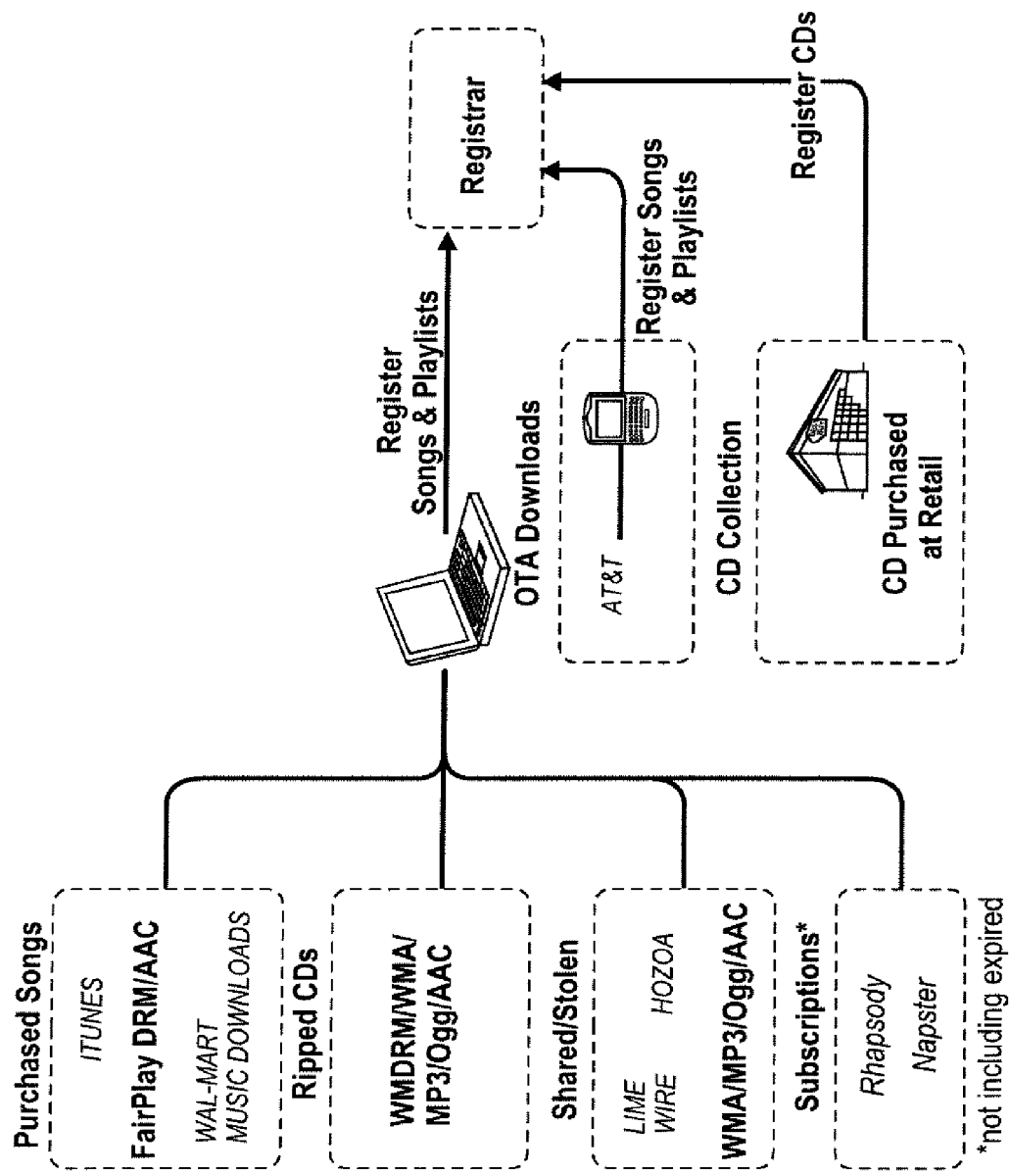
FIGS. 7A and 7B are diagrams illustrating a system that registers consumer music and video content, respectively, originating from CDs and other physical media, and consumer music and video content, respectively, downloaded via the Internet and over the air, in accordance with an embodiment of the present invention.
Figure 7B:
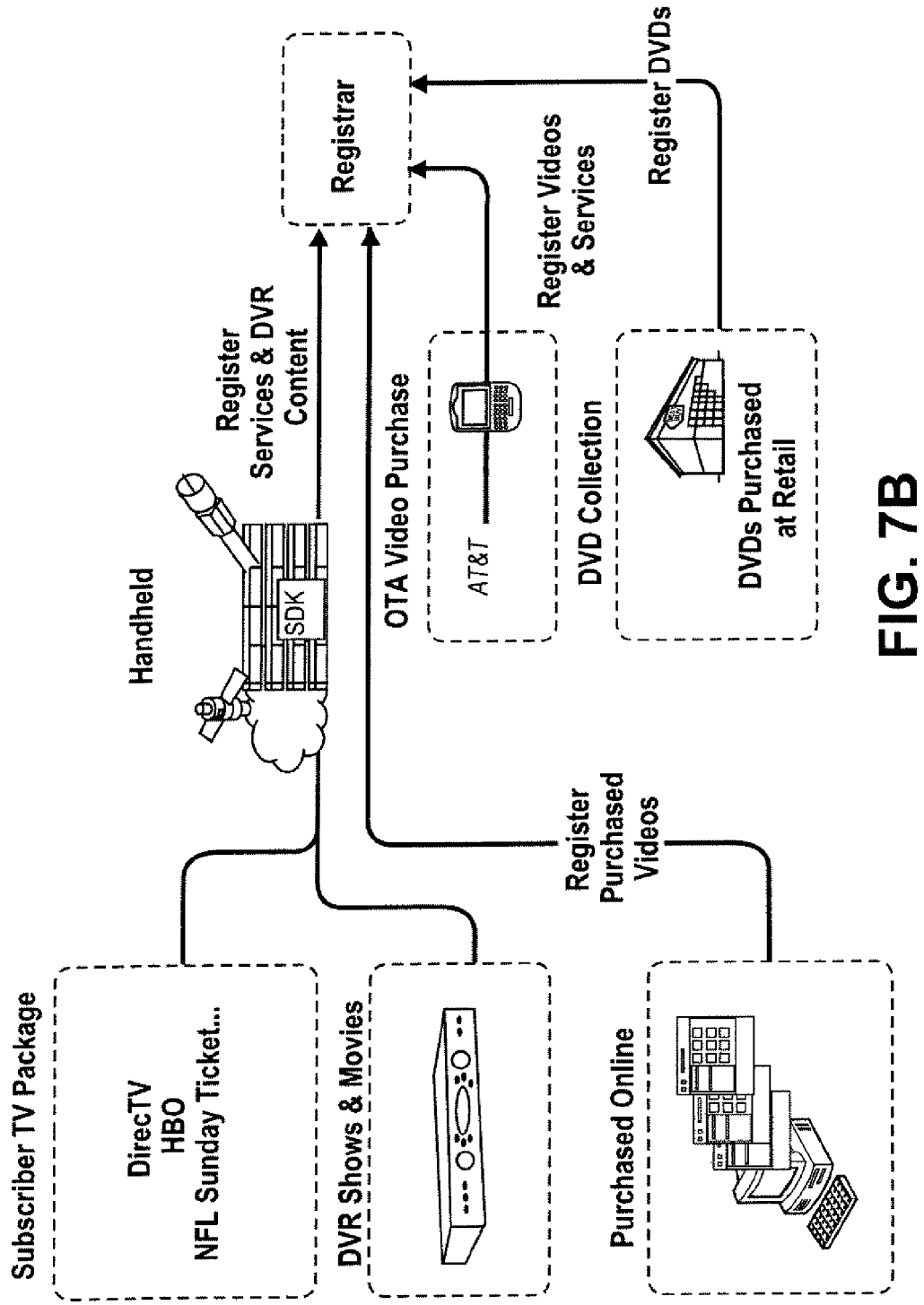

Reference is made to FIGS. 7A and 7B, which are respective diagrams illustrating a system that registers consumer content and services for music and video, respectively, originating from CDs and other physical media, downloaded via the Internet and over the air, downloaded via peer to peer networks, subscribed to via subscription services, and recorded on recorder devices, in accordance with an embodiment of the present invention.

A consumer may register his entire household, which includes multiple consumer names, cell phone IDs, PC IDs, and other player device IDs. Reference is made to FIGS. 8A and 8B, which are diagrams illustrating registries of a household's music and videos, respectively, in accordance with an embodiment of the present invention. For music, FIG. 8A shows registration of the Samuels' songs, CDs and playlists into a registry for the Samuels household. For video, FIG. 8B shows registration of the Samuels' DVDs, DirecTV digital video recordings (DVRs), and cable and satellite subscriptions into the registry for their household.

Reference is made to FIG. 9, which is a diagram illustrating a registry of household player devices, in accordance with an embodiment of the present invention. FIG. 9 shows a registry of the Samuels' household set top boxes, cell phones and automobile decks.

Content Router 150

Shown in FIG. 1 is a content router 150. Content router 150 is generally implemented on a server computer. "Content routing" refers to determining an appropriate source from which to transmit designated content to a player device. Content router 150 maintains a data store of sources of content and of information regarding the content provided by the sources, including, inter alia, (i) media metadata, which may have previously been mapped into a standard namespace using namespace mapper 130, (ii) delivery bit-rate(s) that the content source is capable of providing, (iii) media format(s) or codec(s) that the content source is capable of providing, (iv) media container formats that the content source is capable of providing, (v) DRM types that the content source is capable of providing, and (vi) geographical regions that the content source serves.

When playback of media is requested, content router 150 dynamically evaluates the data in its data store vis a vis the playback requirement, and vis a vis capabilities of the playback device, and selects the most appropriate source of content for this particular instance.

In an embodiment of the present invention, playback of media is performed from a copy of the content stored locally on the player device. Such local copy may have been stored on the player device by the user independently of the present invention, or may have been cached on the player device during an earlier playback from a source of content identified by counter router 150.

Reference is made to FIG. 10, which is a simplified flowchart for a process of content routing and media playback, as performed by content router 150, in accordance with an embodiment of the present invention. The flowchart of FIG. 10 includes four columns. The leftmost column indicates steps performed by a consumer device, such as a media player; the second-from-left column indicates steps performed by an inventory manager, such as inventory manager 160; the second-from-right column indicates steps performed by a content router, such as content router 150; and the rightmost column indicates steps performed by a content distributor.

At step 1005 the device requests media content for playback. At step 1010 the inventory manager invokes a rights manager, such as rights manager 180, to validate the request. If the rights manager validates the request, then at step 1015 the inventory manager requests the content router to provide a content route for obtaining the requested content. At step 1020 the content router determines an appropriate content distributor, for providing the requested content to the requesting device, based on multiple parameters including, inter alia, content format, transmission bit-rate, content container, transmission protocol and content digital rights management (DRM).

At step 1025 the content router requests a handle to the requested content from the appropriate distributor as determined at step 1020. At step 1030 the content distributor generates the content handle, and at step 1035 the content distributor returns the content handle to the content router. In turn, at step 1040 the content router forwards the content handle to the inventory manager and, at step 1045, the inventory manager provides the content handle to the device.

At step 1050 the device uses the content handle to request content from the content distributor. At step 1055 the content distributor delivers the content to the device. Finally, at step 1060 the device receives the content, originally requested at step 1005, from the content distributor, and plays the received content.

Reference is made to FIG. 11, which is a diagram illustrating music and video content routing from a multitude of content providers to a multitude of player devices, in accordance with an embodiment of the present invention. As shown in FIG. 11, different player devices may require different content formats, and may require different digital rights management technologies.

Inventory Manager 160

Shown in FIG. 1 is an inventory manager 160, which maintains information regarding consumers' media inventories, including, inter alia, music, videos, playlists, podcasts and content subscriptions. Inventory manager 160 is generally implemented on a server computer. In an embodiment of the present invention, consumer inventory may have been previously generated by content scanner 110, content identifier 120 and registrar 140. Inventory manager 160 provides a consumer's inventory to the consumer's player devices, when requested by the consumer.

Reference is made to FIG. 12, which is a simplified flowchart of a process of registering a consumer's inventory, retrieval and display of inventory on a player device, and playback of media on a player device, as performed by inventory manager 160, in accordance with an embodiment of the present invention. The flowchart of FIG. 12 is divided into five columns. The leftmost column indicates steps performed by an exemplary consumer device such as a cell phone; the second-from-left column indicates steps performed by a content scanner, such as content scanner 110; the middle column indicates steps performed by a content identifier, such as content identifier 120; the second-from-right column indicates steps performed by a registrar, such as registrar 140; and the rightmost column indicates steps performed by an inventory manager, such as inventory manager 160.

At steps 1205 and 1210 the cell phone is registered with the registrar, as described hereinabove with reference to FIG. 6. At step 1215 the content scanner scans the consumer's PC for media content. At step 1220 the content identifier identifies the scanned media content. At step 1225 the registrar registers the identified scanned media content to the consumer, and a record identifying the content as being registered to the consumer is created in an inventory data store.

At step 1230 the cell phone requests from the inventory manager an inventory summary of media registered to the consumer. At step 1235 the inventory manager invokes a rights manager, such as rights manager 180, to validate the consumer's account. If the rights manager validates the consumer's account, then at step 1240 the inventory manager retrieves the consumer's inventory summary information from the data store. At step 1245 the inventory manager returns the user's inventory summary information to the cell phone.

At step 1250 the cell phone displays the inventory summary information to the consumer. At step 1255 the consumer selects media to be played, from the media listed in the inventory summary information. At step 1260 the inventory manager invokes the rights manager to validate the consumer's rights to the selected media. If the rights manager validates the media, then at step 1265 the inventory manager invokes the content router to provide the media to the player device, as described hereinabove with reference to FIG. 10. Finally, at step 1270 the cell phone plays the media that was requested at step 1255.

Consumer media inventory may be cached on a player device, obviating the need for inventory manager 160 to provide it at every instance. When the inventory is cached on a player device, inventory manager 160 maintains versioning information regarding the cached inventory and the current state of the consumer's inventory. This allows inventory manager to provide an updated view of the consumer's inventory to the player device so that the player device can update its cached inventory.

Content Tracker 170

Shown in FIG. 1 is a content tracker 170, which tracks acquisition and playing of content by a consumer. Content tracker 170 is generally implemented on a server computer.

Content tracker 170 maintains, in a data store, an acquisition log that tracks content acquisition events for consumers. Data stored in the acquisition log includes inter alia the identity of the consumer, the identity of the content, the identity of the content store or other service which provided the content, and the data and time of the acquisition.

Additionally, content tracker 170 maintains, in the data store, a playback log that tracks content playback events for consumers. Data stored in the playback log includes inter alia the identity of the consumer, the identity of the content, the identity of the device on which the content was played, the length of time the content was played, and the date and time of the playback.

In accordance with an embodiment of the present invention, content tracker 170 tracks sharing of content and tracks when a shared content item is subsequently purchased.

A consumer may request from system 100 that a content item registered to him be shared with another consumer. Registrar 140 registers the content to the recipient and indicates that the recipient has a trial license for the content. Content tracker 170 records the share in its acquisition log.

When the recipient's trial license for the content expires, the recipient may be offered to purchase the content. Such purchase, if effectuated, then causes registrar 140 to register the content as being owned by the recipient, and causes content tracker 170 to record the purchase event, and to associate the share with the subsequent purchase.

Content tracker 170 also associates shares with subsequent purchases in a case where there are multiple shares of a content item culminating in a purchase. For example, if consumer A shares a content item with consumer B, and consumer B shares the same content item with consumer C, and consumer C subsequently purchases the item, then contact tracker 170 associates customer C's purchase with consumer A's original share.

Content tracker 170 facilitates superdistribution of content.

In accordance with an embodiment of the present invention, content tracker 170 tracks when a first piece of content, referred to herein as "associated media", triggers a user to purchase a second piece of content.

"Associated media" refers to content that contributes to a user's purchase of other content. For example, a user may watch a movie, and decide to purchase a song from the movie, or the entire soundtrack. The song and the soundtrack are "associated with" the movie, and content tracker 170 tracks this association. When a media item, such as the above mentioned song, is played by the user, content tracker 170 maintains in its data store both the media player and the identity of the media, such as the above mentioned movie, which was associated with the played media.

Music and video may be associated with movies, TV shows, games, and live events such as concerts and other performances.

Reference is made to FIG. 13, which is a simplified flowchart of a process of tracking consumer acquisition of media, playback of media, and associations between media items, as performed by content tracker 170, in accordance with an embodiment of the present invention. The flowchart of FIG. 13 is divided into five columns. The leftmost column indicates steps performed by third parties; the second-from-left column indicates steps performed by a player device; the middle column indicates steps performed by a registrar, such as registrar 140; the second-from-right column indicates steps performed by an inventory manager, such as inventory manager 160; and the rightmost column indicates steps performed by a content tracker, such as content tracker 170.

At step 1305 the player device requests media content, designated as media item X, for playback, from the inventory manager. At step 1310 the inventory manager invokes a rights manager, such as rights manager 180, to validate the consumer's rights to media item X, and invokes a content router, such as content router 150, to provide the requested media item X to the player device, as described hereinabove with reference to FIG. 10. At step 1315 the inventory manager reports the consumer's playback of media item X to the content tracker. At step 1320 the content tracker logs the playback of media item X in a tracking log.

The consumer then purchases a song, designated as song Y and related to media item X, from a media retailer. At step 1325 the media retailer reports consumer and media data for the retail media sale of song Y, to the registrar. At step 1330 the registrar invokes namespace mapper 130 to map the consumer and the media information, as described hereinabove with reference to FIGS. 3 and 5. At step 1335 the registrar registers song Y as being owned by the consumer, as described hereinabove with reference to FIG. 6.

At step 1340 the registrar reports the consumer's purchase of song Y to the content tracker. At step 1345 the content tracker logs acquisition of song Y in the tracking log. At step 1350 the registrar invokes the namespace mapper to detect a relationship between song Y and media item X, which was provided to the consumer at step 1310. At step 1355 the registrar reports the related media to the content tracker. At step 1360 the content tracker logs the association between song Y and media item X.

At step 1365 the player device requests playback of song Y, from the inventory manager. At step 1370 the inventory manager invokes the rights manager to validate the consumer's rights to the requested song, and invokes the content router to provide the requested song Y to the player device, as described hereinabove with reference to FIG. 10. At step 1375 the inventory manager reports playback of song Y to the content tracker. At step 1380 the content tracker logs the playback of song Y, and the association of song Y with media item X.

Reference is made to FIG. 14, which is a simplified flowchart of a process of associating items of media with one another, as performed by content tracker 170, in accordance with an embodiment of the present invention. The flowchart of FIG. 14 is divided into five columns. The leftmost column indicates steps performed by a player device; the second-from-left column indicates steps performed by a namespace mapper, such as namespace mapper 130; the middle column indicates steps performed by a media retailer; the second-from-right column indicates steps performed by a registrar, such as registrar 140; and the rightmost column indicates steps performed by a content tracker, such as content tracker 170.

At step 1405 a consumer plays a movie on his set top box. At step 1410 the set top box requests associated media from the namespace mapper. At step 1415 the namespace mapper finds media associated with the movie, including inter alia songs from the movie and games relating to the movie characters. The namespace mapper may identify associated media based on various types of data, including inter alia (i) information, provided by cable providers and by electronic programming guide providers, identifying music associated with scheduled programs, (ii) information provided in data streamed from cable providers or other content providers, and (iii) information provided by game developers identifying media in or associated with a game.

At step 1420 the namespace mapper returns to the player device a list of the associated media found at step 1415. At step 1425 the set top box presents the consumer with opportunities to purchase the associated media. At step 1430 the consumer proceeds to purchase a song, included in the associated media, from a media retailer.

At step 1435 the media retailer executes the purchase and delivers the purchased song to the consumer. At step 1440 the media retailer sends the purchase information to the registrar. At step 1445 the registrar registers the song as being owned by the consumer, as described hereinabove with reference to FIG. 6. At step 1450 the content tracker logs acquisition of the song.

At step 1455 the registrar requests from the namespace mapper media associated with the purchased song. At step 1460 the namespace mapper returns to the registrar a list of media associated with the purchased song, including the original movie played by the consumer at step 1405. At step 1465 the registrar reports the original movie as being associated with the purchased, song. At step 1470 the content tracker logs the association between the purchased song and the original movie. In turn, disbursement manager 190 allocates a portion of the revenue generated by the user's purchase of the song to rights holders for the original movie, such as studios, directors, writers and distributors of the original movie.

Generally, registrar 140 recognizes when associated content triggers purchase of new content by:
  receiving information from a player device regarding content the user is playing, or has recently played, prior to purchasing his new content;
  receiving information from ticketing agencies regarding movie tickets, or tickets for other such events, that the user purchased, where attendance at the movie or other event was temporally or spatially proximate to the purchase of the content;
  receiving information from retail stores regarding content the user has purchased, prior to purchasing his new content; and
  receiving location-based information, from the user's cellphone or GPS device, regarding where the user was located prior to purchasing his new content, where such location may have been a theater or other entertainment venue.

Embodiments of the present invention have application to usage tracking for purposes of revenue sharing or for purposes of logging usage history. Embodiments of the present invention are advantageous for tracking the following information for content:
  (a) if recorded, when it was recorded and from which provider;
  (b) if purchased directly, the fulfiller of the purchase;
  (c) if purchased, other content, if any, that is associated with the purchased content and may have contributed to the consumer's decision to make the purchase;
  (d) if shared, the consumer who originally owned the copy, the original fulfiller, and the sharing chain of users;
  (e) play information for the current owner, whether played on the owner's recorder device or on the owner's player device or on other devices; and
  (f) if upgraded from a trial version, the fulfiller of the original purchase by the original owner and the fulfiller of the purchase from the trial version.

Rights Manager 180

Shown in FIG. 1 is a rights manager 180, which enforces digital rights management. Rights manager 180 is generally implemented on a server computer.

Rights manager 180 maintains a data store of consumer accounts. When a consumer attempts to access system 100, rights manager 180 consults the data store to validate whether or not the consumer's account has the right to access the system, and grants or denies access accordingly.

Additionally, rights manager 180 utilizes a data store of consumers' rights to access given content items.

Rights manager 180 may grant full access for a consumer to a given content item, may deny access, and may provide limited access. Limited access includes, inter alia, the right to access content for a specific time period, during a specific date range, for a limited number of plays, or in specific geographical locations. Limited access may be used to support trial content.

When a user requests to play a designated piece of content on a designated player device, the request is transmitted to rights manager 180, which confirms that the user has a currently valid license to the requested content. If the user does not have a currently valid license to the requested content, the play request is denied. In one embodiment of the present invention, if the user had a limited license for the requested content which is no longer valid, system 100 enables the user to purchase a valid license.

Rights manager 180 may obtain information regarding a consumer's rights to a designated item of content from content scanner 110, whereby content scanner 110 finds content on a user's PC that is wrapped in a DRM wrapper, parses the DRM wrapper to determine the usage rules governing the content, and transmits the usage rules to registrar 140. Registrar 140 in turn stores the rules in a data store where they are enforced by rights manager 180.

Rights manager 180 may also obtain information regarding a consumer's rights to a designated item of content from a third party such as inter alia a media store or a media subscription service. When a consumer purchases content or a content subscription from a store, the store may transmit to registrar 140 information about the consumer, the purchase, and the usage rules applicable to the designated user and the designated content. Registrar 140 stores the results in a data store where they are enforced by rights manager 180.

Reference is made to FIG. 15, which is a simplified flowchart of a process of validating and enforcing consumer rights to media, as performed by rights manager 180, in accordance with an embodiment of the present invention. The flowchart of FIG. 15 is divided into three columns. The left column indicates steps performed by a consumer's player device; the middle column indicates steps performed by an inventory manager, such as inventory manger 160; and the right column indicates steps performed by a rights manager, such as rights manager 180.

At step 1505 the player device requests a summary of its inventory from the inventory manager. At step 1510 the inventory manager requests the rights manager to validate the consumer's account. At step 1515 the rights manager validates the status of the consumer's account by consulting a consumer account data store. If the consumer's account is valid, then at step 1520 the rights manager returns an account authorization to the inventory manager. At step 1525 the inventory manager retrieves the consumer's inventory information, as described hereinabove with reference to FIG. 12, and sends it to the player device.

At step 1530 the player device displays to the consumer his summary inventory information. At step 1535 the player device requests, from the inventory manager, media from the inventory for playback. At step 1540 the inventory manager requests the rights manager to validate the consumer's rights to the requested media. At step 1545 the rights manager validates the consumer's rights by consulting a media inventory and rights data store. If the rights manager validates the consumer's rights to the requested media, then at step 1550 the rights manager returns a media authorization to the inventory manager. At step 1555 the inventory manager requests a route to the media from content router 150, as described hereinabove with reference to FIG. 10.

Disbursement Manager 190

Shown in FIG. 1 is a disbursement manager 190, which allocates revenue to various vendors in the content purchase and supply chains. Disbursement manager 190 is generally implemented on a server computer. Reference is made to FIG. 16, which is a simplified block diagram of a revenue disbursement system 1600, in accordance with an embodiment of the present invention. Shown in FIG. 16 is a data manager 1610, which manages four data stores. The first data store, 1620, stores records of content, content owners, and content providers. The second data store, 1630, stores records of users and their acquired content. The third data store, 1640, stores a content usage history log according to user and time period. The fourth data store, 1645, stores records of revenues generated from various sources, including inter alia (i) from media purchase, (ii) from media subscriptions, (iii) from media access services, and (iv) from advertising. The data in data stores 1620, 1630, 1640 and 1645 is inter-related by reference links such as foreign keys.

Also shown in FIG. 16 is a user content browser 1650, such as a player device, which enables a user to interactively browse, organize and access his content and his playlists.

Also shown in FIG. 16 is a rights manager 1660, such as rights manager 180. If rights manager 1660 verifies that the user has a currently valid license to the requested content, then a content provisioner 1670, such as content router 150, identifies one or more sources that can supply the requested content to the user in a format compatible with the user's player device.

A tracking server 1680, such as content tracker 170, records a history log regarding the user's playing of content, and a disbursement manager 1690, such as disbursement manager 190, uses the history log to disburse subscription revenue received from the user to content owners and content provisioners, and other stakeholders in the purchase and delivery chains.

Embodiments of the present invention enable revenue disbursement among various partners in content purchase and supply chains, including inter alia (i) content owners, (ii) service providers, (iii) content distributors, (iv) registrants, (v) enablers, and (vi) other vendors that enable operation of embodiments of the present invention.

Content owners are entities that hold intellectual property rights to content. These rights include, inter alia, publishing rights, rights to sound recordings, rights to video recordings and distribution rights. Content owners may be, inter alia, music labels, music publishers, collecting societies, movie studios and movie production companies.

Service providers are often mobile operators. Service providers generally maintain customer relationships, and are responsible for billing and collection. Mobile operator service providers also provide delivery of content over their wireless networks to cellular devices.

Content distributors are generally responsible for aggregating acquired content and delivering the content to consumers' player devices. Delivery is via download or streaming, either over the Internet or over a mobile operator's communication channels. Content managers may also maintain advertising media for ad-supported content or services. In some instances, a mobile operator may provide its own content, in which case the mobile operator serves as both an operator and a content manager. In other instances, content may reside with a plurality of content managers. Embodiments of the present invention support integration and revenue disbursement in all instances.

Registrants are generally responsible for registering consumer ownership of media with registrar 140. Registrants may be inter alia developers of content scanner 110, and media retail stores. Regarding developers of content scanner 110, when content scanner 110 runs on a consumer's PC and sends information about the media on the PC to content identifier 120, registrar 140 maintains a record indicating that the developer of content scanner 110 is the registrant for the subject media and for the subject consumer. Regarding media retail stores, when a store sells a media item to a consumer, the store notifies registrar 140 of the sale, and registrar 140 maintains a record indicating that the media retailer is the registrant for the subject media and for the subject customer. In both cases, disbursement manager 190 utilizes this information for allocating revenue to appropriate members of the content supply chain.

Enablers are generally responsible for causing a device or software application to be compatible with an embodiment of the present invention. Enablers include, inter alia, (i) manufacturers of mobile handsets who provide built-in capability to utilize an embodiment of the present invention with the handset, (ii) independent developers of software for mobile handsets who provide such capability, and (iii) manufacturers of player devices or recorder devices, or developers of software for player devices or recorder devices who provide such capability.

Other vendors that enable operation of embodiments of the present invention are generally responsible inter alia for maintaining lists of consumers' content, for controlling access to consumers' content based on rights management and criteria such as consumer subscription levels, for providing technology enabling identification of consumers' content, and for tracking content distribution and consumer usage. In some instances, the other vendors that enable operation of embodiments of the present invention may also handle customer relationships, customer billing and collection, and serve as clearinghouses. Again, embodiments of the present invention support integration and revenue disbursement in all instances.

Reference is made to FIG. 17A, which is a diagram illustrating subscription revenue disbursement between content owners, content distributors, service providers, registrants, enablers and other partners, in accordance with an embodiment of the present invention. Shown in FIG. 17A is a revenue sharing formula that allocates 25% of a consumer's subscription revenue to music labels, 10% to music publishers, 35% to service providers, 2% to registrants, 10% to content distributors, 1% to enablers, and 17% to other partners.

Reference is made to FIG. 17B, which is an illustration of an accounting report for distributing the percentages allocated in FIG. 17A to the content owners, among a plurality of content owners, in accordance with an embodiment of the present invention. Shown in the accounting report are revenue portions for service providers (35% off the top), enablers (1% off the top), registrants (2% off the top), music labels (25% off the top), content distributors (10% off the top), and publishers (10% off the top), based on a subscription fee of $5. The 25% allocated to music labels is further distributed along eight labels; namely, Arista Records, Atlantic Records Group, Columbia Records, BMG Heritage Records, EMI, Interscope Records, Legacy Recordings and Warner Music Group. The inter-label distribution of revenue is based on the relative number of pieces of content played by the consumer from each label. Thus, as indicated in accounting report 1710, of 72 pieces of content played by the consumer during the time period Nov. 1, 2007-Dec. 1, 2007, 35 pieces are from the Interscope label. Accordingly, Interscope is allocated 35/72 of the 25% revenue; i.e., 35/72 of $1.25, which is $0.608.

If the consumer plays an addition piece of content from the Interscope label, then report 1710 is dynamically modified to report 1720, wherein the allocation to Interscope is dynamically adjusted upwards to 36/73 of the 25% revenue, which is $0.616. Similarly, the allocations of the 25% to the other labels are adjusted downwards, as indicated in report 1720.

Tracking server 1680 generally determines relative frequencies $f_1, f_2, \ldots, f_n$ with which a consumer uses content owned by label number k, during a specified time period, relative to the consumer's total usage of content, for each of n content labels $k=1, 2, \ldots, n$. Revenue to the n content labels for the specified time period is then allocated based on the relative frequencies. In one embodiment of the present invention, $f_k$ is the number of pieces of content owned by label k and played by the consumer during the specified time period, relative to the total number of pieces of content played by the consumer during the specified time period. E.g., the relative frequencies indicated in report 1720 for the eight content labels are 3/73, 2/73, 4/73, 4/73, 15/73, 36/73, 2/73 and 7/73.

These relative frequencies are the multipliers for allocating $1.25 of the subscription revenue earmarked for the labels, among the eight labels.

In another embodiment of the present invention, $f_k$ is the time spent by the consumer playing content owned by label k during the specified time period, relative to the total time spent by the consumer playing content during the specified time period.

In another embodiment of the present invention, $f_k$ is the number of the consumer's content items attributed to label k at the time of report generation, relative to the consumer's total inventory of content. This allocation may be applicable when there were no play events during a particular reporting period.

Use of tracking server 1680 supports a wide variety of revenue allocation models including, inter alia,
 sliding scale percentages, such as
 percentages that scale with volume,
 percentages that scale with content plays, and
 percentages that scale with numbers of registered users;
 pre-established minimum amounts;
 pro-rata splits;
 off-the-top allocations; and
 breakdown of leftover revenues, such as
 across the board breakdown,
 breakdown pro-rated by actual revenue breakdown for the period, and
 breakdown across members of a particular group.

Reference is made to FIG. 18, which is a summary diagram of vendors in the content purchase and supply chain, integrated within a content licensing service, in accordance with an embodiment of the present invention. Shown in FIG. 18 are content labels, content studios, content distributors, content retailers and service providers, all integrated within a content licensing service. Each of the vendors shown in FIG. 18 is eligible to receive a portion of consumer subscription revenue.

In accordance with an embodiment of the present invention, disbursement manager 190 allocates portions of revenue generated from a piece of content to rights holders for media "associated" with the purchased content, as defined hereinabove with reference to content tracker 170. Thus if a user watches a movie, and decides to purchase a song from the movie, or the entire soundtrack, then disbursement manager 190 allocates a portion of revenue from the song or the soundtrack to rights holders of the movie. Furthermore, when the user subsequently plays the song or soundtrack, disbursement manager 190 allocates a portion of the revenues associated with the playing of the song or soundtrack to the rights holders of the movie.

It is noted that when a user purchases content, disbursement manager 190 only allocates revenue to associated content rights holders in situations where the associated content is a trigger for purchase of the purchased content, as described hereinabove with reference to content tracker 170. In situations where the associated content is not such a trigger, then the revenue is not shared among the associated content rights holders.

Use Cases

Figure 19A:
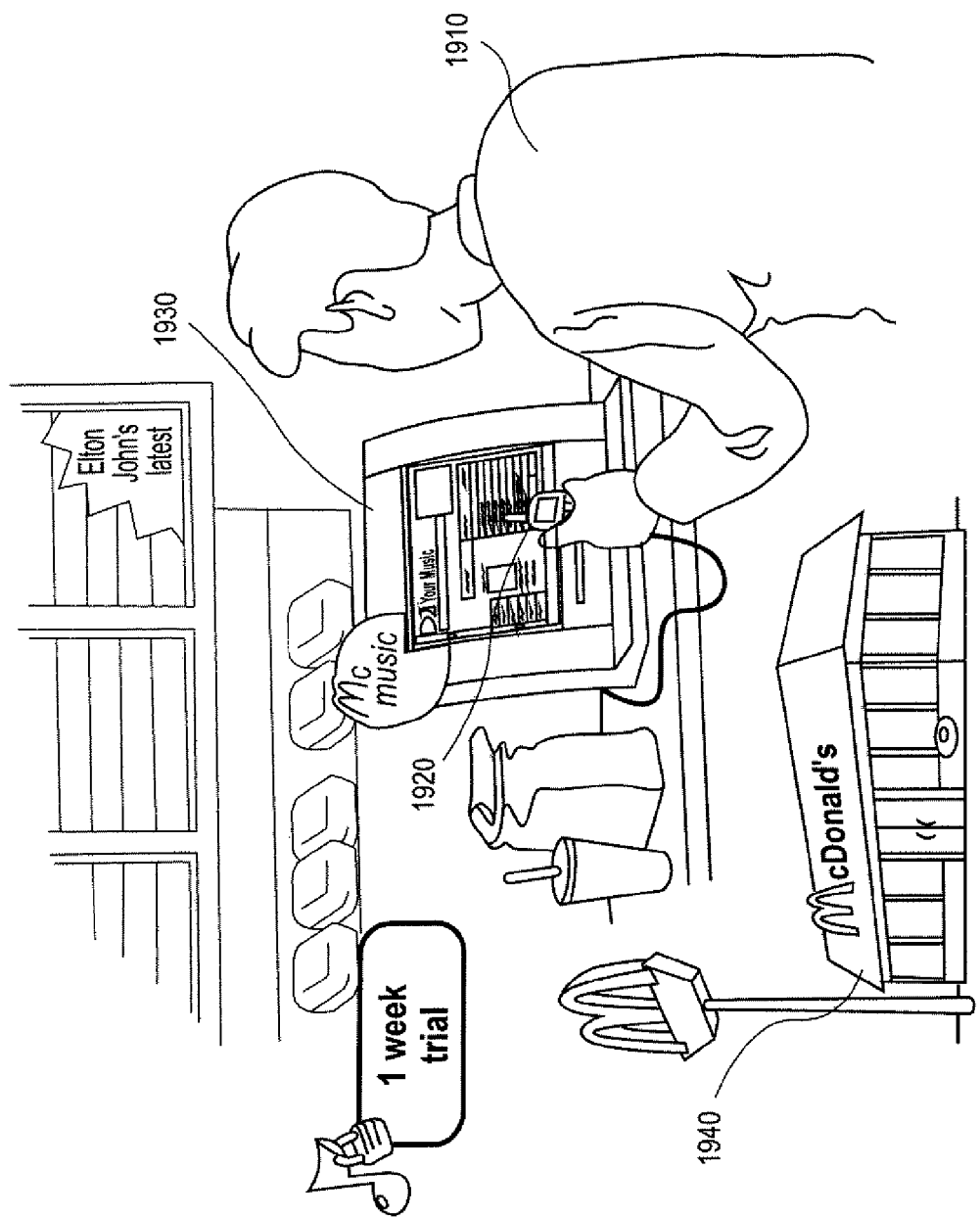
FIGS. 19A and 19B are simplified illustrations of a first consumer use case of acquiring content, in accordance with an embodiment of the present invention.
Figure 19B:
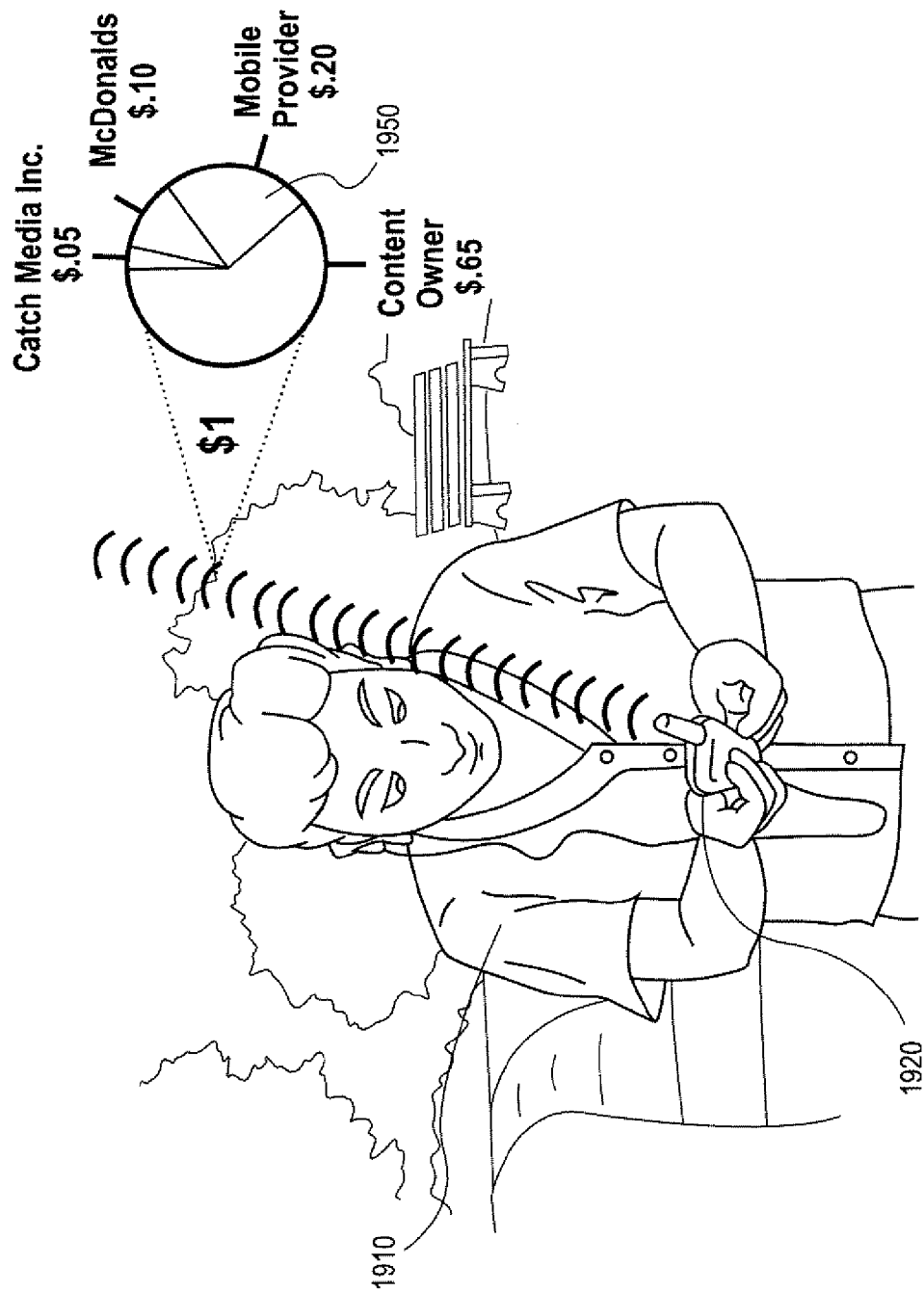

Reference is made to FIGS. 19A and 19B, which are simplified illustrations of a consumer use case of acquiring content in accordance with an embodiment of the present invention. As shown in FIG. 19A, a consumer 1910 downloads a trial version of content onto his player device 1920 from a McMusic kiosk 1930 located within a McDonald's store 1940. Consumer 1910 has limited rights to play the content for a one-week trial period. Subsequently, as shown in FIG.

19B, consumer 1910 decides to purchase the content for $1.00 from a store via wireless communication. As a result of the purchase, consumer 1910 is granted full rights to the song.

Also shown in FIG. 19B is a pie chart 1950 illustrating how the $1.00 of revenue for the content is allocated between the content owner, the wireless provider, McDonald's, and the owner of an embodiment of the present invention.

Figure 20A:
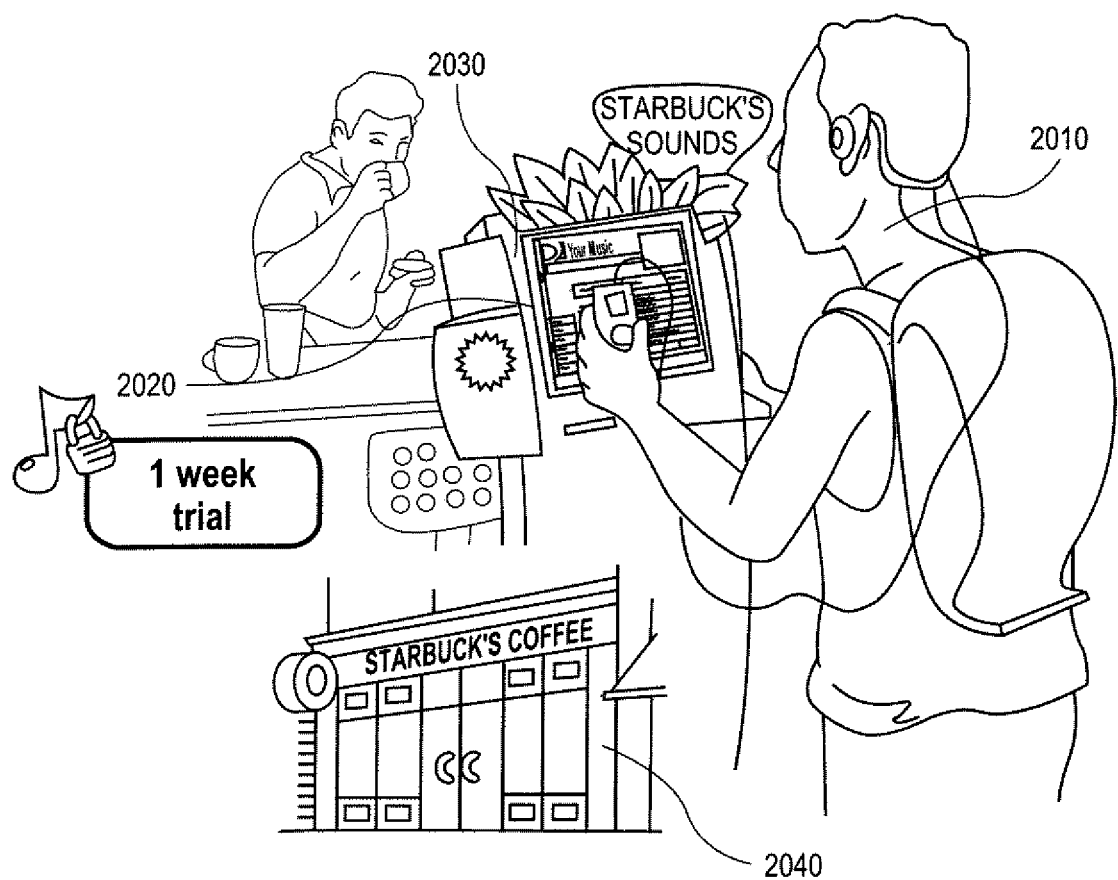
FIGS. 20A and 20B are simplified illustrations of a second consumer use case of acquiring content, in accordance with an embodiment of the present invention.
Figure 20B:
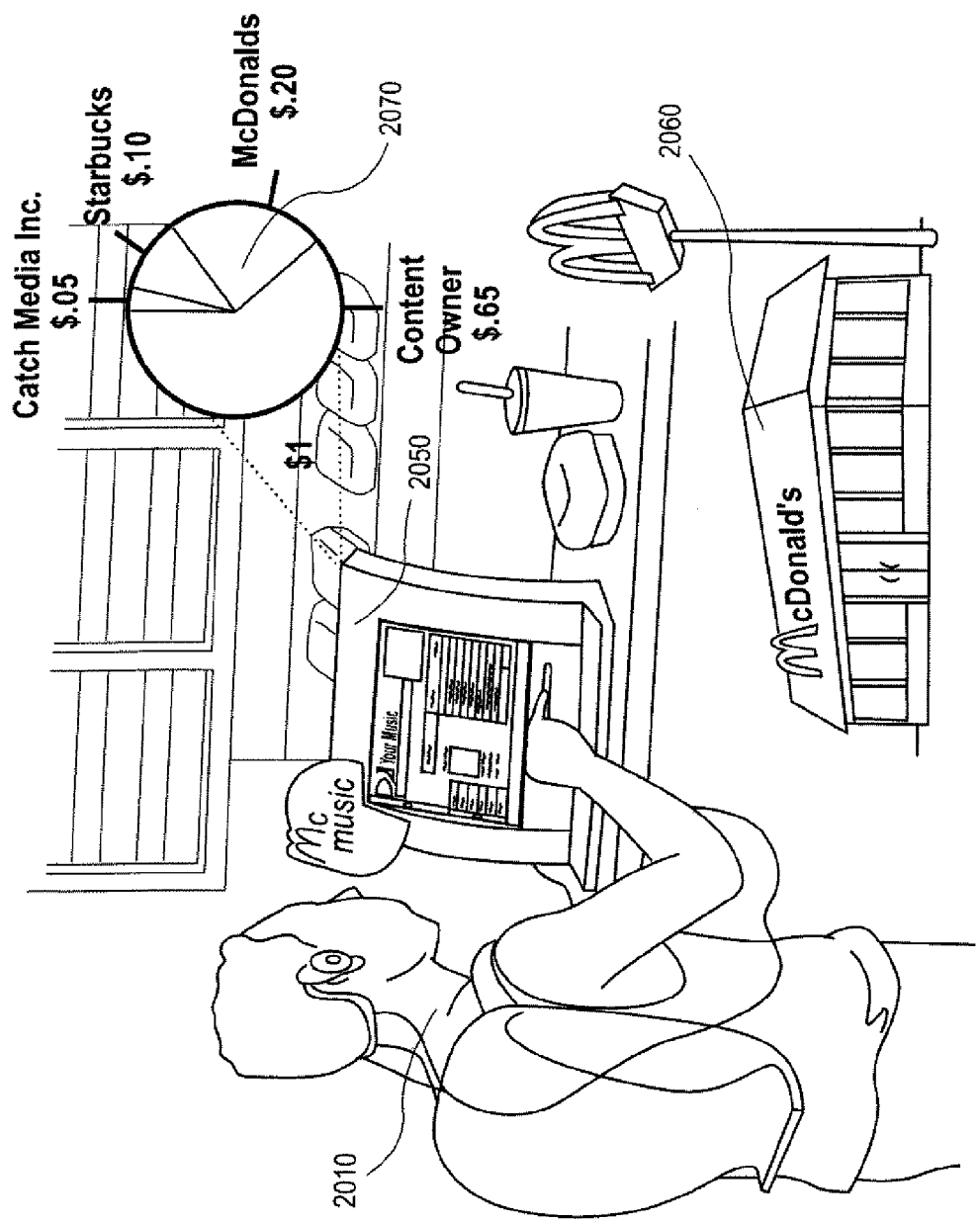

Reference is made to FIGS. 20A and 20B, which are simplified illustrations of a second consumer use case of acquiring content in accordance with an embodiment of the present invention. As shown in FIG. 20A, a consumer downloads a trial version of content onto his player device 2020 from a Starbuck's Sounds kiosk 2030 located within a Starbuck's store 2040. Consumer 2010 has limited rights to play the content for a one-week trial period. Subsequently, as shown in FIG. 20B, consumer 2010 decides to purchase the content for $1.00 from a McMusic kiosk 2050 located within a McDonald's store 2060. As a result of the purchase, consumer 2010 is granted full rights to the content.

Also shown in FIG. 20B is a pie chart 2070 illustrating how the $1.00 of revenue for the content is allocated between the content owner, Starbuck's, McDonald's, and the owner of an embodiment of the present invention.

Figure 21A:
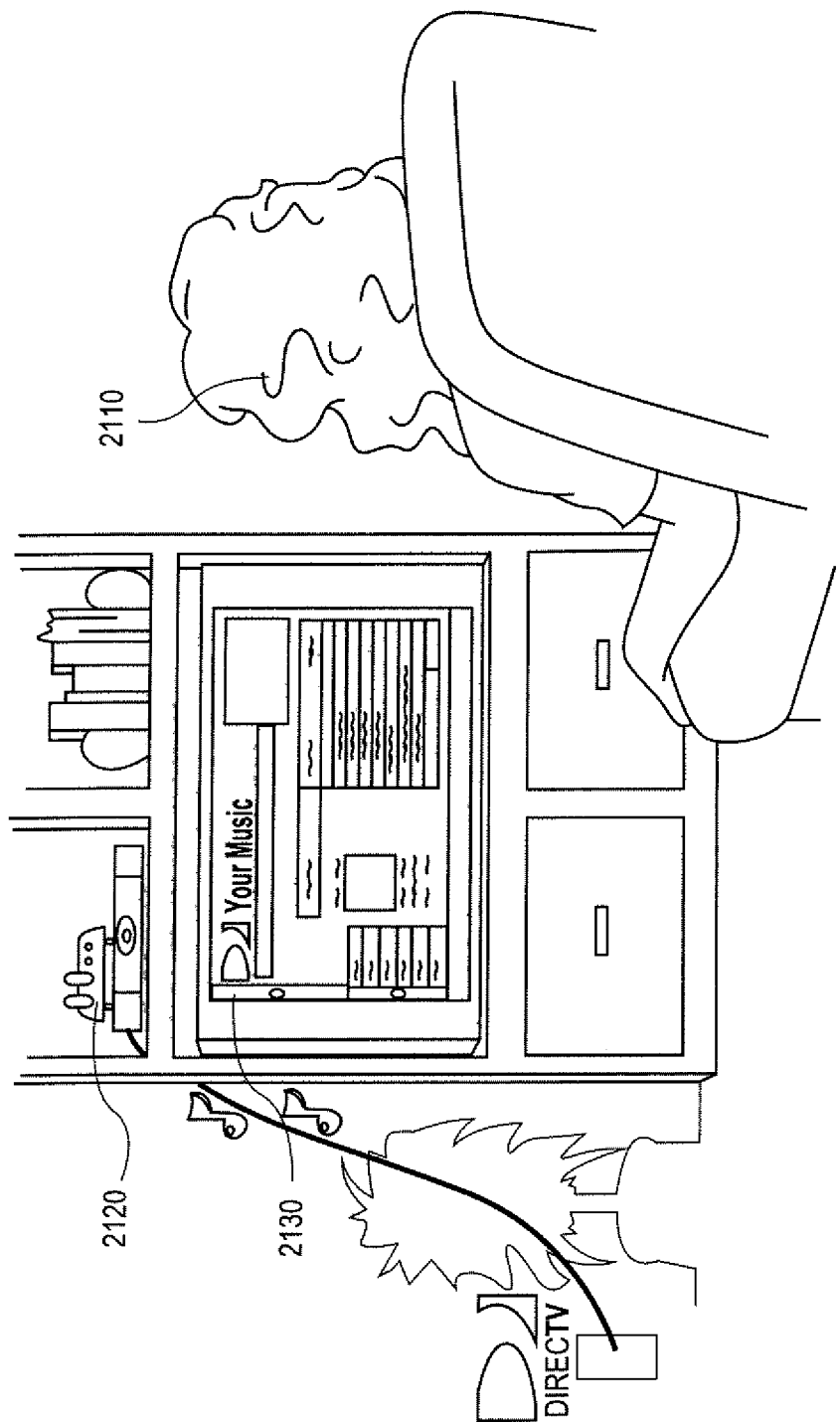
FIGS. 21A, 21B and 21C are simplified illustrations of a third consumer use case of acquiring content, in accordance with an embodiment of the present invention.
Figure 21B:
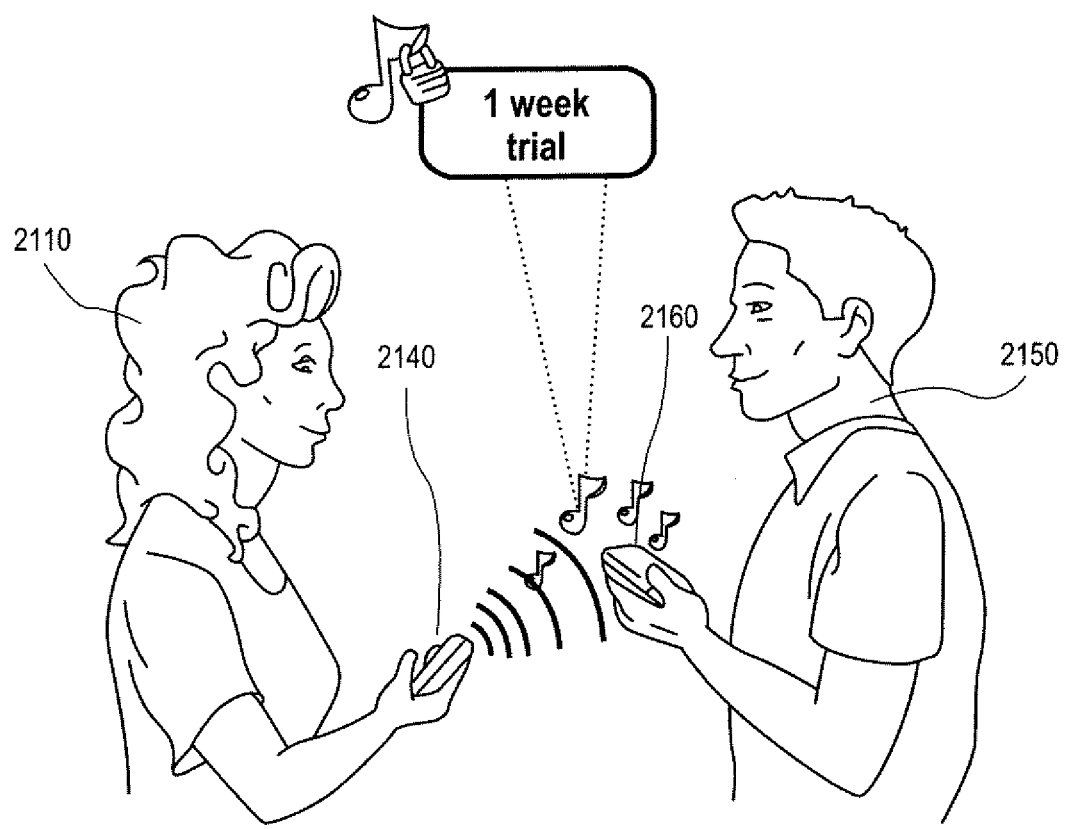
Figure 21C:
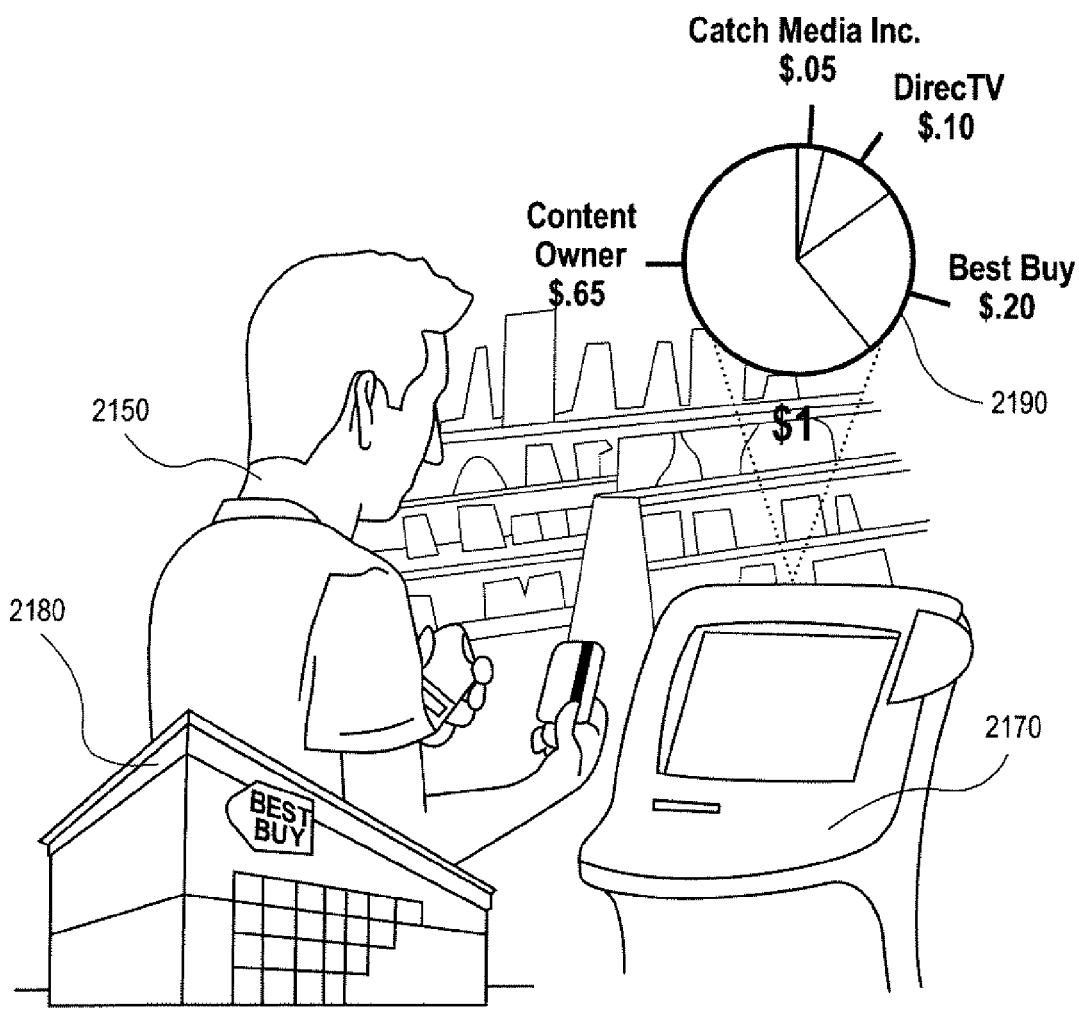

Reference is made to FIGS. 21A, 21B and 21C, which are simplified illustrations of a third consumer use case of acquiring content in accordance with an embodiment of the present invention. As shown in FIG. 21A, a consumer 2110 records content from a DirectTV broadcast media station onto her recorder device 2120, while enjoying home entertainment on her television 2130. Consumer 2110 copies the content from her recorder device 2120 onto her player device 2140.

Subsequently, as shown in FIG. 21B, consumer 2110 meets a friend, namely consumer 2150, who expresses interest in the content. Consumer 2110 instructs the player software to share the content with consumer 2150. The player software sends a message to the tracking server indicating that the content should be shared with consumer 2150. The tracking server uses rights manager 130 to validate that the content may be shared and, if so, updates the inventory of consumer 2150 to include the shared content. The shared content is generally provided to consumer 2150 onto his player device 2160 with a trial license, whereby consumer 2150 only has limited rights to play the content for, for example, a one week trial period.

Subsequently, as shown in FIG. 21C, consumer 2150 decides to purchase the content, which he does for $1.00 via a media kiosk 2170 located in a Best Buy store 2180. After purchasing the content, consumer 2150 is granted full rights to the content.

Also shown in FIG. 21C is a pie chart 2190, indicating allocation of the $1.00 purchase price for the content between the content owner, DirectTV, Best Buy and the owner of the present invention.

System Architecture

Figure 22:
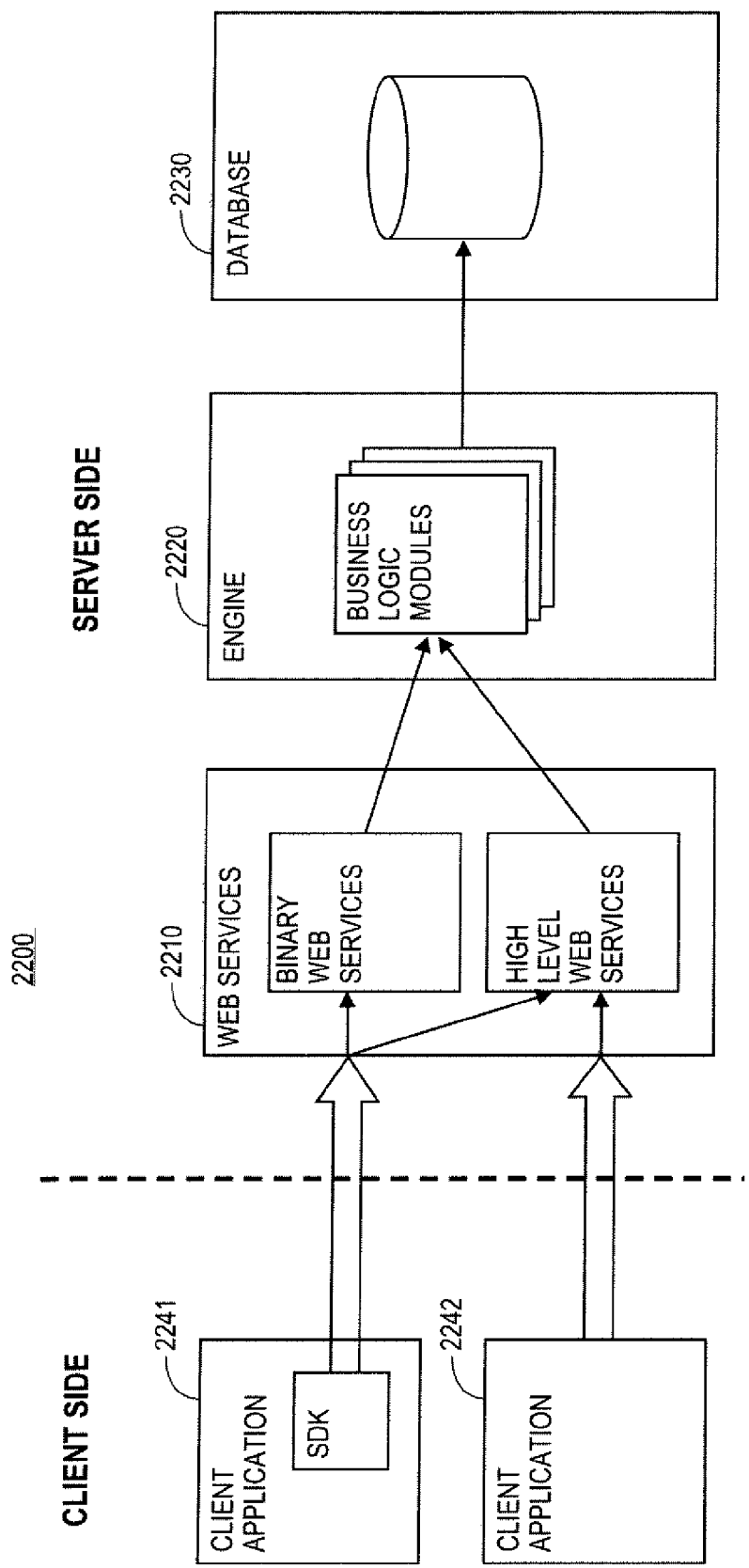
FIG. 22 is a simplified high-level architecture diagram of a content provisioning and revenue disbursement system, in accordance with an embodiment of the present invention.

Reference is made to FIG. 22, which is a simplified high-level architecture diagram of a content provisioning and revenue disbursement system 2200, in accordance with an embodiment of the present invention. System 2200 is divided into client side components, shown on the left, and server side components, shown on the right The server-side components include a web services layer 2210, an engine layer 2220, and a database layer 2230. The client-side components include client applications 2241 and 2242.

Client application 2241 communicates with revenue disbursement system 2200 via an SDK, described further hereinbelow. Client application 2242 communicates with web services layer 2210 directly.

Client applications 2241 and 2242 may include inter alia mobile phones, content management applications, set top boxes or other player or recorder devices, as described hereinabove.

Web services layer 2210 handles communication with system 2200. In one embodiment of the present invention, a software development kit (SDK) is provided, in order to abstract the web services communication and other aspects of integration. Engine layer 2220 implements business logic for system 2200, including business logic for modules 120-190 of FIG. 1. Database layer 2230 maintains one or more data stores for system 2200, including the data stores for modules 120-190 of FIG. 1.

Figure 23:
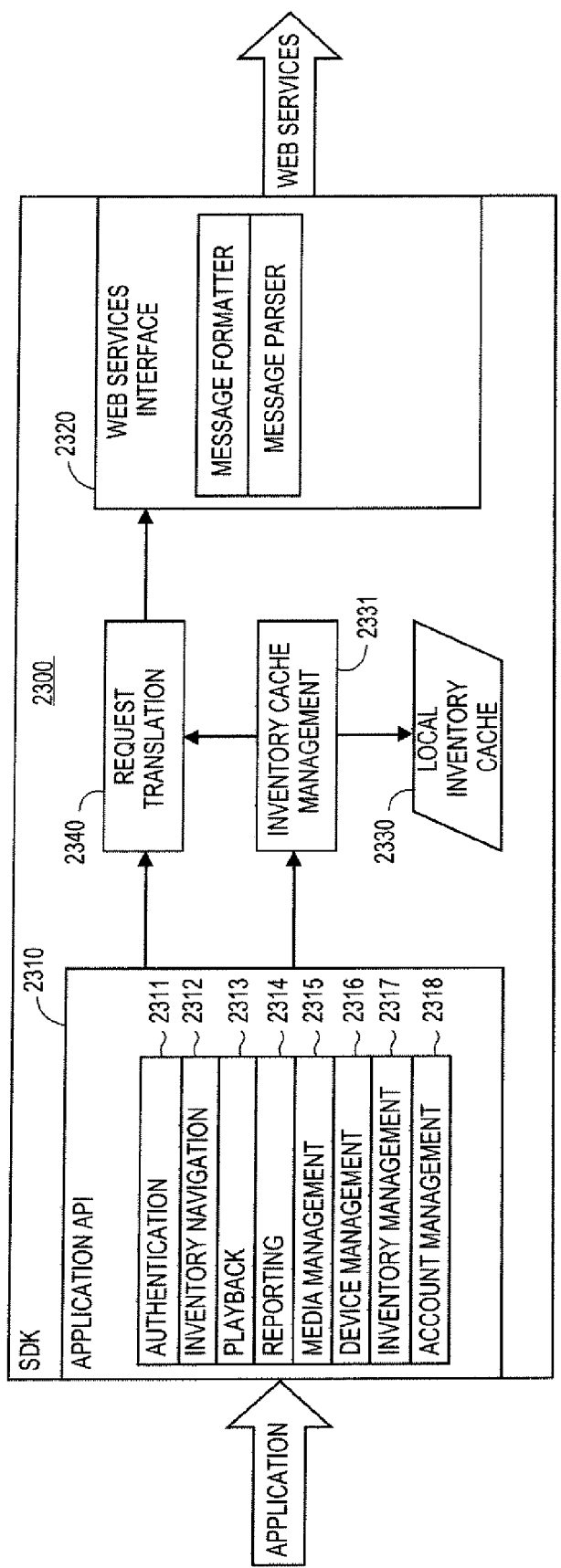
FIG. 23 is a simplified architecture diagram of an SDK that is provided with the system of FIG. 22, in accordance with an embodiment of the present invention.

Reference is made to FIG. 23, which is a simplified architecture diagram of an SDK 2300 that is provided with the system 2200, in accordance with an embodiment of the present invention. SDK 2300 includes an application programming interface (API) 2310 which interfaces with applications that integrate the SDK.

API 2310 provides applications with access to features of system 2200, including inter alia authentication 2311, inventory navigation 2312, playback of content 2313, reporting 2314, media management 2315, device management 2316, inventory management 2317 and account management 2318.

SDK 2300 also includes a web services interface 2320, which provides a communication layer between SDK 2300 and the server side of system 2200.

SDK 2300 may include a local cache 2330 of a consumer's inventory, allowing SDK 2300 to provide the consumer with access to his content inventory without requiring communication with server components. Local inventory cache 2330 is accessed via an inventory cache management component 2331. SDK 2300 may also operate without local inventory cache 2330, in which case API 2310 communicates with web services interface 2320 via a translation layer 2340.

Figure 24:
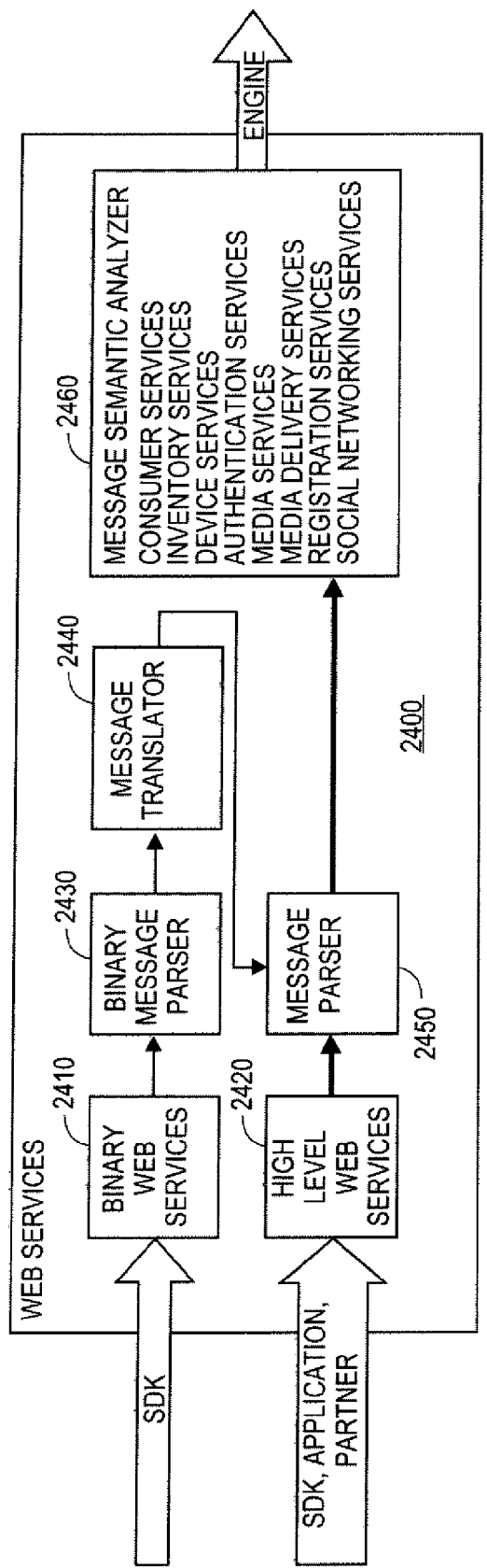
FIG. 24 is a simplified architecture diagram of a web services layer for the system of FIG. 22, in accordance with an embodiment of the present invention.

Reference is made to FIG. 24, which is a simplified architecture diagram of a web services layer 2400 of system 2200, in accordance with an embodiment of the present invention. Web services layer 2400 provides two types of services; namely, binary web services 2410 and high level web services 2420.

Binary web services 2410 are provided for low-level client applications and devices, which may be limited in computational capability and/or memory capacity. Such client devices generally provide a lightweight binary interface protocol. Such client devices may include inter alia low-end cellular phones or embedded devices. Binary web services are generally accessed via SDK 2300 and not directly from client applications.

High level web services 2420 provide an interface for more advanced applications and devices, such as PC applications and smartphones. High level web services are generally accessible from client applications, from SDK 2300 and from backend systems of companies working with system 2200, such as content distributors, registrants and other partners.

Messages from binary web services 2410 are parsed by a message parser 2430, and translated into high level web services by a message translator 2440. The translated messages are in turn parsed by message parser 2450, and passed to a semantic analyzer 2460, which determines message validity and provides the messages to engine 2220.

Messages from high level web services 2420 do not require binary message parsing, and are provided directly to message parser 2450 which, in turn, passes them to semantic layer 2460.

Figure 25:
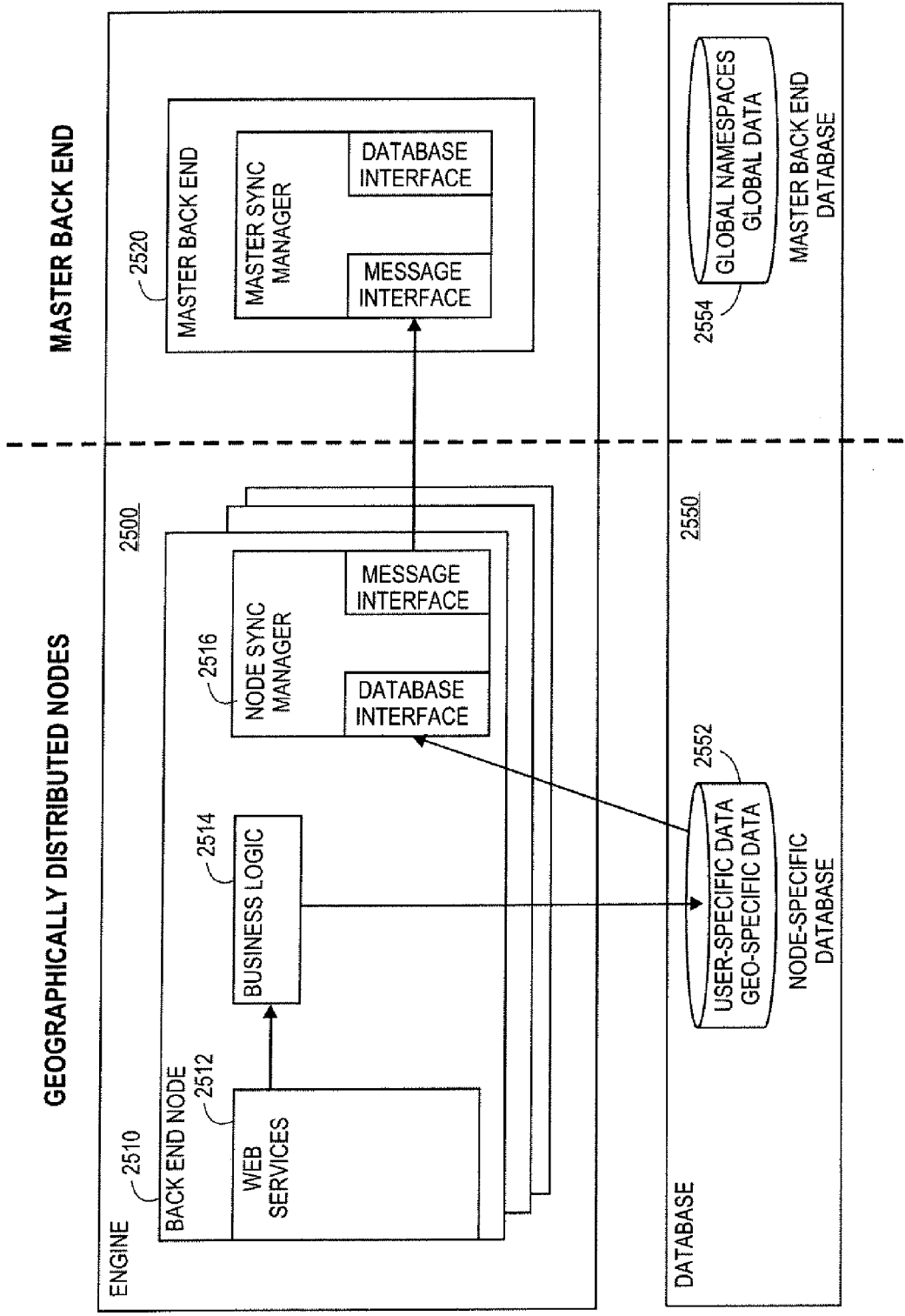
FIG. 25 is a simplified architecture diagram of engine and database layers for the system of FIG. 22, in accordance with an embodiment of the present invention.

Reference is made to FIG. 25, which is a simplified architecture diagram of an engine layer 2500 and a database layer 2550 of system 2200, in accordance with an embodiment of the present invention.

Engine layer 2500 may contain multiple back end nodes 2510. Each such back end node 2510 services a specific subset of consumers or devices that communicate with system 2200. The allocation of consumers and devices between different back end nodes 2510 may be inter alia geographic or service based.

Database layer 2550 contains a node-specific database 2552 and a master back end database 2554. Each instance of a node-specific database 2552 contains data associated with and maintained by a single instance of a back end node 2510. Such data may include inter alia consumer media data for the consumers serviced by the database's specific back end node 2510.

Master back end database 2554 exists in only one instance for system 2200, and contains data that is common across all back end nodes 2510.

Engine layer 2500 also includes master back end 2520, which serves to synchronize back end nodes 2510 with master back end database 2554.

It will be appreciated by those skilled in the art that the breakdown of engine 2500 into back end nodes 2510 and master back end 2520 is one of several mechanisms that enable system 2200 to achieve massively scalability.

Each instance of a back end node 2510 includes a web services layer 2512, a business logic layer 2514, and a node synchronization manager 2516.

Web services layer 2512 receives communications from web services 2210, Business logic layer 2514 implements core business logic of system 2200.

Node synchronization manager 2516 provides data to master back end 2520. Master back end 2520 propagates data to master back end database 2554, and then to other instances of node specific database 2552.

It will be appreciated by those skilled in the art that segmenting database layer 2550 into non-specific databases 2552 and master back end database 2554, is one of several mechanisms enabling system 2200 to be massively scalable.

Figure 26:
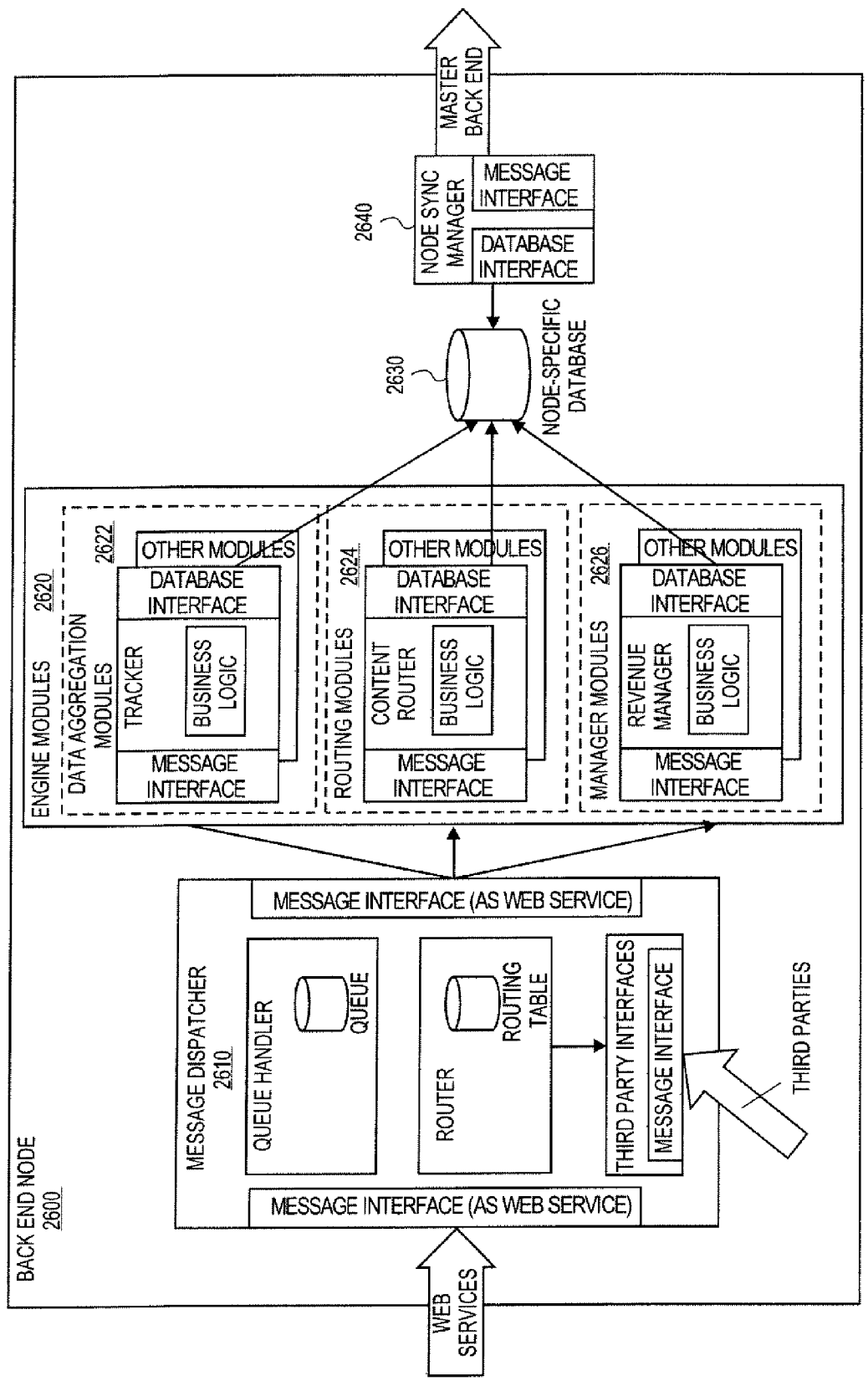
FIG. 26 is a simplified architecture diagram of a back end node for the system of FIG. 22, in accordance with an embodiment of the present invention.

Reference is made to FIG. 26, which is a simplified architecture diagram of a back end node 2600 of system 2200, in accordance with an embodiment of the present invention. Back end node 2600 is an instance of back end node 2510.

Back end node 2600 receives requests from partners and player devices, as described hereinabove. Partners include inter alia owners of media content, and providers of media content. Player devices include inter alia mobile phones, portable media players and automobile decks. Back end node 2600 uses a message dispatcher 2610 to forward messages to a set of engine modules 2620, such modules implementing the core business logic of engine 2500.

Back end node 2600 also contains a node-specific database 2630, corresponding to node-specific database 2552, and a node synchronization manager 2640, corresponding to node synchronization manager 2516.

Message dispatcher 2610 manages incoming requests and routes them to their appropriate destinations. The destinations may be internal to system 2200, such as engine modules 2620, or external to system 2200, such as content owners and content distributors.

Engine modules 2620 implement core functionality of system 2200. An engine module generally exists for each of the server components shown in FIG. 1. Additional modules may exist to provide additional functionality, or to provide support functionality for the components of FIG. 1.

Engine modules 2620 are broken up into data aggregation modules 2622, routing modules 2624 and manager modules 2626. It will be appreciated by those skilled in the art that this breakdown is artificial, and is made herein for the sake of clarity in understanding roles of the different modules. Data aggregation modules 2622 include inter alia content tracker 170. Routing modules 2624 include inter alia content router 150. Manager modules 2626 include inter alia rights manager 180 and disbursement manager 190.

Each engine module 2620 maintains its relevant data store in node-specific database 2630. Node-specific database 2630 is synchronized with master back end database 2554 via node synchronization manager 2640, as described hereinabove.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A computer-based method for provisioning content to users, by controlling a computer processor to perform instructions comprising:
   for each of a plurality of items of media content:
      maintaining information about one or more owners of the item of media content; and
      maintaining information about one or more providers of the item of media content;
   for each of a plurality of users:
      maintaining information about items of media content that were acquired by the user and about player devices that are owned by the user;
   for each of a plurality of time periods and for each of the plurality of users:
      maintaining a history log of items of media content played by the user during the time period;
   receiving a request from a user to play a designated item of media content that was acquired by the user, on a designated player device that is owned by the user, during a current time period;
   identifying an appropriate provider of the designated item of media content, according to a location of the user and according to the designated player device;
   causing the identified provider of the designated item of media content to transmit the designated item of media content to the user's designated player device;
   updating the history log for the current time period for the user to reflect the user having played the designated item of media content; and
   calculating revenue disbursement for revenue received from the user among the owners of the plurality of items of media content, and among the providers of the plurality of media content, for the current time period, based on the history log for the current time period for the user.

2. The method of claim 1, further comprising:
   maintaining information about rights granted to each of the plurality of users for each of the plurality of items of media content; and
   validating rights of the user to play the designated item of media content, in response to said receiving the request.

3. The method of claim 1, further comprising identifying one or more media items associated with the designated item of media content, and wherein said calculating also calculates revenue disbursement among owners of the one or more associated items of media content.

4. The method of claim 3 wherein the history log for each time period for each user comprises breakdowns of numbers of items of media content played by the user during the time period, according to owners of the items of media content, according to providers of the items of media content, and according to owners of the associated items of media content.

5. The method of claim 1 further comprising enabling the user to browse his acquired content.

6. The method of claim 1 wherein the plurality of users are grouped into households, the method further comprising aggregating information about media content acquired by each user from a household of users.

7. The method of claim 1 wherein said maintaining information about items of media content acquired by the user comprises recording purchases of items of media content by the user.

8. The method of claim 1 wherein said maintaining information about items of media content acquired by the user comprises recording peer-to-peer downloading of items of media content by the user.

9. The method of claim 1 wherein said maintaining information about items of media content acquired by the user comprises recording items of media content that the user rips to his computer from a physical medium.

10. The method of claim 1 wherein said maintaining information about items of media content acquired by the user comprises recording purchases of content subscriptions by the user.

11. The method of claim 10 wherein said recording purchases of content subscriptions by the user comprises recording purchases of subscriptions to content broadcast channels.

12. The method of claim 1 wherein said maintaining information about items of media content acquired by the user comprises identifying associated items of media contact that contributed to the user's decision to acquire the acquired media content.

13. The method of claim 1 wherein the history log for each time period for each user comprises breakdowns of numbers of items of media content played by the user during the time period, according to the owners of the items of media content and according to the providers of the items of media content.

14. The method of claim 1 wherein the history log for each time period for each user comprises breakdowns of time spent by the user playing items of media content during the time period, according to the owners of the items of media content and according to the providers of the items of media content.

15. The method of claim 1 wherein the history log for each time period for each user comprises breakdowns of the items of content acquired by the user, according to the owners of the items of media content and according to the providers of the items of media content.

16. The method of claim 1 wherein said identifying identifies an appropriate provider of the designated item of media content based on operating characteristics of the player device.

17. The method of claim 1 wherein said identifying identifies an appropriate provider of the designated item of media content based on connectivity of the player device.

18. The method of claim 1 wherein said identifying identifies an appropriate provider of the designated item of media content based on a location of the player device.

19. The method of claim 1 wherein said identifying identifies an appropriate provider of the designated item of media content based on pre-established rules with providers of the items of media content.

20. A content provisioning system, comprising:
a data manager for storing and maintaining (i) for each of a plurality of items of media content, information about owners of the media content and providers of the media content, (ii) for each of a plurality of users, information about items of media content that were acquired by the user and about player devices that are owned by the user, and (iii) for each of a plurality of time periods and for each of the plurality of users, a history log of items of media content played by the user during the time period;
a receiver for receiving a request from a user to play a designated item of media content that was acquired by the user, on a designated player device that is owned by the user, during a current time period;
a content provisioner coupled with said data manager (i) for identifying an appropriate provider of the designated piece of media content according to a location of the user and according to the designated player device, and (ii) for causing the identified provider of the designated item of media content to transmit the designated item of media content to the user's designated player device; and
a disbursement manager coupled with said content provisioner and with said data manager (i) for updating the history log for the current time period for the user to reflect the user having played the designated item of media content, and (ii) for calculating revenue disbursement for revenue received from the user among the owners of the plurality of items of media content, and among the providers of the plurality of items of media content, for the current time period, based on the history log for the current time period for the user.

21. The content provisioning system of claim 20, wherein said data manager also stores information about rights granted to each of the plurality of users for each of the plurality of items of media content, the system further comprising a rights manager for validating rights of the user to play the designated item of media content.

22. The content provisioning system of claim 20 wherein said content provisioner identifies one or more media items associated with the designated item of media content, and wherein said disbursement manager also calculates revenue disbursement among owners of the one or more associated items of media content.

23. The content provisioning system of claim 22 wherein the history log for each time period for each user comprises breakdowns of numbers of items of media content played by the user during the time period, according to owners of the items of media content, according to providers of the items of media content, and according to owners of the associated items of media content.

24. The content provisioning system of claim 20 further comprising a content browser for enabling the user to browse his acquired content.

25. The content provisioning system of claim 20 wherein the plurality of users are grouped into households, and wherein said data manager aggregates information about items of media content acquired by each user from a household of users.

26. The content provisioning system of claim 20 wherein said data manager records purchases of items of media content by the user.

27. The content provisioning system of claim 20 wherein said data manager records peer-to-peer downloading of items of media content by the user.

28. The content provisioning system of claim 20 wherein said data manager records items of media content that the user rips to his computer from a physical medium.

29. The content provisioning system of claim 20 wherein said data manager records purchases of content subscriptions by the user.

30. The content provisioning system of claim 29 wherein said data manager records purchases of subscriptions to content broadcast channels.

31. The content provisioning system of claim 20 wherein said data manager identifies associated items of media contact that contributed to the user's decision to acquire the acquired media content.

32. The content provisioning system of claim 20 wherein the history log for each time period for each user comprises breakdowns of number of items of media content played by the user during the time period, according to the owners of the items of media content and according to the providers of the items of media content.

33. The content provisioning system of claim 20 wherein the history log for each time period for each user comprises breakdowns of time spent by the user playing items of media content during the time period, according to the owners of the items of media content and according to the providers of the items of media content.

34. The content provisioning system of claim 20 wherein the history log for each time period for each user comprises breakdowns of the items of content acquired by the user, according to the owners of the items of media content and according to the providers of the items of media content.

35. The content provisioning system of claim 20 wherein said content provisioner identifies an appropriate provider of the designated item of media content based on operating characteristics of the player device.

36. The content provisioning system of claim 20 wherein said content provisioner identifies an appropriate provider of the designated item of media content based on connectivity of the player device.

37. The content provisioning system of claim 20 wherein said content provisioner identifies an appropriate provider of the designated item of media content based on a location of the player device.

38. The content provisioning system of claim 20 wherein said content provisioner identifies an appropriate provider of the designated item of media content based on pre-established rules with providers of the items of media content.

39. A computer-based method for provisioning content to users, by controlling a computer processor to perform instructions comprising:
for each of a plurality of items of media content:
maintaining information about one or more owners of the item of media content; and
maintaining information about one or more providers of the item of media content;
for each of a plurality of users:
maintaining information about items of media content that were acquired by the user and about player devices that are owned by the user;
for each of a plurality of time periods and for each of the plurality of users:
maintaining a history log of items of media content played by the user during the time period;
receiving a request from a user to play a designated item of media content that was acquired by the user and that is resident locally on a designated player device owned by the user, during a current time period;
updating the history log for the current time period for the user to reflect the user having played the designated item of media content; and
calculating revenue disbursement for revenue received from the user among the owners of the plurality of items of media content, and among the providers of the plurality of media content, for the current time period, based on the history log for the current time period for the user.

40. A content provisioning system, comprising:
a data manager for storing and maintaining (i) for each of a plurality of items of media content, information about owners of the media content and providers of the media content, (ii) for each of a plurality of users, information about items of media content that were acquired by the user and about player devices that are owned by the user, and (iii) for each of a plurality of time periods and for each of the plurality of users, a history log of items of media content played by the user during the time period;
a receiver for receiving a request from a user to play a designated item of media content that was acquired by the user and is resident locally on a designated player device that is owned by the user, during a current time period; and
a disbursement manager coupled with said data manager (i) for updating the history log for the current time period for the user to reflect the user having played the designated item of media content, and (ii) for calculating revenue disbursement for revenue received from the user among the owners of the plurality of items of media content, and among the providers of the plurality of items of media content, for the current time period, based on the history log for the current time period for the user.

* * * * *